United States Patent
Yang et al.

(10) Patent No.: US 12,516,048 B2
(45) Date of Patent: Jan. 6, 2026

(54) B-LACTAM COMPOUNDS, THEIR PREPARATION AND USE AS ANTIBACTERIAL AGENTS

(71) Applicant: NINGXIA ACADEMY OF AGRICULTURE AND FORESTRY SCIENCES, Ningxia (CN)

(72) Inventors: Zhixiang Yang, Ningxia (CN); Haikang Yang, Ningxia (CN); Jinbo Ji, Ningxia (CN); Jian Sun, Ningxia (CN); Lili He, Ningxia (CN); Lijuan Zhai, Ningxia (CN); Koko Myo, Ningxia (CN); Dong Tang, Ningxia (CN); Zafar Iqbal, Ningxia (CN); Jingwen Ji, Ningxia (CN); Yuanyu Gao, Ningxia (CN); Yangxiu Mu, Ningxia (CN); Yuanbai Liu, Ningxia (CN); Xueqin Ma, Ningxia (CN); Jianqiang Yu, Ningxia (CN)

(73) Assignee: NINGXIA ACADEMY OF AGRICULTURE AND FORESTRY SCIENCES, Ningxia (CN)

(*) Notice: Subject to any disclaimer, the term of this patent is extended or adjusted under 35 U.S.C. 154(b) by 235 days.

(21) Appl. No.: 17/777,272

(22) PCT Filed: Aug. 6, 2020

(86) PCT No.: PCT/CN2020/107417
§ 371 (c)(1),
(2) Date: May 16, 2022

(87) PCT Pub. No.: WO2022/027439
PCT Pub. Date: Feb. 10, 2022

(65) Prior Publication Data
US 2023/0150996 A1  May 18, 2023

(51) Int. Cl.
| | | |
|---|---|---|
| C07D 417/14 | (2006.01) | |
| A61K 45/06 | (2006.01) | |
| A61P 31/04 | (2006.01) | |

(52) U.S. Cl.
CPC ............ C07D 417/14 (2013.01); A61K 45/06 (2013.01); A61P 31/04 (2018.01)

(58) Field of Classification Search
CPC ........ C07D 417/14; A61P 31/04; A61K 45/06
See application file for complete search history.

(56) References Cited

U.S. PATENT DOCUMENTS

| | | | |
|---|---|---|---|
| 9,556,165 B2 * | 1/2017 | Klenke | .................. A61K 45/06 |
| 9,782,390 B2 * | 10/2017 | Klenke | .................. A61P 31/00 |
| 2018/0339983 A1 | 11/2018 | Tang et al. | |

FOREIGN PATENT DOCUMENTS

| | | |
|---|---|---|
| WO | WO 2013110643 A1 | 8/2013 |
| WO | WO 2017050218 A1 | 3/2017 |
| WO | WO 2018065636 A1 | 4/2018 |
| WO | WO 2018091668 A1 | 5/2018 |
| WO | WO 2019020810 A1 | 1/2019 |

OTHER PUBLICATIONS

Meanwell, Fluorine and Fluorinated Motifs in the Design and Application of Bioisosteres for Drug Design, J. Med. Chem., 2018, 61, 5822-5880 (Year: 2018).*

Fu et al., Methyl-containing Pharmaceuticals: Methylation in Drug Design, Bioorganic & Medicinal Chemistry Letters, 28, 2018, 3283-3289 (Year: 2018).*

Ojima et al., Strategic incorporation of fluorine in the drug discovery of new-generation antitubercular agents targeting bacterial cell division protein FtsZ, J Fluor Chem., Apr. 2017; 196: 44-56 (Year: 2017).*

* cited by examiner

Primary Examiner — Andrew D Kosar
Assistant Examiner — Phillip Matthew Rzeczycki
(74) Attorney, Agent, or Firm — Haynes and Boone, LLP

(57) ABSTRACT

This disclosure relates to the medical field, more specifically to novel β-lactam compounds of formula (I), and their preparation and use as antibiotic agents in methods for the treatment of bacterial infections.

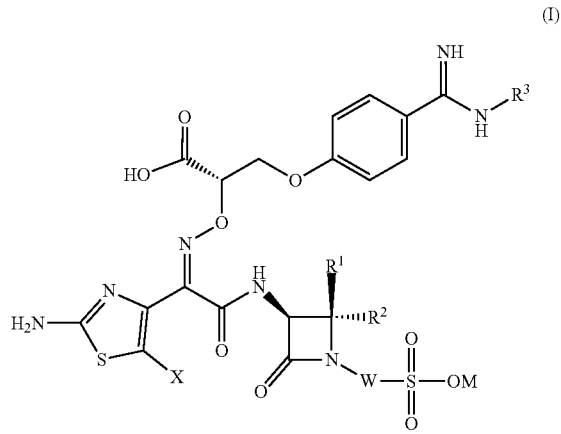

13 Claims, No Drawings

B-LACTAM COMPOUNDS, THEIR PREPARATION AND USE AS ANTIBACTERIAL AGENTS

CROSS-REFERENCE TO RELATED APPLICATION

This application claims priority to PCT International Application No. PCT/CN2020/107417, filed Aug. 6, 2020, the entire contents of which is hereby incorporated herein in its entirety by express reference thereto.

FIELD OF THE INVENTION

This invention belongs to the medical field, and relates to novel β-lactam compounds, processes for their preparation and their use as therapeutic agents. More particularly, the invention relates to amidine substituted β-lactam compounds and their use as antibiotic agents for the treatment of bacterial infections.

BACKGROUND OF THE INVENTION

The introduction of antibiotics for treatment of bacterial infections is one of the greatest medical achievements of 20th century. Over the past few decades, however, bacterial resistance to multiple antibiotics has begun to emerge throughout the world, threatening the effectiveness of antibiotic therapy. The number of patients who are dying from untreatable nosocomial infections continues to grow. Therapeutic options are especially limited for infections due to multi-drug-resistant Gram-negative pathogens including Enterobacteriaceae, a situation made worse by the fact that the pipelines of the pharmaceutical industry contain few compounds with promising resistance breaking profiles. New antibiotics are needed to combat the current and future threat of multidrug resistant bacteria.

β-lactams are the mostly widely used antibiotics for treatment of serious bacterial infections. These include cephalosporins, carbapenems, penicilins, and monobactams. As has been observed for other antibiotics classes, resistance to β-lactams has emerged. For most Gram-negative bacteria, this resistance is primarily driven by expression of β-lactamases, enzymes that hydrolyze β-lactam compounds. A vast array of more than 1500 β-lactamases and further resistance mechanisms severely endanger the mid-term usability of the current compounds in these subclasses. Especially extended-spectrum β-lactamases (ESBLs) and carbapenemases are important drivers of resistance. New β-lactams with resistance breaking properties are urgently needed to fill the gap.

Aztreonam as the single FDA approved monobactam is used worldwide for treatment of Gram-negative bacterial infections. However, aztreonam has poor activity against *Peseudomonas* and *Acinetobacter* strains. Because monobactams are inherently resistant to hydrolysis by metallo-lactamases, several companies have begun developing novel monobactam compounds for the treatment of infections caused by Gram-negative bacteria. Monobactam compounds comprising a siderophore moiety are disclosed by Basilea (WO 2007065288), NAEJA Pharmaceuticals (WO 2002022613), Squibb & Sons (U.S. Pat. No. 5,290,929, EP 531976, EP 484881). Pfizer re-investigated mono-cyclic β-lactams that carry a sulfonylaminocarbonyl activating group at the N1-position (WO 2010070523).

Recently, U.S Patent Application Publication No. US 2014/0275007 discloses oxamazin monobactams and their use as antibacterial agents, U.S Patent Application Publication No. US 2015/0266867 also discloses novel monobactam compounds for the use as antibacterial agents. International Patent Application Publication No. WO 2013/110643 discloses novel amidine substituted monobactam derivatives and their use as antibacterial agents. Additionally, International Patent Application Publication No. WO 2017/106064 discloses biaryl monobactam derivatives and their use as antibacterial agents, and International Patent Application Publication No. WO 2017/155765 discloses bicyclic aryl monobactam derivatives and their use as antibacterial agents.

The need for new antibiotics to overcome multidrug resistance continues. Compounds disclosed in this invention are designed to fill this medical need, through administration either on their own or in combination with a suitable β-lactamase inhibitor.

DETAILED DESCRIPTION OF THE INVENTION

In one aspect, the present invention relates to novel amidine substituted monobactam compounds, which are useful in the treatment of bacterial infections in humans or animals either alone or in combination with β-lactamase inhibitors, such as clavulanic acid, tazobactam, sulbactam and other β-lactamase inhibitors belonging to the groups of lactam inhibitors, diazabicyclooctane inhibitors (avibactam and the like), transition state analog inhibitors and/or metallo-β-lactamase inhibitors.

In accordance with the present invention, there are provided (A) new compounds of general formula (I), (B) pharmaceutically acceptable salts of the compounds of formula (I), and (C) pharmaceutically acceptable solvates of the compounds of formula (I) and of their salts, and (D) deuterated compounds of compounds of (A), (B) and (C), (namely, (i) compounds of formula (I) modified in that they have been deuterated, (ii) pharmaceutically acceptable salts of the compounds of formula (I) modified in that they have been deuterated, (iii) pharmaceutically acceptable solvates of the compounds of formula (I) and of their salts modified in that they have been deuterated):

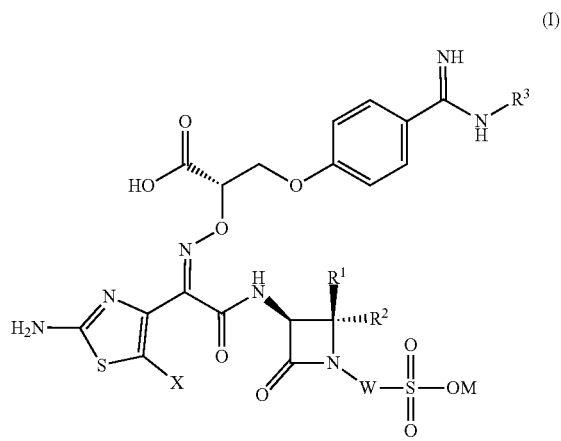

in which
M is hydrogen or a pharmaceutically acceptable salt forming cation,
$R^1$ and $R^2$ represent independently of one another hydrogen or $C_1$-$C_6$ alkyl,
W represents a bond or O, X represents independently $C_1$-$C_6$ alkyl (preferably $C_1$-$C_3$ alkyl, e.g., methyl, ethyl, n-propyl, isopropyl), $CF_3$, $CF_2$, CF, $R^3$ represents hydrogen, amino, hydroxy, $(C_1$-$C_6)$-alkyl (preferably $(C_1$-$C_4)$-alkyl) or a 4-, 5- or 6-membered nitrogen-containing heterocycle, whereby alkyl may be substituted with a substituent selected from the group consisting of hydroxy, amino, carboxy, carbonyloxy, mono- or di-$(C_1$-$C_6)$-alkylamino (preferably di-$(C_1$-$C_4)$-alkylamino), —NH—CH(=NH), —NH—C(=NH)(NH_2), 5- or 6-membered nitrogen-containing heteroaryl and 5- or 6-membered nitrogen-containing heterocyclyl, and the salts thereof, the solvates thereof and the solvates of the salts thereof.

Reference to specified compounds "modified in that they have been deuterated" refers to compounds obtained by modifying the specified compounds so that one or more hydrogen atoms in the compound have been replaced with or converted to deuterium.

Compounds of the invention are the compounds of formula (I) and the salts, solvates and solvates of the salts thereof, as well as the compounds which are encompassed by formula (I) and are mentioned hereinafter as exemplary embodiment (s), and the salts, solvates and solvates of the salts thereof, insofar as the compounds encompassed by formula (I) and mentioned hereinafter are not already salts, solvates and solvates of the salts.

The compounds of the invention may, depending on their structure, exist in stereoisomeric forms (enantiomers, diastereomers). The invention therefore also encompasses the enantiomers or diastereomers and respective mixtures thereof. The stereoisomerically uniform constituents can be isolated in a known manner from such mixtures of enantiomers and/or diastereomers.

If the compounds of the invention may occur in tautomeric forms, the present invention encompasses all tautomeric forms.

Salts preferred for the purposes of the present invention are physiologically acceptable salts of the compounds of the invention. Also encompassed however are salts which are themselves not suitable for pharmaceutical applications but can be used for example for the isolation or purification of the compounds of the invention.

Examples of pharmaceutically acceptable salts of the compounds of formula (I) include salts of inorganic bases like ammonium salts, alkali metal salts, in particular sodium or potassium salts, alkaline earth metal salts, in particular magnesium or calcium salts; salts of organic bases, in particular salts derived from benzylamine, octylamine, ethanolamine, diethanolamine, cyclohexylamine, diethylamine, triethylamine, ethylenediamine, procaine, morpholine, pyrroline, piperidine, N-ethylpiperidine, N-methylmorpholine, piperazine as the organic base; or salts with basic amino acids, in particular lysine, arginine, histidine and ornithine.

Examples of pharmaceutically acceptable salts of the compounds of formula (I) also include salts of inorganic acids like hydrochlorides, hydrobromides, sulfates, phosphates or phosphonates; salts of organic acids, in particular acetates, formates, propionates, lactates, citrates, fumarates, maleates, benzoates, tartrates, malates, methanesulfonates, ethanesulfonates, benzenesulfonates or toluenesulfonates; or salts with acidic amino acids, in particular aspartate or glutamate.

Solvates for the purposes of the invention refer to those forms of the compounds of the invention which in the solid or liquid state form a complex by coordination with solvent molecules. Hydrates are a specific form of solvates in which the coordination takes place with water.

In the context of this invention the substituents have the following definitions unless specified otherwise.

The term alkyl refers to straight-chain or branched $C_1$-$C_6$ alkyl, preferably $C_1$-$C_4$ alkyl, such as in particular methyl, ethyl, propyl, butyl, isopropyl, isobutyl and t-butyl.

The term heteroaryl refers to cyclic heteroaromatic groups with 5-8 ring atoms, preferably with 5-6 ring atoms, and with up to 4, preferably with up to 2, heteroatoms selected from the group consisting of N, O, S, in which N can also form an N-oxide.

Preferred are monocyclic heteroaryl groups with 5-6 ring atoms including up to 2 hetero atoms selected from the group consisting of N, O and S, such as in particular benzothiophene, furane, benzofurane, pyrrole, thiophene, pyridine, pyrazine, pyrimidine, pyridazine, indole, isoindole, purine, quinoline pyrazole, imidazole, thiazole, thiadiazole, oxazole, isoxazole, or isoquinoline. Many other suitable heteroaryl groups for the purpose of the invention are known to the person skilled in the art or can be readily found in the literature.

The term heterocyclyl refers to saturated or partially unsaturated heterocyclic groups with 4-10 ring atoms, preferably with 5-6 ring atoms, and with up to 3, preferably with up to 2, heteroatoms selected from the group consisting of N, O, S, SO and $SO_2$, in which N can also form an N-oxide. Preferred are saturated monocyclic heterocyclyl groups with 5-6 ring atoms including up to 2 hetero atoms selected from the group consisting of N, O and S, such as in particular pyrroline, pyrrolidine, imidazolidine, thiazolidine, imidazoline, tetrahydrofuran, tetrahydrothiophene, piperidine, pyran, tetrahydropyran, thiopyran, tetrahydrothiopyran, morpholine, thiomorpholine, piperazine, piperidazine. Many other suitable heterocyclyl groups for the purpose of the invention are known to the person skilled in the art or can be readily found in the literature.

The term carboxy refers to a carboxylic acid group, i.e. a —COOH group.

The term carbonyloxy refers to a carbonyl group linked via an oxygen.

The present invention relates to compounds of formula (I) in which

M is hydrogen or a pharmaceutically acceptable salt forming cation, $R^1$ and $R^2$ represent methyl, W represents O, X represents independently methyl, ethyl, $CF_3$, $CF_2$, CF, $R^3$ represents aminoethyl, azetidine, pyrrolidine or piperidine, and the salts thereof, the solvates thereof and the solvates of the salts thereof.

The present invention relates to compounds of formula (I) in which

M is hydrogen or a pharmaceutically acceptable salt forming cation, $R^1$ and $R^2$ represent methyl, W represents O, X represents methyl, $R^3$ represents aminoethyl, azetidine, pyrrolidine or piperidine, and the salts thereof, the solvates thereof and the solvates of the salts thereof.

The present invention relates to compounds of formula (I) in which

M is hydrogen or a pharmaceutically acceptable salt forming cation, $R^1$ and $R^2$ represent methyl, W represents O, X represents $CF_3$, $R^3$ represents aminoethyl, azetidine, pyrrolidine or piperidine, and the salts thereof, the solvates thereof and the solvates of the salts thereof.

In particular the present invention relates to compounds of formula (I) having the following structure, but non-limiting examples of such compounds are:

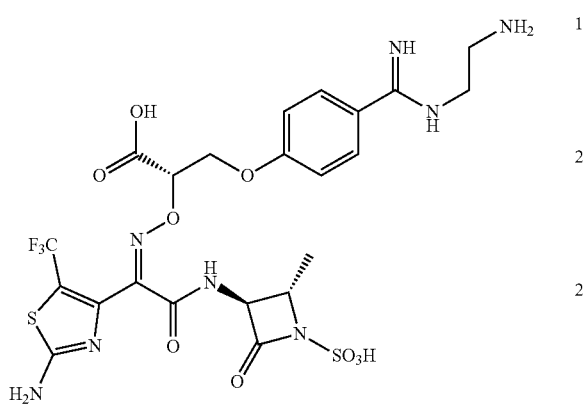

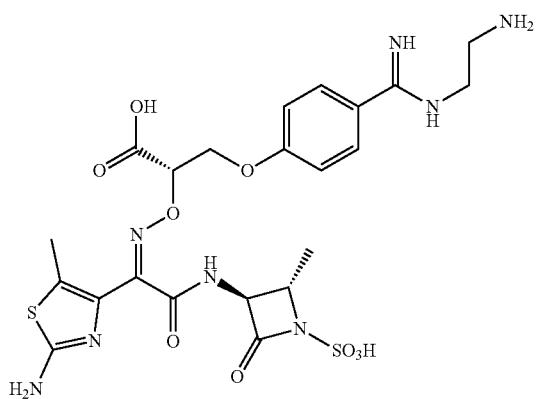

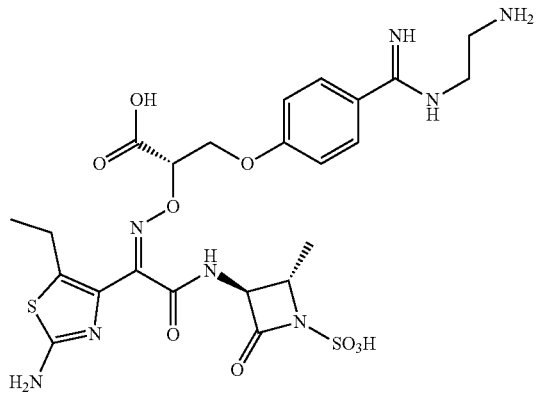

-continued

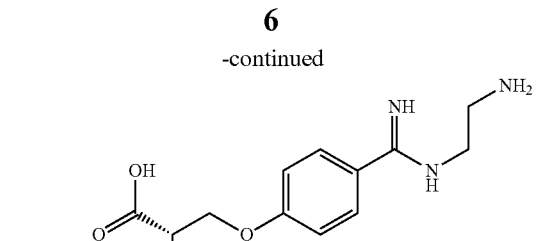

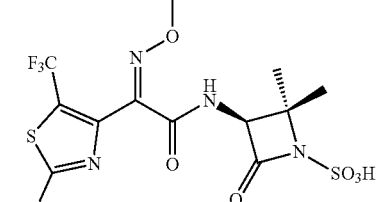

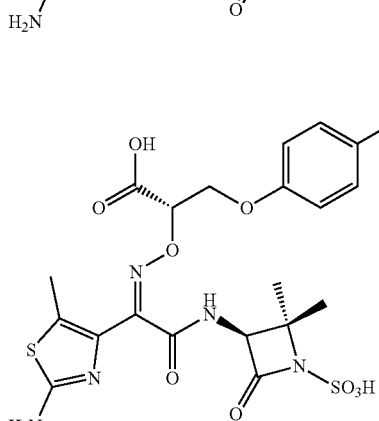

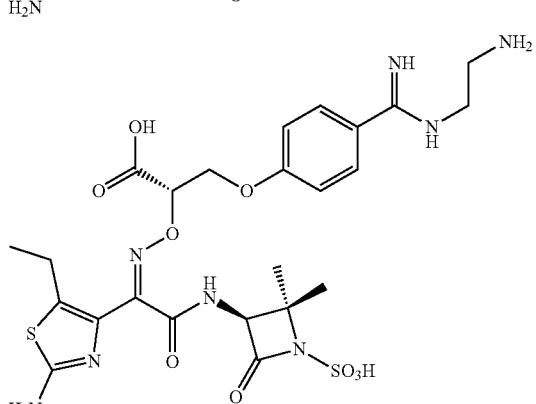

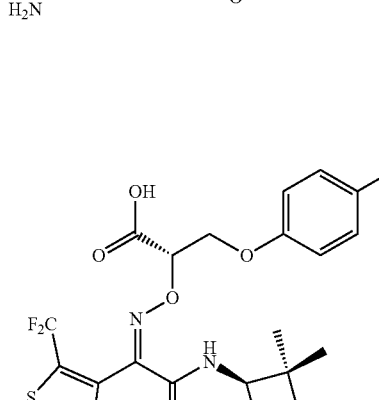

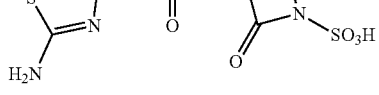

7
-continued
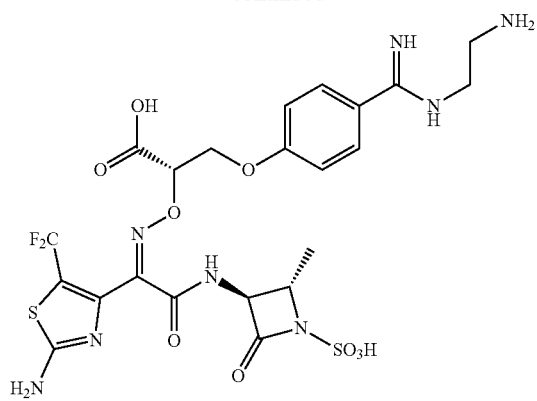
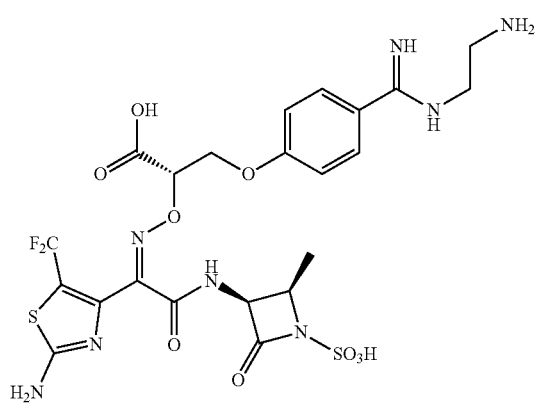
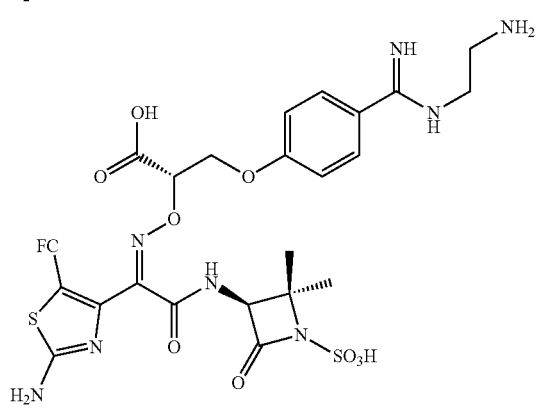
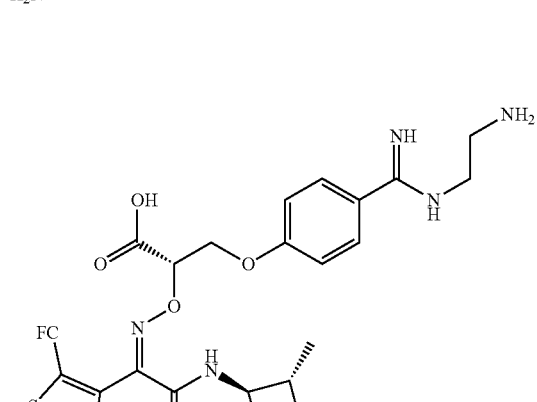
8
-continued
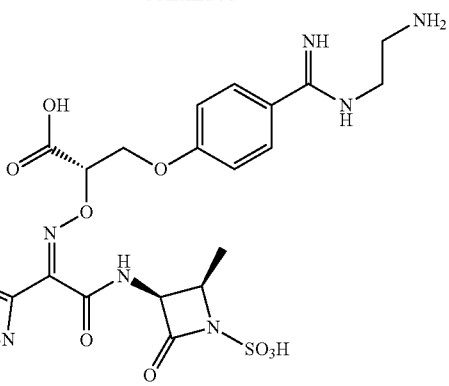
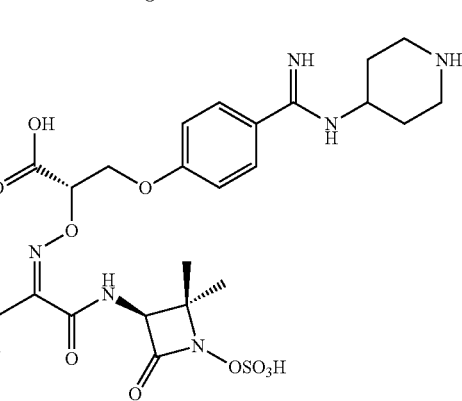
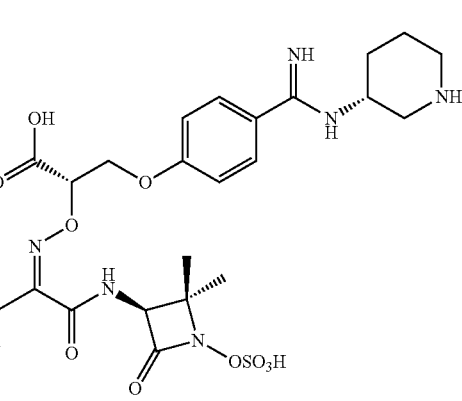
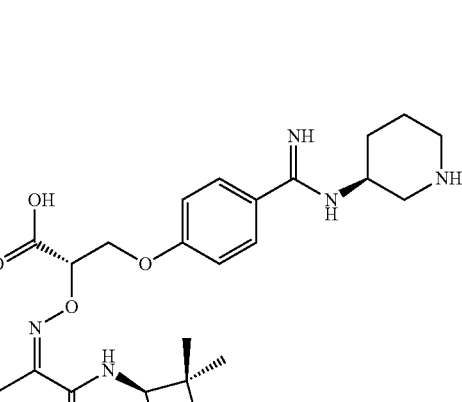

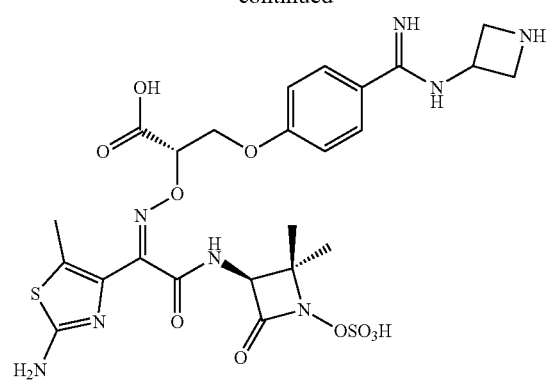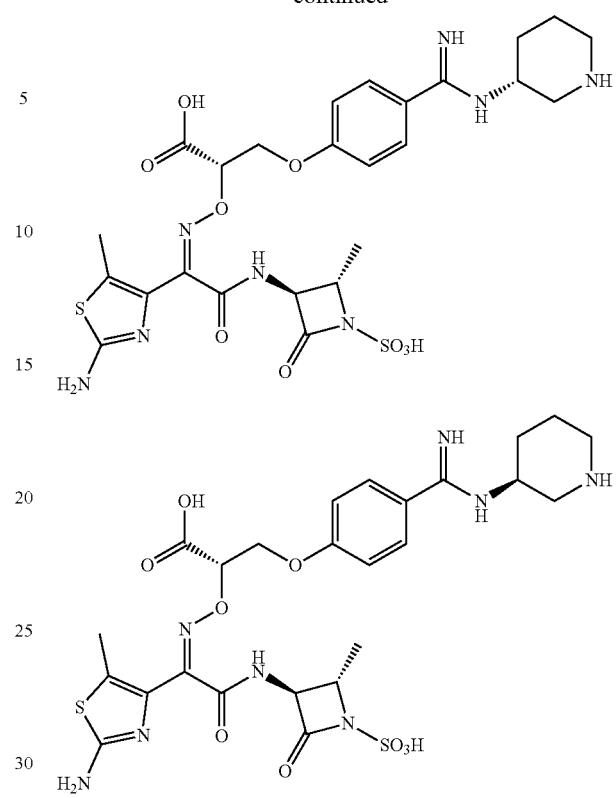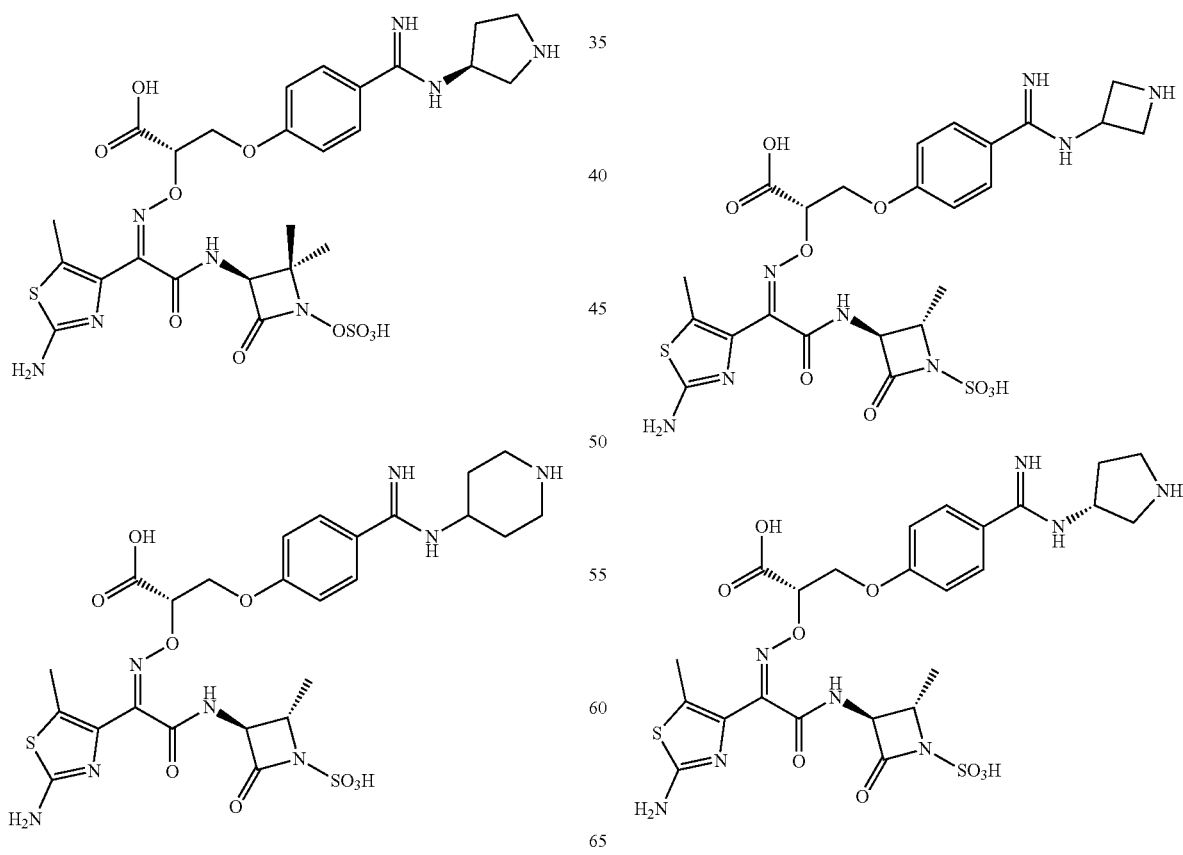

11
-continued
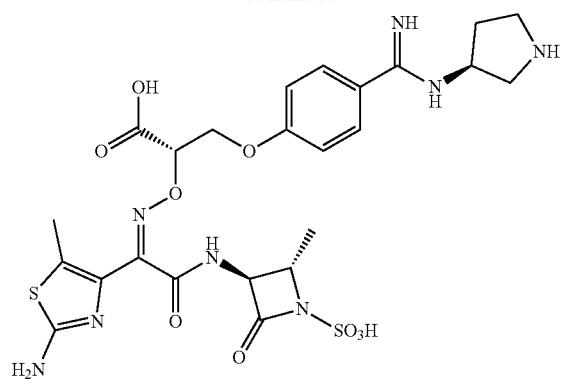
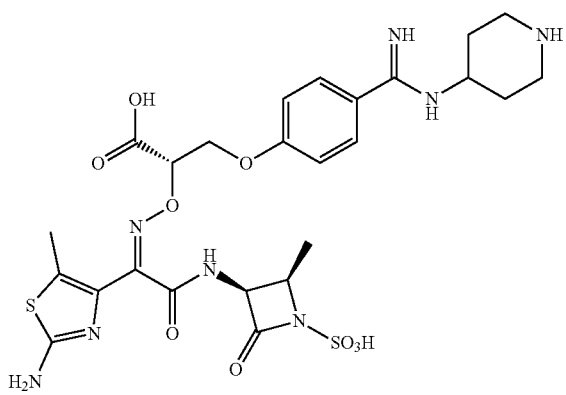
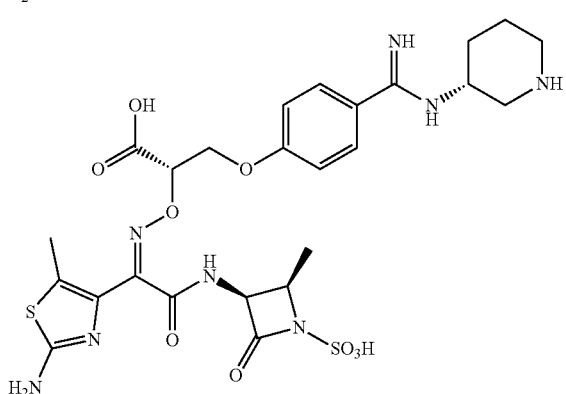
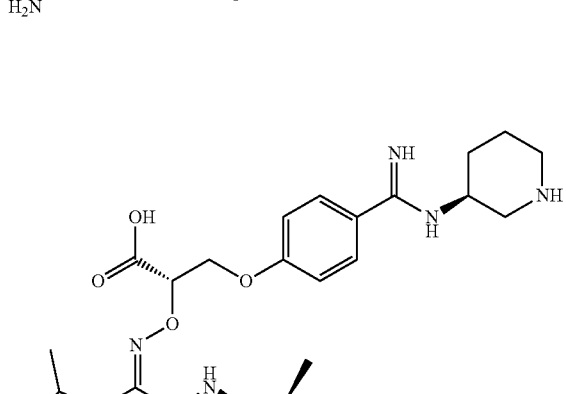
12
-continued
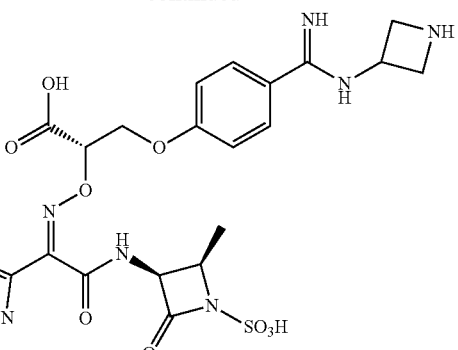
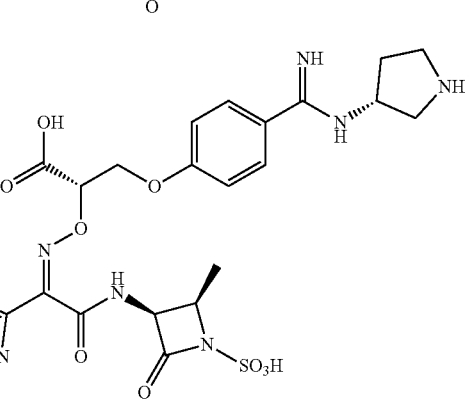
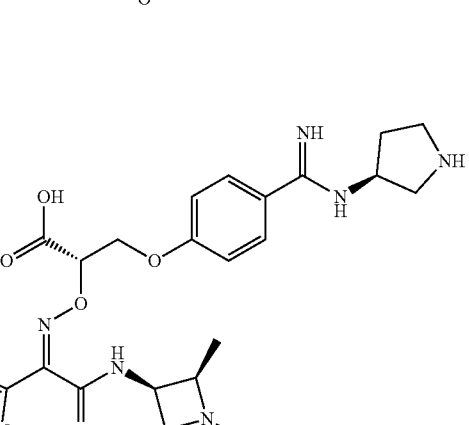

13
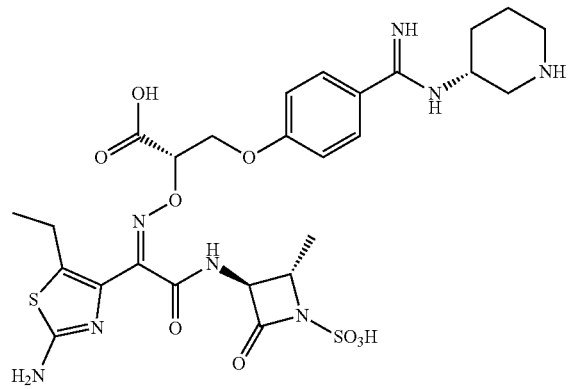
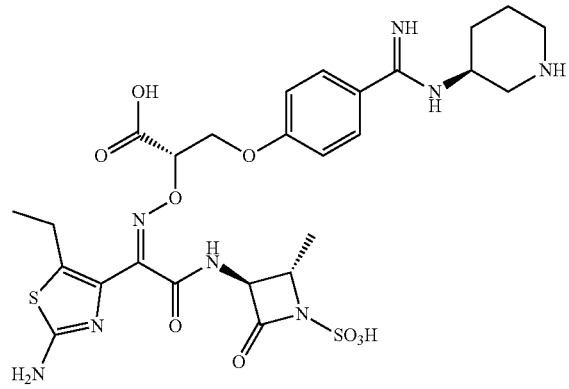
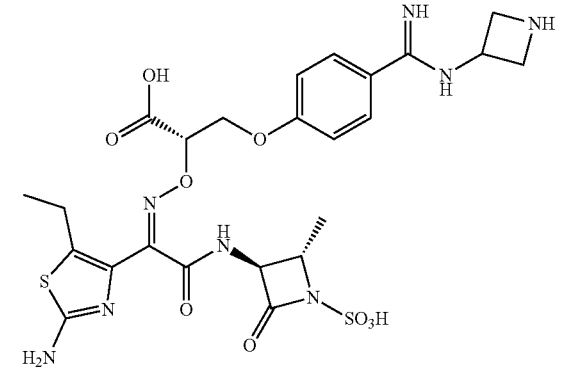
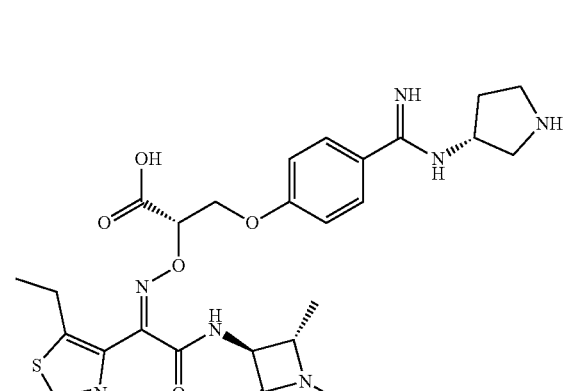
14
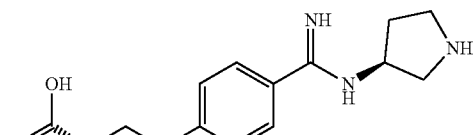
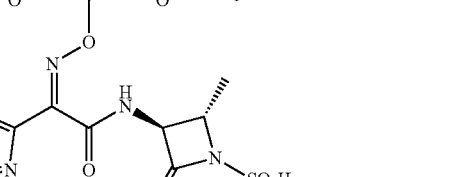
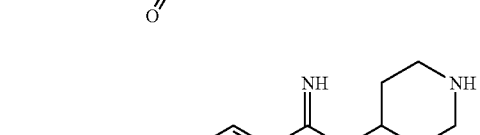
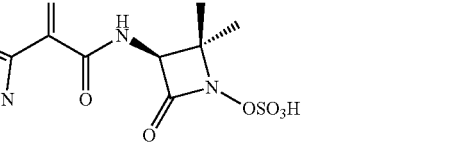
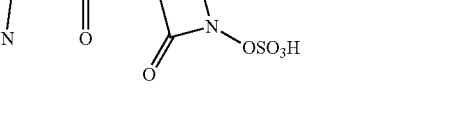
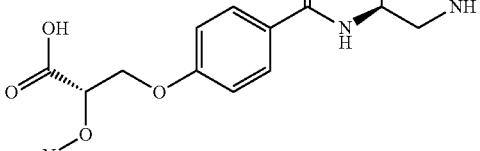

15
-continued
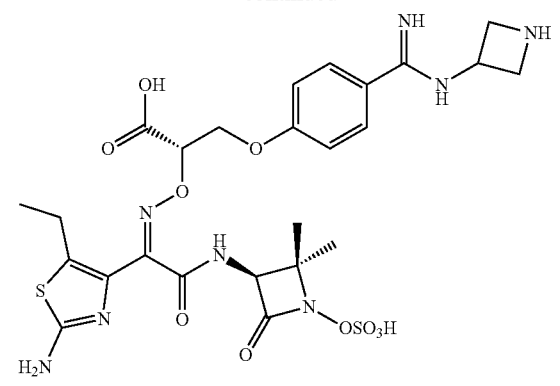
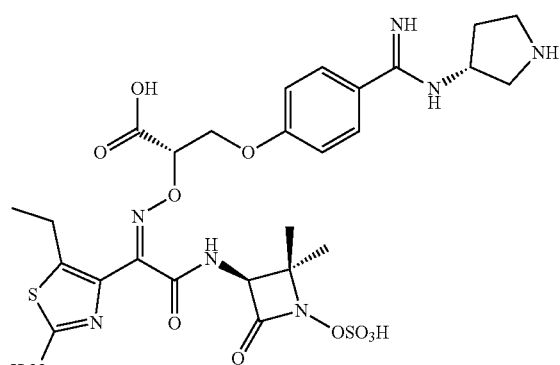
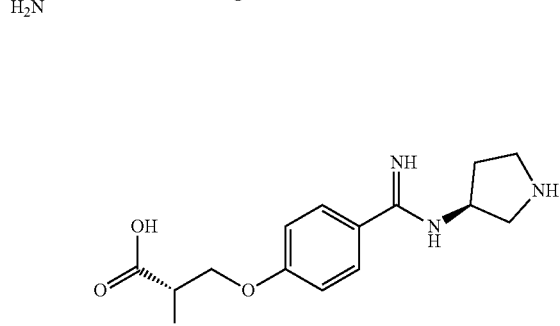
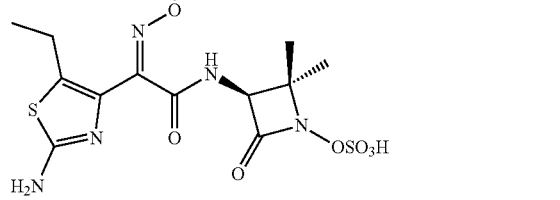
16
-continued
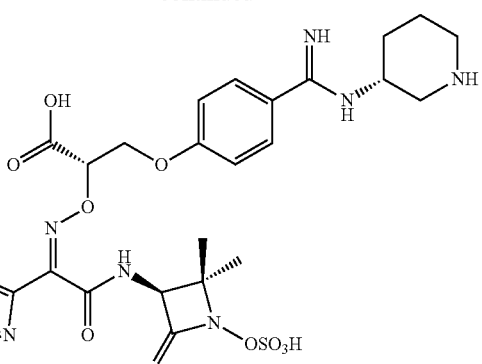
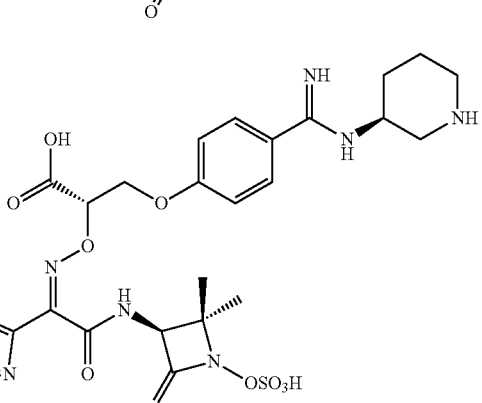
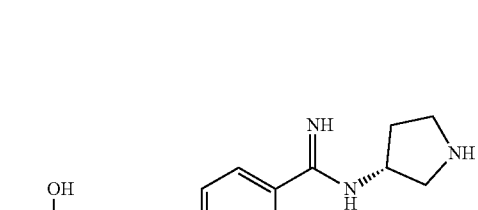
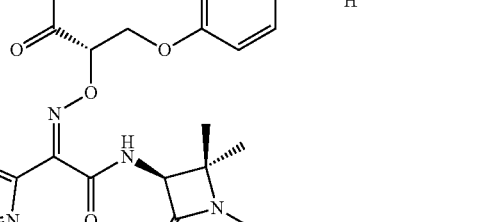

17
-continued
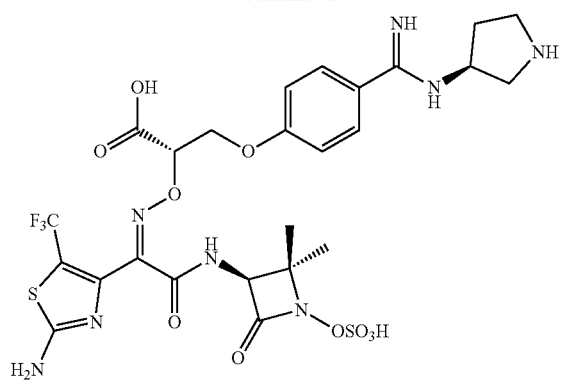
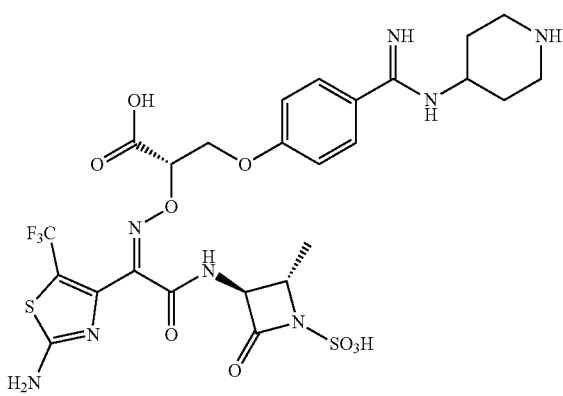
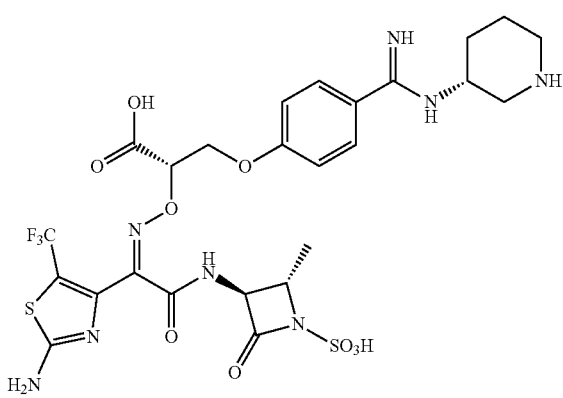
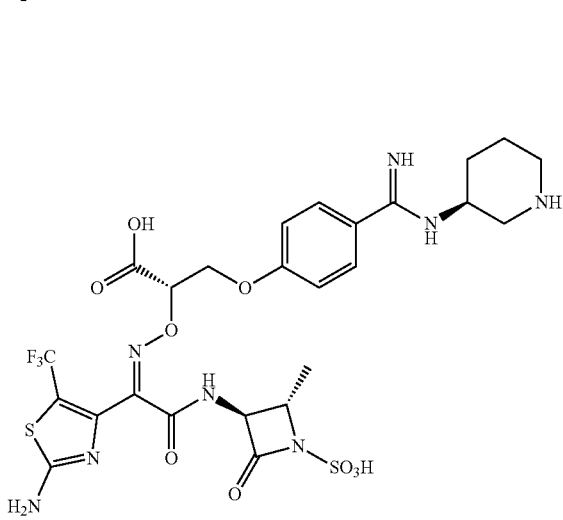
18
-continued
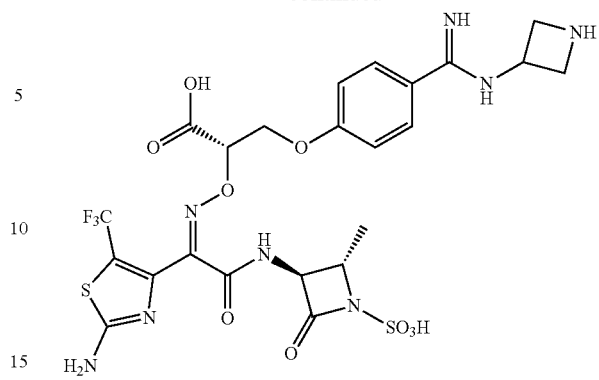
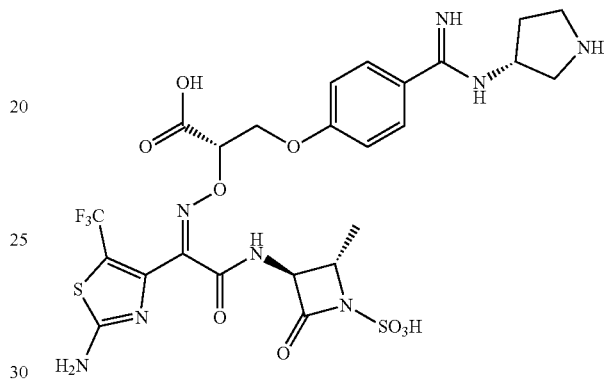
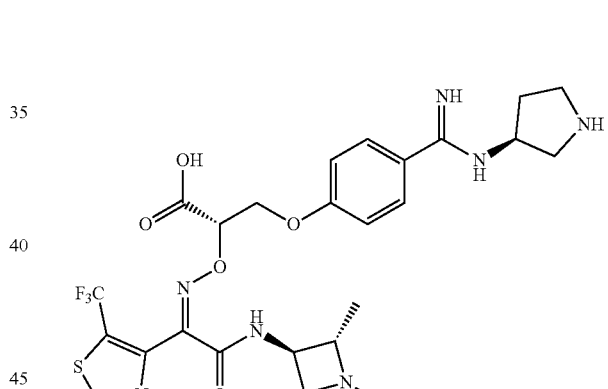
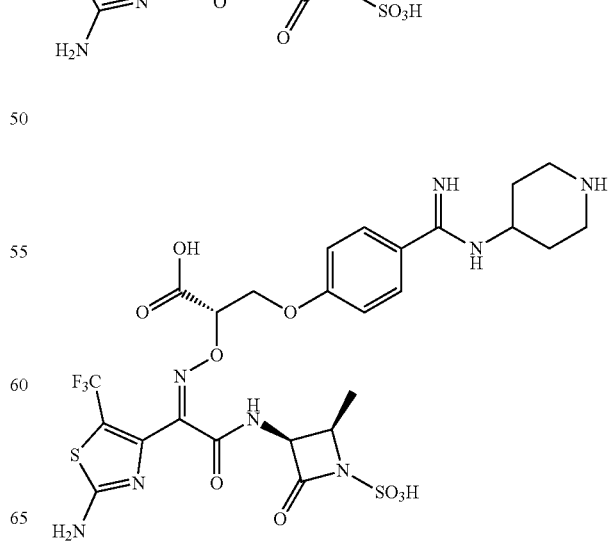

19
-continued
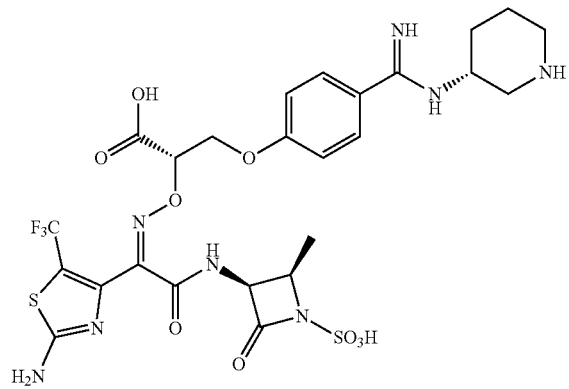
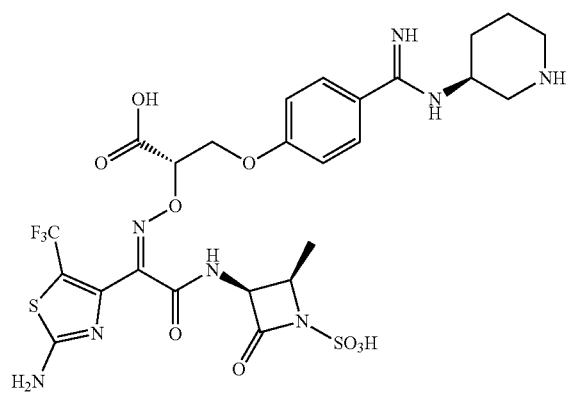
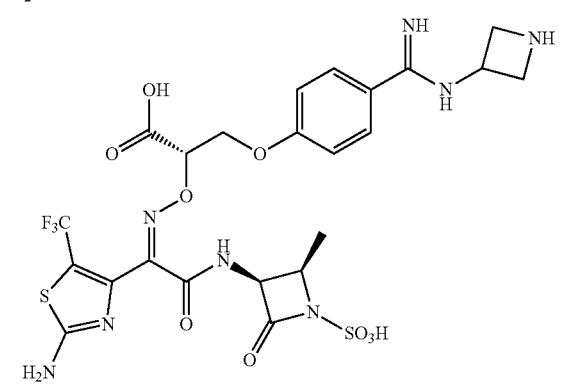
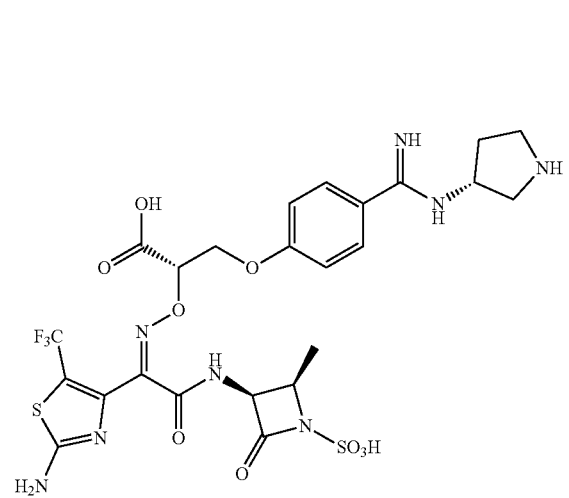
20
-continued
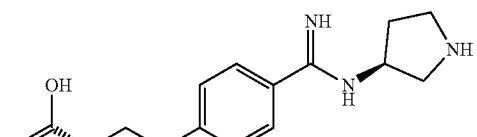
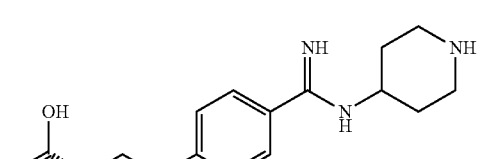
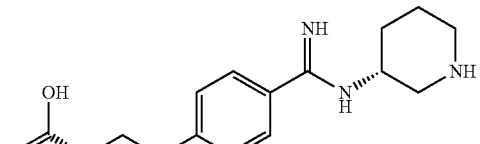
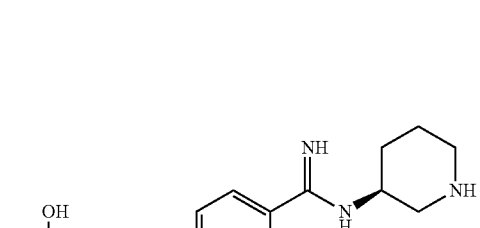

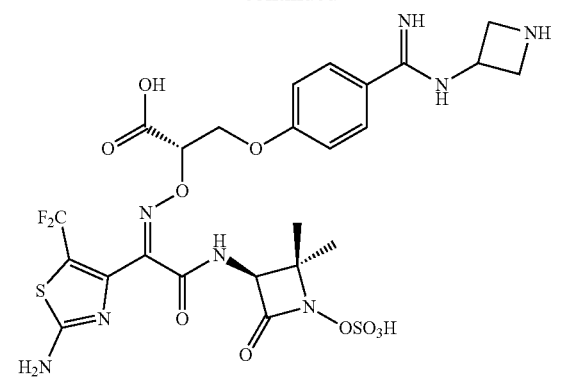
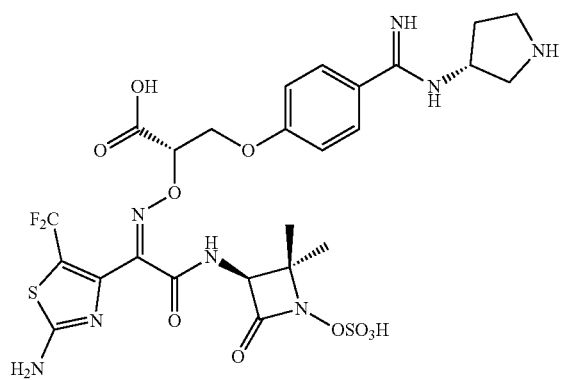
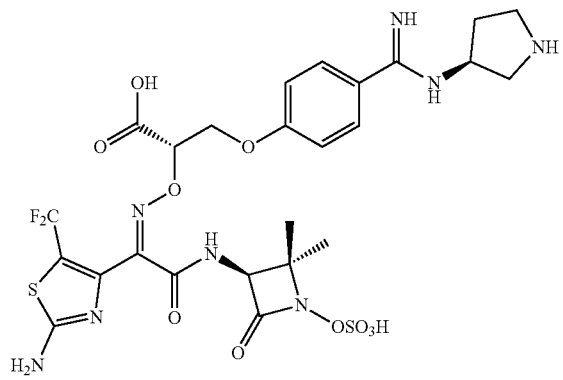
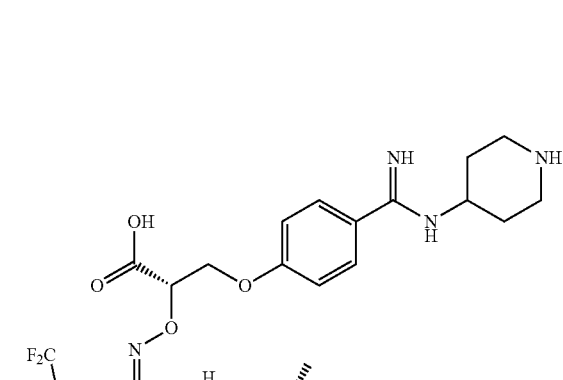
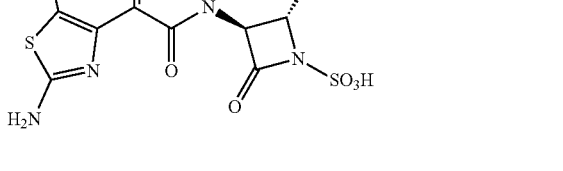
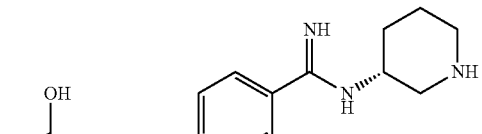
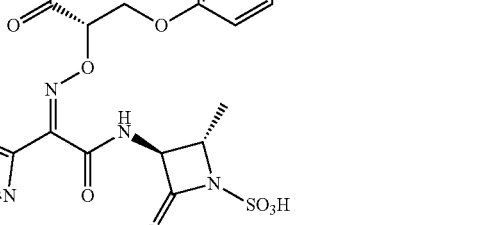
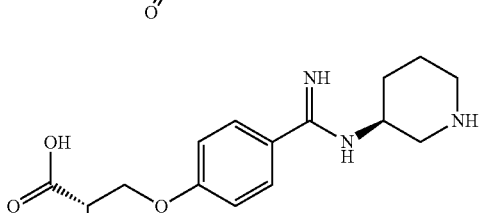
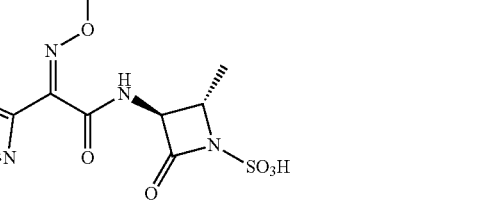
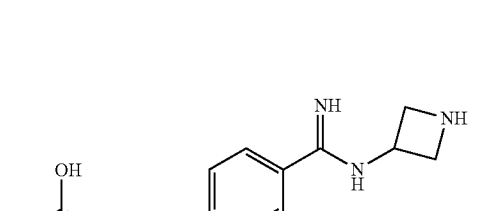
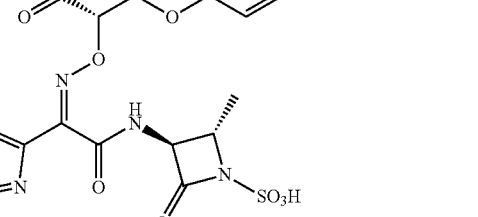
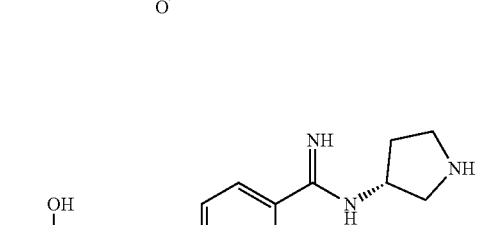
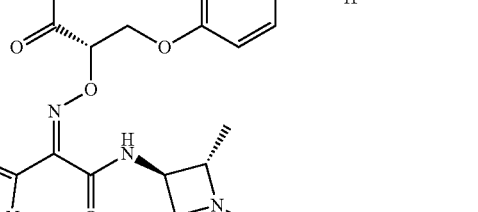

23
-continued
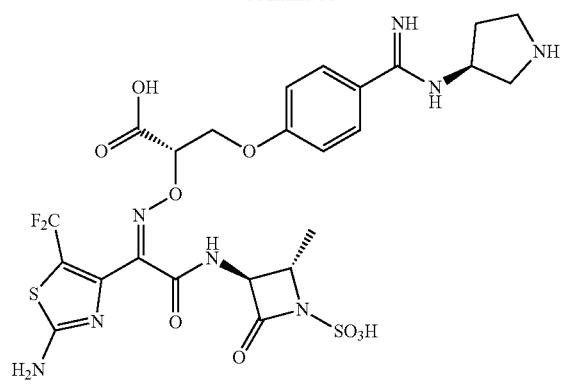
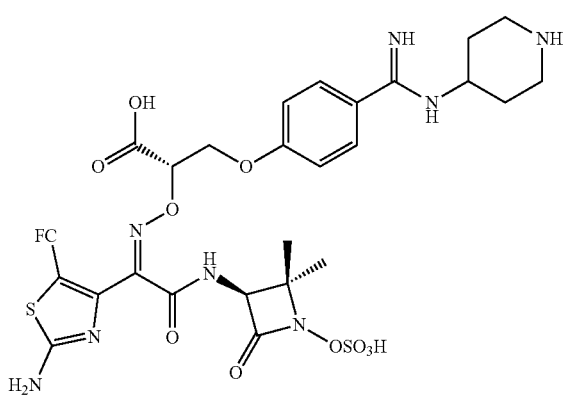
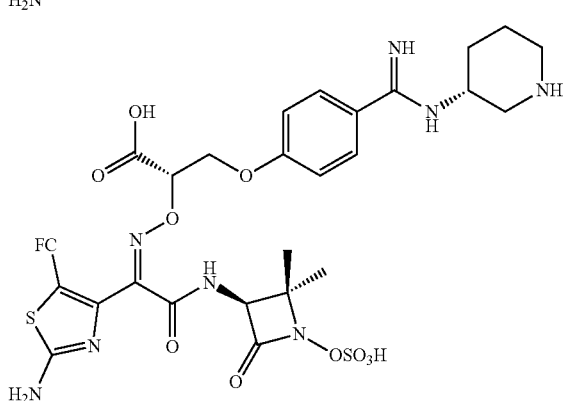
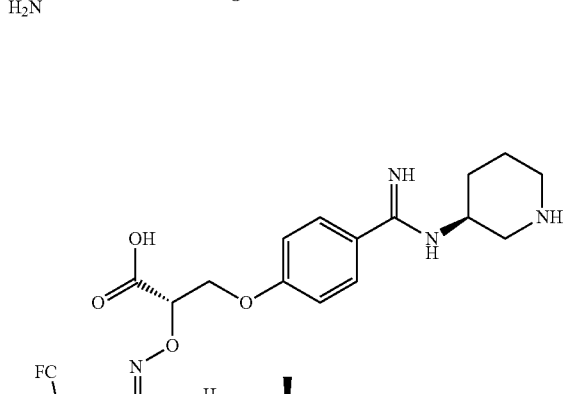
24
-continued
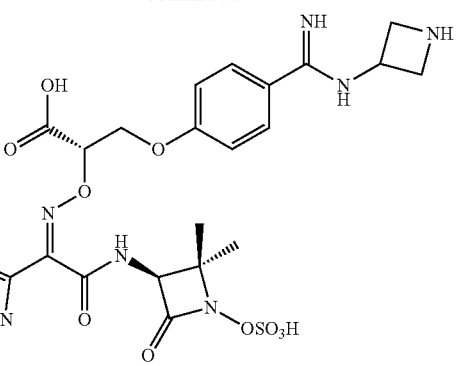
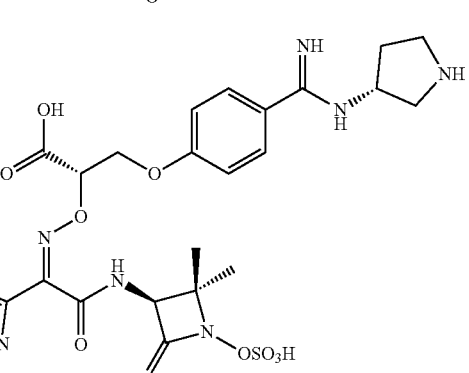
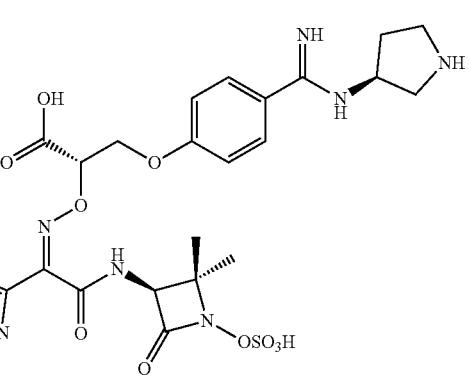
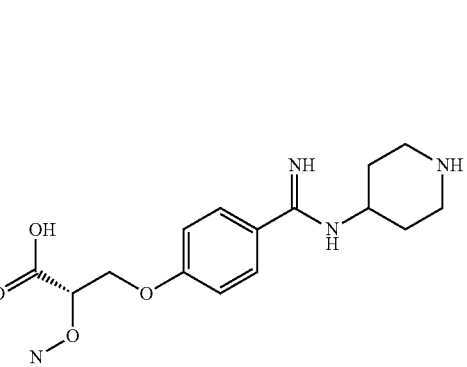

-continued

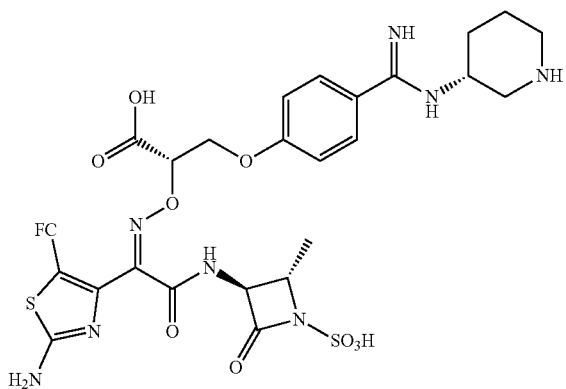

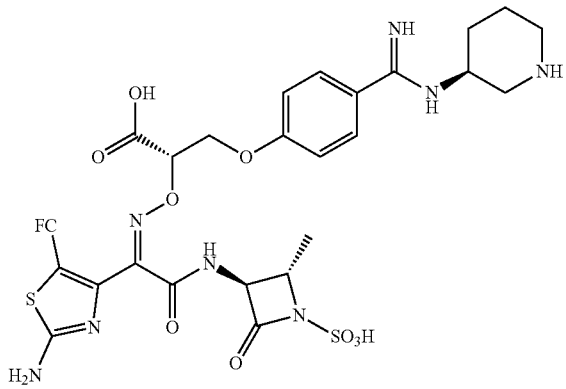

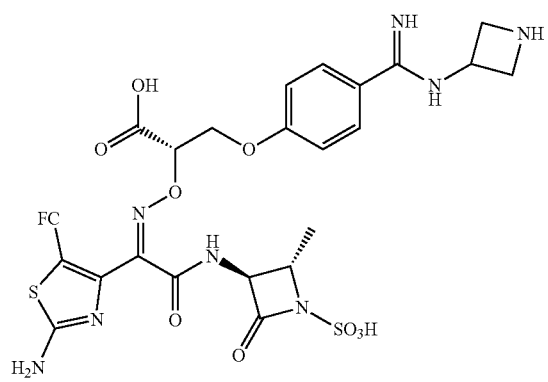

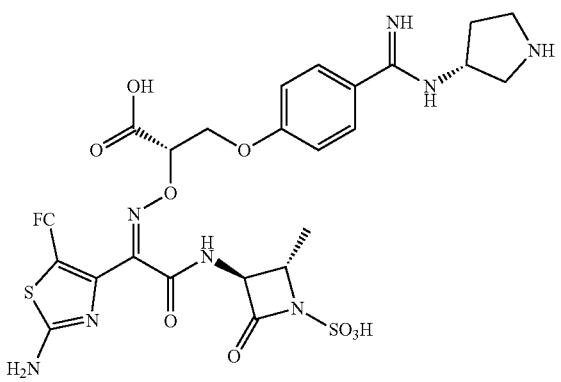

-continued

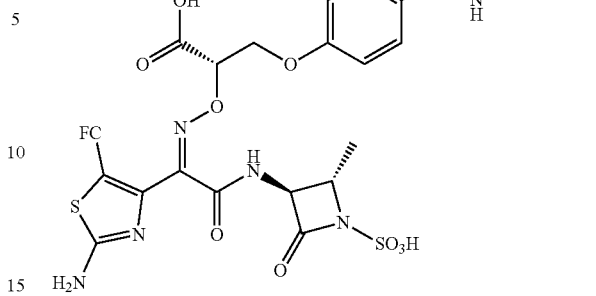

and the salts thereof, the solvates thereof and the solvates of the salts thereof.

The non-limiting examples of the compounds of the present invention are:

(S)-2-((((Z)-1-(2-amino-5-(trifluoromethyl)thiazol-4-yl)-2-(((2S,3 S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid ((S)-2-((((Z)-1-(2-amino-5-ethylthiazol-4-yl)-2-(((2S,3S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-methylthiazol-4-yl)-2-(((S)-2,2-dimethyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-ethylthiazol-4-yl)-2-(((S)-2,2-dimethyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(difluoro-$\lambda^3$-methyl)thiazol-4-yl)-2-(((2R,3S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(fluoro-$\lambda^2$-methyl)thiazol-4-yl)-2-(((2S,3S)-2-methyl-4-oxo-1-sulfoazetidin-3-yl)amino)-2-oxoethylidene)amino)oxy)-3-(4-(N-(2-aminoethyl)carbamimidoyl)phenoxy)propanoic acid (S)-2-((((Z)-1-(2-amino-5-(fluoro-$\lambda^2$-methyl)thiazol-4-yl)-2-(((2R,3S)-2-methyl-4-oxo-1-sulfoazetidin-3-yl)

amino)-2-oxoethylidene)amino)oxy)-3-(4-(N-(2-amino-ethyl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-(piperidin-4-yl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-((R)-piperidin-3-yl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-((S)-piperidin-3-yl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-(azetidin-3-yl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-((R)-pyrrolidin-3-yl)carbamimidoyl)phenoxy)propanoic acid (S)-2-((((Z)-1-(2-amino-5-methylthiazol-4-yl)-2-(((S)-2,2-dimethyl-4-oxo-1-(sulfooxy)azetidin-3-yl)amino)-2-oxo-ethylidene)amino)oxy)-3-(4-(N-((S)-pyrrolidin-3-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-(piperidin-4-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-((R)-piperidin-3-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-((S)-piperidin-3-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-(azetidin-3-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-((R)-pyrrolidin-3-yl)carbamimidoyl)phenoxy)propanoic acid (S)-2-((((Z)-1-(2-amino-5-methylthiazol-4-yl)-2-(((2S,3S)-2-methyl-4-oxo-1-sulfoazetidin-3-yl)amino)-2-oxoethyl-idene)amino)oxy)-3-(4-(N-((S)-pyrrolidin-3-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-(piperidin-4-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-((R)-piperidin-3-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-((S)-piperidin-3-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-(azetidin-3-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-((S)-pyrrolidin-3-yl)carbamimidoyl)phenoxy)propanoic acid (S)-2-((((Z)-1-(2-amino-5-methylthiazol-4-yl)-2-(((2R,3S)-2-methyl-4-oxo-1-sulfoazetidin-3-yl)amino)-2-oxo-ethylidene)amino)oxy)-3-(4-(N-((R)-pyrrolidin-3-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-(piperidin-4-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-((R)-piperidin-3-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-((S)-piperidin-3-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-(azetidin-3-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-((R)-pyrrolidin-3-yl)carbamimidoyl)phenoxy)propanoic acid (S)-2-((((Z)-1-(2-amino-5-ethylthiazol-4-yl)-2-(((2S,3S)-2-methyl-4-oxo-1-sulfoazetidin-3-yl)amino)-2-oxoethyl-idene)amino)oxy)-3-(4-(N-((S)-pyrrolidin-3-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-(piperidin-4-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-((R)-piperidin-3-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-((S)-piperidin-3-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-(azetidin-3-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-((R)-pyrrolidin-3-yl)carbamimidoyl)phenoxy)propanoic acid (S)-2-((((Z)-1-(2-amino-5-ethylthiazol-4-yl)-2-(((S)-2,2-di-methyl-4-oxo-1-(sulfooxy)azetidin-3-yl)amino)-2-oxo-ethylidene)amino)oxy)-3-(4-(N-((S)-pyrrolidin-3-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)

amino)-2-oxoethylidene)amino)oxy)-3-(4-(N-((S)-piperidin-3-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(trifluoromethyl)thiazol-4-yl)-2-(((2S,3S)-2-methyl-4-oxo-1-sulfoazetidin-3-yl)amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(trifluoromethyl)thiazol-4-yl)-2-(((2R,3 S)-2-methyl-4-oxo-1-sulfoazetidin-3-yl)amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(difluoro-$\lambda^3$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(difluoro-$\lambda^3$-methyl)thiazol-4-yl)-2-(((2S,3S)-2-methyl-4-oxo-1-sulfoazetidin-3-yl)amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(fluoro-$\lambda^2$-methyl)thiazol-4-yl)-2-(((S)-2,2-dimethyl-4-oxo-1-(sulfooxy)azetidin-3-yl)

amino)-2-oxoethylidene)amino)oxy)-3-(4-(N-((S)-pyrrolidin-3-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-(piperidin-4-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-((R)-piperidin-3-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-((S)-piperidin-3-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-(azetidin-3-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid (S)-2-((((Z)-1-(2-amino-5-(fluoro-λ²-methyl)thiazol-4-yl)-2-(((2S,3S)-2-methyl-4-oxo-1-sulfoazetidin-3-yl)amino)-2-oxoethylidene)amino)oxy)-3-(4-(N-((S)-pyrrolidin-3-yl)carbamimidoyl)phenoxy)propanoic acid The present invention also relates to methods for the preparation of compounds of formula (I). The compounds of the present invention may be prepared by removing the protecting group from compounds of formula (II)

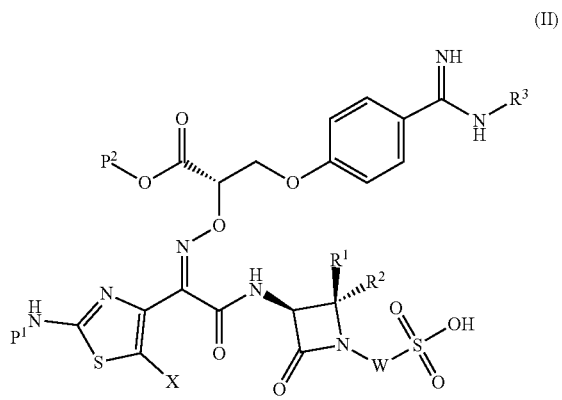
(II)

in which $P^1$ and $P^2$ represent independently a protecting group and $R^1$, $R^2$, $R^3$, W and X are defined as above, under acidic conditions.

Acidic conditions may involve treating the compounds of formula (II) with trifluoroacetic acid, formic acid, acetic acid, or hydrochloric acid at temperatures ranging from 0° C. to room temperature for a time ranging from several minutes to hours, preferably with 90% formic acid or trifluoroacetic acid at a temperature of 0° C.-60° C. for 30-60 min.

Compounds of formula (II) can be synthesized by reacting compounds of formula (III)

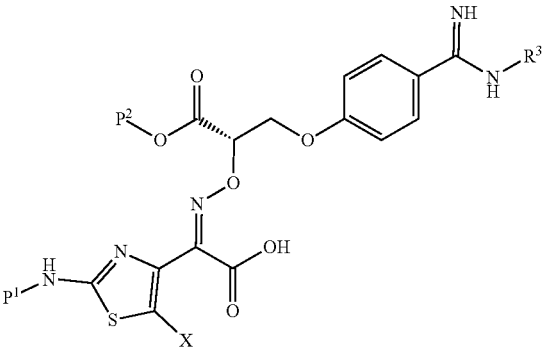
(III)

in which $P^1$ and $P^2$ represent independently a protecting group and $R^3$ and X are defined as above, with compounds of formula (IV)

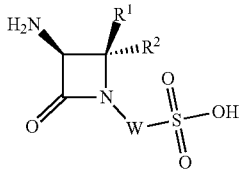
(IV)

in which $R^1$, $R^2$ and W are as defined above.

The reaction generally takes place in inert solvents in the presence of a coupling reagent and where applicable with addition of a base at a temperature ranging from −20° C. to 80° C. for 1-24 hours, preferably at a temperature of 20° C.-30° C. overnight. Inert solvents are for example N,N-dimethylformamide (DMF), N,N-dimethylacetamide (DMA), N-methylpyrrolidin-2-one (NMP), dichloromethane (DCM), tetrahydrofuran (THF), 1,4-dioxane, acetonitrile as well as mixtures of the aforementioned solvents. A preferred solvent is N,N-dimethylformamide.

Suitable coupling reagents are for example 1,2-oxazolium compounds such as 2-ethyl-5-phenyl-1,2-oxazolium-3-sulfate or 2-tert.-butyl-5-methyl-isoxazo-liumperchlorate, or carbonyl compounds such as carbonyldiimidazole (CDI), or acylamino compounds such as 2-ethoxy-1-ethoxycarbonyl-1,2-dihydrochinoline, or propanphosphonic acid anhydride, or isobutylchloroformate, or bis-(2-oxo-3-oxa-zolidinyl)-phosphorylchloride, or O-(benzotriazol-1-yl)-N,N,N',N'-tetramethyluro-niumhexafluorophosphate (HBTU), 2-(2-oxo-1-(2H)-pyridyl)-1,1,3,3-tetramethyl-uroniumtetrafluoroborate (TPTU) or O-(7-azabenzotriazol-1-yl)-N,N,N',N'-tetramethyluroniumhexafluorophosphate (HATU), or 1-hydroxybenzotriazole (HOBt), or benzotriazol-1-yloxytris(dimethylamino)-phosphoniumhexafluorophosphate (BOP), or benzotriazol-1-yloxytris(pyrrolidino)-phosphoniumhexafluorophosphate (PyBOP), or carbodiimides such as N,N'-diethyl-, N,N'-dipropyl-, N,N'-diisopropyl-, N,N'-dicyclohexylcarbodiimide (DCC), N-(3-dimethylaminoisopropyl)-N-ethylcarbo-diimid-hydrochloride (EDC), N-cyclohexylcarbodiimid-N'-propyloxymethyl-polystyrole (PS-Carbodiimide) or N-hydroxysuccinimide as well as mixtures of the above mentioned coupling reagents with or without the addition of base. In the certain case both inorganic and organic bases may be used. Suitable bases are for example carbonates and bicarbonates, triethylamine, diisopropylethylamine, N-methylmorpholine, N-methylpiperidine or 4-dimethylaminopyridine. Preferably, reactions are carried out with a mixture of a carbodiimide and 1-hydroxybenzotriazole with or without the addition of sodium bicarbonate as base.

Compounds of formula (III) can be prepared by reacting compounds of formula (V)

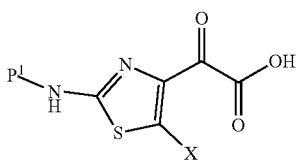

in which $P^1$ represents a protecting group, and X is as defined above,
with compounds of formula (VI)

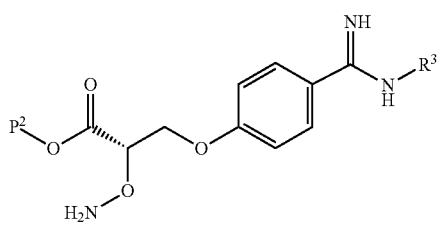

in which $P^2$ represents a protecting group, and $R^3$ is defined as above.

The reaction generally takes place in protic solvents or in solvent mixtures containing at least one protic solvent at a temperature ranging from 0° C. to 100° C. for 1-24 hours. Suitable protic solvents are for example methanol, ethanol, iso-propanol. Solvents suitable to form mixtures are for example dichloromethane, trichloromethane, tetrahydrofuran, 1,4-dioxane, acetonitrile and N,N-dimethylformamide. Preferably, the reaction is carried out in a mixture of anhydrous ethanol and chloroform at 20-30° C. overnight.

The compounds of the invention show a valuable range of pharmacological effects which could not have been predicted.

They are therefore suitable for use as medicaments for the treatment and/or prophylaxis of diseases in humans and animals.

The compounds of the present invention are distinguished in particular by an advantageous range of antibacterial effects.

The present invention further relates to the use of the compounds of the invention for the treatment and/or prophylaxis of diseases caused by bacteria, especially Gram-negative bacteria.

The present invention further relates to the use of the compounds of the invention for the treatment and/or prophylaxis of diseases, especially of diseases mentioned below.

The present invention further relates to the use of the compounds of the invention for the manufacture of a medicament for the treatment and/or prophylaxis of diseases, especially of bacterial infections and in particular diseases mentioned below.

The present invention further relates to a method for the treatment and/or prophylaxis of diseases, especially of bacterial infections and in particular diseases mentioned below, using a therapeutically effective amount of the compounds of the invention.

The compounds of the invention exhibit an antibacterial spectrum against Gram-negative bacteria and selected Gram-positive bacteria combined with low toxicity. Compounds of this invention are particularly useful in human and veterinary medicine for the prophylaxis and treatment of local and systemic infections which are caused for example by the following pathogens or by mixtures of the following pathogens:

Aerobic Gram-positive bacteria: including but not limited to *Streptococcus* spp. (*S. pneumoniae*, *S. pyogenes*, *S. agalactiae*, *Streptococcus* group C and G), *Staphylococcus* spp. (*S. aureus*) as well as *Bacillus* spp. and *Listeria monocytogenes*.

Aerobic Gram-negative bacteria: Enterobacteriaceae, including but not limited to *Escherichia* spp. (*E. coli*), *Klebsiella* spp. (*K. pneumoniae*, *K. oxytoca*), *Citrobacter* spp. (*C. freundii*, *C. diversus*), *Morganella morganii*, *Hafnia alvei*, *Serratia* spp. (*S. marcescens*), *Enterobacter* spp. (*E. cloacae*, *E. aerogenes*), *Proteus* spp. (*P. mirabilis*, *P. vulgaris*, *P. penneri*), *Providencia* spp. (*P. stuartii*, *P. rettgeri*), *Yersinia* spp. (*Y. enterocolitica*, *Y. pseudotuberculosis*) *Salmonella* spp., *Shigella* spp. and also non-fermenters including but not limited to *Pseudomonas* spp. (*P. aeruginosa*), *Burkholderia* spp. (*B. cepacia*), *Stenotrophomonas maltophilia*, and *Acinetobacter* spp. (*A. baumannii*, *Acinetobacter* gen. sp. 13TU, *Acinetobacter* gen. sp. 3) as well as *Bordetella* spp. (*B. bronchiseptica*), *Moraxella catarrhalis* and *Legionella pneumophila*; furthermore, *Aeromonas* spp., *Haemophilus* spp. (*H. influenzae*), *Neisseria* spp. (*N. gonorrhoeae*, *N. meningitidis*) as well as *Alcaligenes* spp. (including *A. xylosoxidans*), *Helicobacter pylori*, *Vibro* spp. (*V. cholerae*), *Campylobacter jejuni* and. *Pasteurella* spp. (*P. multocida*).

Moreover, the antibacterial spectrum comprises also strictly anaerobic bacteria including but not limited to *Peptostreptococcus* spp. (*P. anaerobius*), *Bacteroides* spp. (*B. fragilis*), *Prevotella* spp., *Brucella* spp. (*B. abortus*), *Clostridium* spp. (*Clostridium perfringens*) and *Porphyromonas* spp., The above listing of pathogens is merely exemplary and in no way to be regarded as limiting. Examples of diseases which may be caused by the said pathogens and which may be prevented, improved or cured by the compounds according to the invention are, for example:

Respiratory tract infections such as lower respiratory tract infections, lung infection in cystic fibrosis patients, acute exacerbation of chronic bronchitis, community acquired pneumoniae (CAP), nosocomial pneumonia (including ventilator-associated pneumonia (VAP)), diseases of the upper airways, diffuse panbronchiolitis, tonsillitis, pharyngitis, acute sinusitis and otitis including mastoiditis; urinary tract and genital infections for example cystitis, uretritis, pyolonephritis, endometritis, prostatitis, salpingitis and epididymitis; ocular infections such as conjunctivitis, corneal ulcer, iridocyclitis and post-operative infection in radial keratotomy surgery patients; blood infections, for example septicaemia; infections of the skin and soft tissues, for example infective dermatitis, infected wounds, infected burns, phlegmon, folliculitis and impetigo; bone and joint infections such as osteomyelitis and septic arthritis, gastrointestinal infections, for example dysentery, enteritis, colitis, necrotising enterocolitis and anorectal infections; intraabdominal infections such as typhoid fever, infectious diarrhea, peritonitis with appendicitis, pelviperitonitis, and intra-abdominal abscesses; infections in the oral region for example infections after dental operations; other infections for example, meliodosis, infectious endocarditis, hepatic abscesses, cholecystitis, cholangitis, mastitis as well as meningitis and infections of the nervous systems.

In addition to humans, bacterial infections can also be treated in animals, such as horse, primates, pigs, ruminants (sheep, cow, goat), dog, cat, poultry (such as hen, turkey, quail, pigeon, ornamental birds) as well as productive and ornamental fish, amphibians and reptiles.

The compounds of the invention may act systemically and/or locally. For this purpose, they can be administered in a suitable way, such as, for example, parenterally, pulmonarily, nasally, sublingually, lingually, buccally, rectally, dermally, transdermally, conjunctivally, otically or as an implant or stent.

For these administration routes the compounds of the invention can be administered in suitable administration forms.

Parenteral administration can take place with an absorption step (e.g. intramuscular, subcutaneous, intracutaneous, percutaneous, or intraperitoneal) or avoidance of an absorption step (e.g. intravenous, intraarterial, intracardiac, intraspinal or intralumbar). Administration forms suitable for parenteral administration are, inter alia, preparations for injection and infusion in the form of solutions, suspensions, emulsions, sterile powders or lyophilizates.

Suitable for the other administration routes are, for example, pharmaceutical forms for inhalation (inter alia powder inhalers, nebulizers), solutions, nasal drops, sprays; tablets, films/wafers or capsules, for lingual, sublingual or buccal administration, suppositories, preparations for ears or eyes, vaginal capsules, aqueous suspensions (lotions, shaking mixtures), ointments, creams, lipophilic suspensions, transdermal therapeutic systems (such as for example patches), pastes, milk, foams, dusting powders, stents or implants.

The compounds of the invention can be converted into the stated administration forms. This can take place in a manner known per se by mixing with inert, non-toxic, pharmaceutically acceptable excipients. These excipients include inter alia carriers (for example microcrystalline cellulose, lactose, mannitol), emulsifiers and dispersants or wetting agents (for example sodium dodecyl sulfate, polyoxysorbitan oleate), solvents (e.g. liquid polyethylene glycols), binders (for example polyvinylpyrrolidone), synthetic and natural polymers (for example albumin), colors (e.g. inorganic pigments such as, for example, iron oxides), stabilizers (e.g. antioxidants such as, for example, ascorbic acid), and odor corrigents and/or taste.

The present invention further relates to medicaments which comprise at least one compound of the invention, usually together with one or more inert, non-toxic, pharmaceutically acceptable excipients, as well as to their use for the aforementioned purposes.

The present invention further relates to medicaments which comprise at least one compound of the invention in combination with at least one β-lactamase inhibitor, as well as to their use for the aforementioned purposes.

Examples for the further active compound include β-lactamase inhibitors.

Examples for suitable β-lactamase inhibitors to be used in combination with the compounds of the invention include clavulanic acid, tazobactam, sulbactam, avibactam, relebactam, vaborbactam.

The minimum amount of the compounds of the invention to be administered is a therapeutically effective amount. The term "therapeutically effective amount" means the amount of compound which prevents the onset of, alleviates the symptoms of, stops the progression of, and/or eliminates a bacterial infection in humans or animals.

Typically, an effective dosing schedule of the compounds of the invention for adults is about 50 mg to about 3000 mg of a compound of formula (I) in a single dose; in another embodiment, an effective single dose is about 100 mg to about 2000 mg. In another embodiment, an effective single dose is about 500 mg to about 1200 mg.

Typically the dosages are given 1 to 4 times per day. In one embodiment, the dosages are given 3 times per day. In some cases, it may be necessary to use dosages outside these limits.

It may nevertheless be necessary where appropriate to deviate from the stated amounts, in particular as a function of body weight, administration route, individual response to the active ingredient, type of preparation and time or interval over which administration takes place. Thus, in some cases it may be sufficient to make do with less than the aforementioned minimum amount, whereas in other cases the upper limit mentioned must be exceeded. In the case of an administration of larger amounts, it may be advisable to distribute these in a plurality of single doses over the day.

The percentage data in the following tests and examples are, unless indicated otherwise, percentages by weight; parts are parts by weight. Solvent ratios, dilution ratios and concentration data of liquid/liquid solutions are based in each case on volume. The statement "w/v" means "weight/volume". Thus, for example, "10% w/v" means: 100 ml of solution or suspension contain 10 g of substance.

EXAMPLES

Abbreviations

NMR: nuclear magnetic resonance
δ: chemical shift in ppm
br s: broard singlet in NMR
CDCl$_3$: deuterated chloroform
DMSO-d$_6$: deuterated N,N-dimethylformamide
CD$_3$OD: deuterated methanol
D$_2$O: deuterated water
Hz: hertz
MHz: megahertz
J: coupling constant in NMR
d: doublet in NMR
dd: doublet of doublet in NMR
q: quartet in NMR
s: singlet in NMR
t: triplet in NMR
m: multiplet in NMR
TMS: tetramethylsilane
DCM: dichloromethane
DMF: N,N-dimethylformamide
DMSO: dimethyl sulfoxide
EtOAc: ethyl acetate
t-BuOH: tert-butyl alcohol
TFA: trifluoroacetic acid
THF: tetrahydrofuran
PE: petroleum ether
DCC: N,N'-dicyclohexylcarbodiimide
HOBt: 1-hydroxybenzotriazole
TMEAD: tetramethylethylenediamine
TLC: thin layer chromatography MS: mass spectrometry ES⁻: negative ion mode in electrospray ionization mass spectrometry ES⁺: positive ion mode in electrospray ionization mass spectrometry HPLC: high performance liquid chromatography L: liter (s)

M: molarity mg: milligram (s)

min: minute (s)

mL: milliliter (s)

mmol: millimole (s)

mol: mole (s)

g: gram (s)

h: hour (s)

N: normality

Analytical Methods

All $^1$H and $^{19}$F NMR spectra were recorded on a Bruker AVANCE NEO 400 NMR operating at 400 MHz for $^1$H, and 376 MHz for $^{19}$F respectively. NMR data is recorded in chemical shifts relative to tetramethylsilane (TMS) as internal standard. NMR spectra were run either in CDCl$_3$ containing 0.05% TMS, CD$_3$OD containing 0.05% TMS, D$_2$O or DMSO-d$_6$ containing 0.03% TMS.

Preparative HPLC was performed on a Agilent 1260 Infinity II System on Agilent 10 prep-C18 250×21.2 mm column, using an acetonitrile/aqueous 0.1% trifluoroacetic acid gradient, or an acetonitrile/aqueous 0.1% formic acid gradient at 22° C.

Mass spectra were recorded on a Agilent 1260 Infinity II System using either ES⁻ or ES⁺ ionization modes.

Column chromatography was performed using Qingdao Inc. Silica Gel: CC Grade (230-400 Mesh).

Commercial solvents and reagents were generally used without further purification. All products were dried before characterization and use in subsequent synthetic steps.

General Synthetic Methods

1. Synthesis of the β-Lactam Building Blocks (BB-1)

1.1 (3S)-3-Amino-4,4-dimethyl-1-(sulfooxy)azetidin-2-one (1_1)

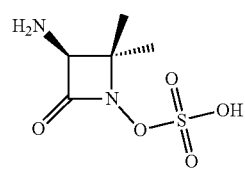

Compound 1_1 was synthesized according to WO2013110643A1.

H$^1$ NMR (400 MHz, DMSO-d$_6$): δ 1.42 (s, 3H), 1.43 (s, 3H), 4.15 (s, 1H), 8.80 (br. s, 2H).

1.2 (3S,4S)-3-Amino-4-methyl-2-oxoazetidine-1-sulfonic acid (1_2)

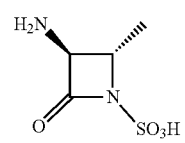

Compound 1_2 was synthesized according to David M. Floyd, Alan W. Fritz, Josip Pluscec, Eugene R. Weaver, Christopher M. Cimarusti J. Org. Chem., 1982, 47 (26), 5160-5167.

H$^1$ NMR (400 MHz, DMSO-d$_6$): 31.39 (d, J=6.2 Hz, 3H), 3.75-3.81 (m, 1H), 4.00 (d, J=4.0 Hz, 1H), 8.66 (br. s, 3H).

2. Synthesis of Amino-Thiazole Blocks (BB-2)

2.1 2-(2-((tert-Butoxycarbonyl)amino)-5-methylthiazol-4-yl)-2-oxoacetic acid (2_1)

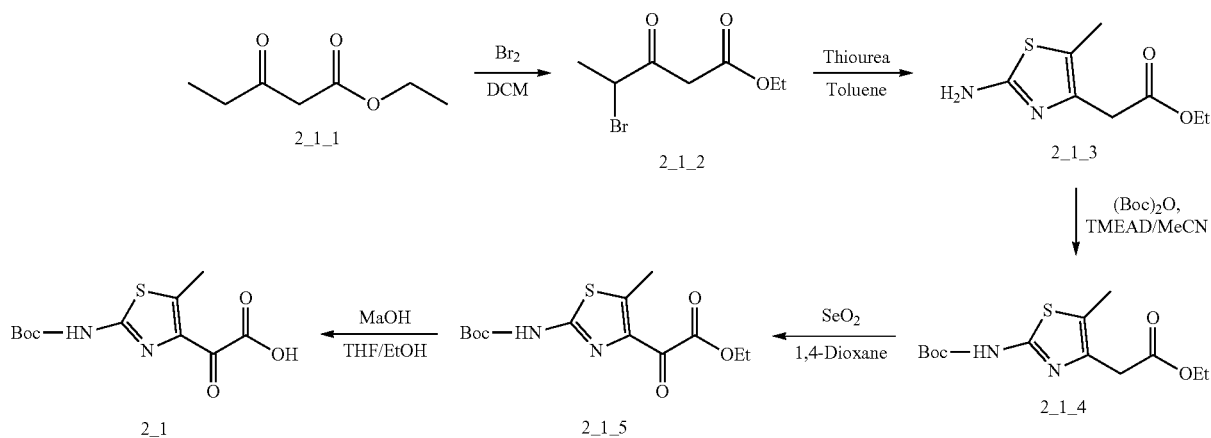

To a stirred solution of 2_1_1 (3 g, 20.8 mmol) in dry CH₂Cl₂ (20 mL) at 0° C., bromine (1.1 mL, 20.8 mmol) was added drop by drop. The reaction mixture was then run overnight from 0° C. to room temperature. The reaction was quenched with saturated Na₂CO₃ solution and stirred for 15 minutes, the reaction mixture was extracted with CH₂Cl₂. The organic phase was washed by brine, and dried over Na₂SO₄, and then evaporated and chromatographed on silica gel to give a mixture of the desired product 2_1_2 (1.95 g, 65%) as an oily form.

¹H NMR (400 MHz, DMSO-d₆): δ 1.20 (t, J=7.1 Hz, 3H), 1.66 (d, J=6.7 Hz, 3H), 4.11 (q, J=7.1 Hz, 1H), 4.88 (q, J=6.7 Hz, 2H), 5.43 (s, 1H), 11.84 (s, 1H).

To a stirred solution of 2_1_2 (1.2 g, 5.4 mmol) in toluene (8 mL) at room temperature, thiourea (0.82 g, 10.8 mmol) was added. The reaction mixture was then refluxed for 3 hours. The solvent was removed and diluted with DCM, and then saturated Na₂CO₃ solution was added, the reaction mixture was vigorously stirred for 15 minutes. The organic layer was separated and dried over Na₂SO₄. The residue was then recrystallized from CH₂Cl₂ and hexanes to give the desired product 2_1_3 (1.1 g, 87%) as white crystals.

¹H NMR (400 MHz, DMSO-d₆): δ 1.17 (t, J=7.1 Hz, 3H), 2.12 (s, 3H), 3.83 (s, 2H), 4.05 (q, J=7.1 Hz, 3H), 6.69 (s, 2H).

To a stirred solution of 2_1_3 (0.69 g, 3.45 mmol) in MeCN (15 mL), di-tert-butyl dicarbonate (1.28 g, 5.86 mmol) and N,N,N',N'-tetramethylethylenediamine (TMEAD, 0.8 g, 6.89 mmol) were added at room temperature. The reaction mixture was warmed at 50° C. After consuming the reaction mixture for 8 hours, it was observed that no starting material remained on TLC. The reaction was then diluted with EtOAc and washed with water for three times, brine and dried over Na₂SO₄. The organic phase was concentrated and chromatographed on silica gel to obtain the desired product 2_1_4 (0.46 g, 66%) as a yellow solid.

¹H NMR (400 MHz, DMSO-d₆): δ 1.17 (t, J=7.1 Hz, 3H), 1.46 (s, 9H), 2.23 (s, 3H), 3.56 (s, 2H), 4.05 (q, J=7.1 Hz, 2H), 11.24 (s, 1H).

To a stirred solution of 2_14 (4.6 g, 15.32 mmol) in 20 mL of 1,4-dioxane, SeO₂ (3.4 g, 30.63 mmol) was added at room temperature. The reaction mixture was then refluxed at 105° C. for 24 hours. The reaction mixture was filtered on silica gel pad and the solvent was then evaporated under reduced pressure to give a residue. The residue was chromatographed on silica gel to produce the desired product 2_1_5 (1.5 g, 33%) as a yellow amorphous form.

¹H NMR (400 MHz, DMSO-d₆): δ 1.29 (t, J=7.1 Hz, 3H), 1.47 (s, 9H), 2.66 (s, 3H), 4.32 (q, J=7.1 Hz, 2H), 11.74 (s, 1H).

To a stirred solution of 2_1_5 (1.6 g, 5.09 mmol) in 8 mL of THF and 8 mL of EtOH, NaOH (1 N, 7.63 mL) was added at 0° C. and stirred at same temperature for 6 hours. The reaction mixture was concentrated, cooled to 0° C., acidified to pH~4 by 1 N HCl to give a pricipitate, which was collected by filtration and dried to give the desired product 2_1 (1.3 g, 85%) as a white solid.

¹H NMR (400 MHz, DMSO-d₆): δ 1.46 (s, 9H), 2.61 (s, 3H), 11.70 (s, 1H).

2.2 2-(2-((tert-Butoxycarbonyl)amino)-5-(trifluoromethyl)thiazol-4-yl)-2-oxoacetic acid (2_2)

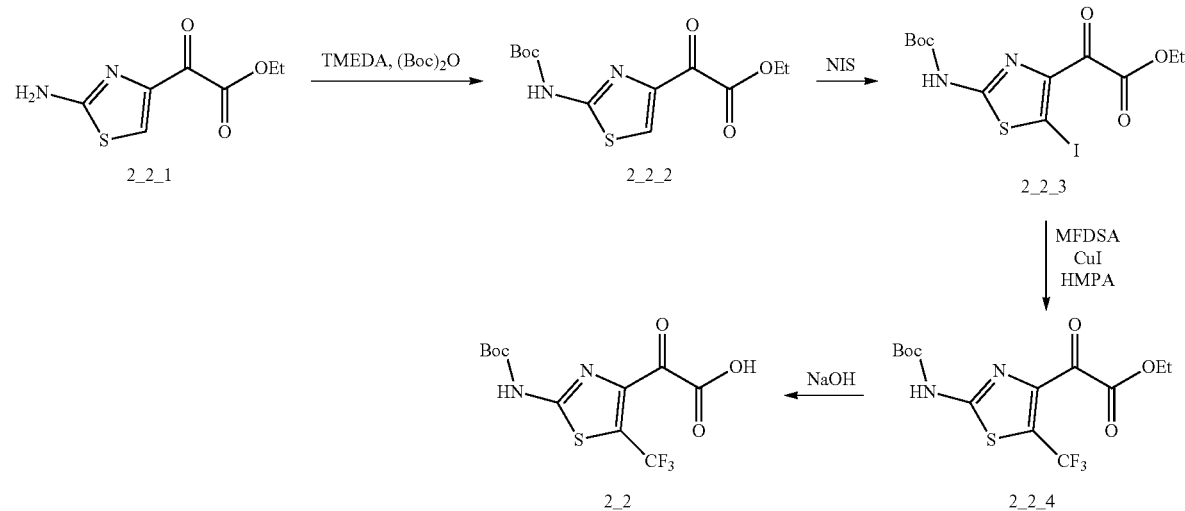

A mixture of 2_2_1 (10.0 g, 50 mmol), (Boc)₂O (12.0 g, 55 mmol) and N,N,N',N'-tetramethylethylenediamine (TMEDA, 6.4 g, 55 mmol) in dimethyl carbonate (50 mL) was heated at 40° C. for 14 hours. It was concentrated to give a residue, which was purified by chromatography on silica gel eluting with EtOAc and petroleum ether to give the desired compound 2_2_2 (4.95 g, 33%) as a yellow solid.

¹H NMR (400 MHz, CDCl₃): δ 1.34 (t, J=7.2 Hz, 3H), 1.45 (s, 9H), 4.35 (q, J=7.2 Hz, 2H), 8.20 (s, 1H), 8.96 (br s, 1H).

A mixture of 2_2_2 (2 g, 6.66 mmol) in DMF (10 mL) was added with N-iodosuccinimide (NIS) (4.5 g, 20 mmol) and benzoyl peroxide (0.1 g as catlyst) at room temperature. The reaction mixture was stirred at 80° C. for 6 hours. After reaction completion, the reaction mixture was cooled to room temperature and distilled water was added to quench the reaction. Later, the reaction mixture was treated with Na₂S₂O₃ until the removal of excess of I₂. Subsequently, the reaction mixture was extracted with EtOAc, which was washed with water and finally with brine solution. The organic layer was dried with MgSO₄ and concentrated under vacuo to afford the crude product which was purified by column chromatography using DCM containing 1% MeOH to give the desired compound 2_2_3 (2.76 g, 97%) as a thick liquid.

$^1$H NMR (400 MHz, CDCl$_3$): δ 1.31 (t, J=7.2 Hz, 3H), 1.45 (s, 9H), 4.33 (q, J=7.2 Hz, 2H), 8.17 (br s, 1H).

The compound 2_2_3 (0.97 g, 2.28 mmol) was dissolved in a mixture of DMF and hexamethylphosphoric triamide (HMPA) (8:1, 6 mL) taken in a microwave glass vial. To this solution, CuI (0.087 g, 0.45 mmol) and methyl 2,2-difluoro-2-(fluorosulfonyl) acetate (MFDSA, 0.87 g, 4.56 mmol) was added. The glass vial was sealed and irradiated under microwave at 100° C. for 6 minutes. The reaction mixture was diluted with EtOAc and washed with water. The organic layer was separated, dried with MgSO$_4$ and evaporated under reduced pressure. The crude product was purified with DCM to furnish the desired compound 2_2_4 (0.44 g, 52%) as a slightly yellow solid.

$^1$H NMR (400 MHz, CDCl$_3$): δ 1.31 (t, J=7.2 Hz, 3H), 1.46 (s, 9H), 4.32 (q, J=7.2 Hz, 2H), 8.12 (br s, 1H). $^{19}$F NMR (376 MHz, CDCl$_3$): δ −53.4 (s, 3F).

1 N NaOH solution (0.94 mL) was added to a solution of 2_2_4 (0.138 g, 0.375 mmol) in THF (2.5 mL) at ° C., and then stirred for 1.5 hour at ° C. It was concentrated under 10° C., and then added 5 mL of water, cooled to ° C., acidified with 1 N HCl to pH~4. The mixture was lyophilized to give a residue, which was extracted with 10% MeOH in DCM (3×20 mL). The organic solution was concentrated to give the title compound 2_2 (63 mg, 53%) as a white solid, which was directly used for next step without further purification.

$^1$H NMR (400 MHz, DMSO-d$_6$): δ 1.48 (s, 9H), 12.30 (s, 1H). $^{19}$F NMR (376 MHz, DMSO-d$_6$): δ −51.1 (s, 3F).

3. Synthesis of Amidine Side Chains Building Blocks (BB-3)

3.1 tert-Butyl (S)-4-(4-(2-(aminooxy)-3-(benzhydryloxy)-3-oxopropoxy)benzimidamido)piperidine-1-carboxylate (3_1_8)

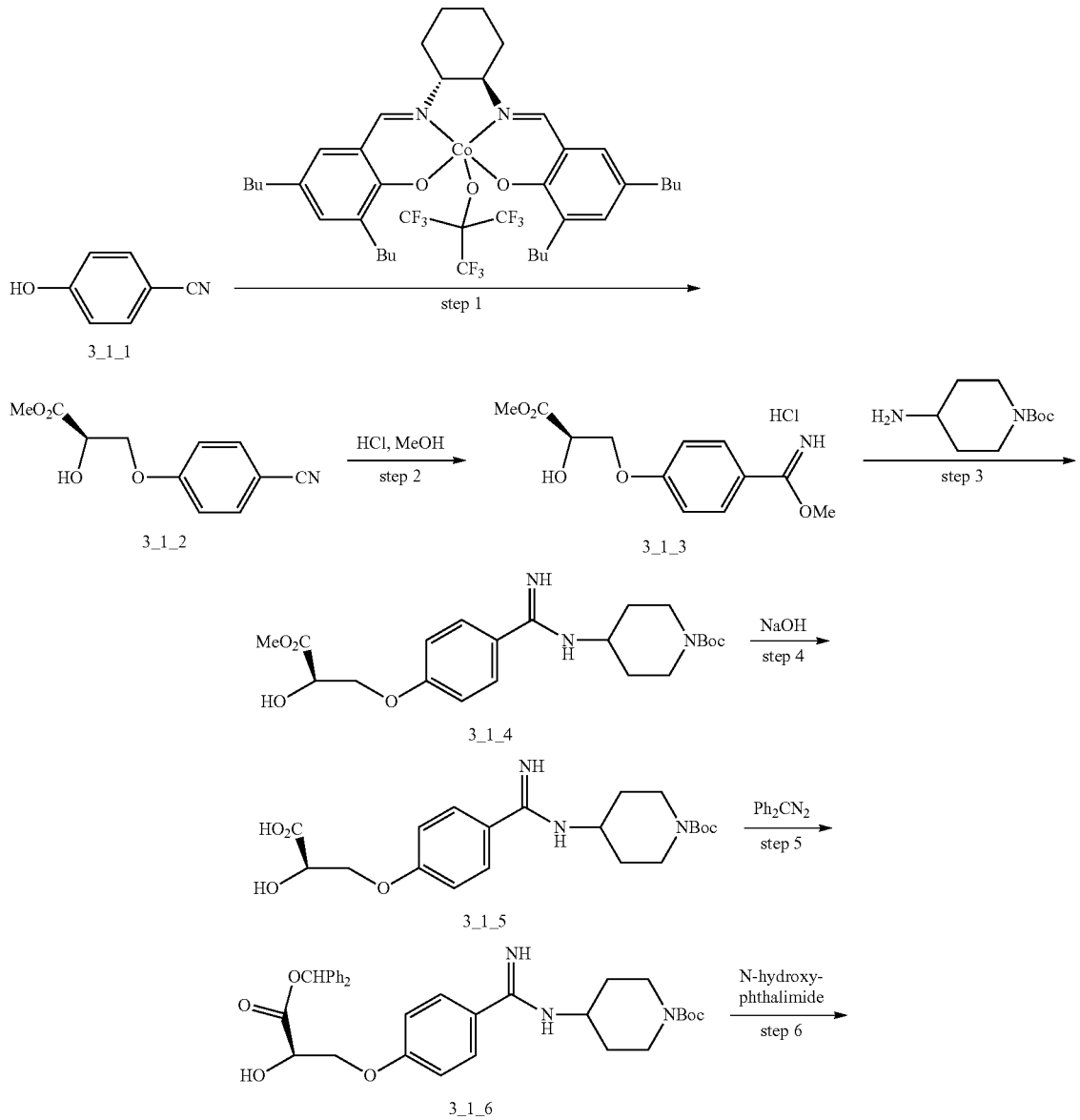

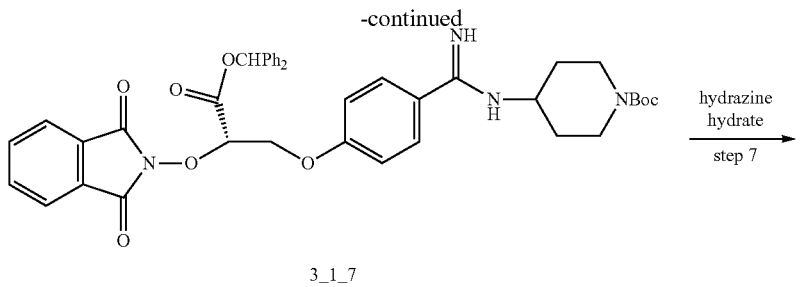

3_1_7

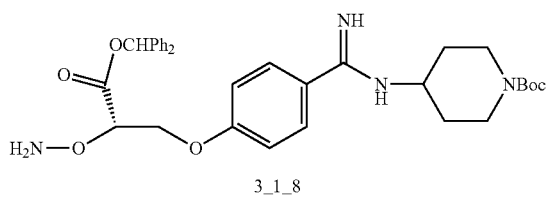

3_1_8

Step 1: Methyl (R)-3-(4-cyanophenoxy)-2-hydroxy-propanoate (312)

Step 2: (R)-2-Hydroxy-3-(4-methoxycarbonimidoyl-phenoxy)-propionic acid methyl ester hydrochloric acid salt (3_1_3)

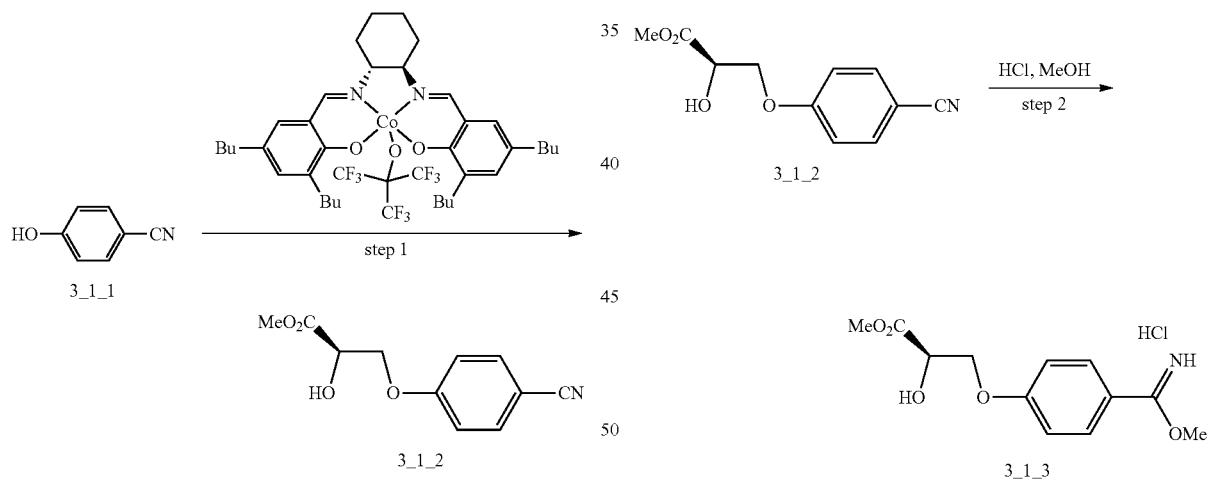

A mixture of a Co(III)-catalyst (7.0 g, 8.4 mmol, ref: J. Am. Chem. Soc. 1999, 121, 6086-6087), and 4 Å molecular sieves (10 g) in tert-butyl methyl ether (50 mL) was treated with methyl (R)-oxirane-2-carboxylate (45.0 g, 441 mmol) and 4-hydroxybenzonitrile 3_1_1 (26.3 g, 220 mmol). The reaction mixture was stirred at room temperature for two days and filtered through a pad of celite. The filtrate was concentrated to give a dark brown residue. The residue was purified by column chromatography to afford compound 3_1_2 (79.0 g, 81%) as a brown oil.

$^1$H NMR (400 MHz, DMSO-$d_6$): δ 3.68 (s, 3H), 4.26 (m, 2H), 4.49 (m, 1H), 5.96 (s, 1H), 7.11 (d, J=8.9 Hz, 2H), 7.77 (d, J=9.0 Hz, 2H).

A mixture of compound 3_1_2 (36.6 g, 165 mmol) in anhydrous methanol (160 mL) was cooled to 0° C. in a sealed vessel. Anhydrous hydrogen chloride gas was bubbled through the solution until the mixture was saturated. The flask was sealed and stirred at 0° C. to room temperature for 18 hours to give a suspension. The solid was collected to give the desired compound 3_1_3 (29 g) after diethyl ether wash. The mother liq. was concentrated to give a suspension again, the solid was collected to give additional desired compound (9.89 g) after diethyl ether wash (totally 38.9 g of desired compound obtained, 81%) as a light green solid.

$^1$HNMR (400 MHz, DMSO-$d_6$): δ 3.66 (s, 3H), 4.24 (s, 3H), 4.27-4.31 (m, 2H), 4.48 (t, J=4.4 Hz, 1H), 7.16 (d, J=9.1 Hz, 2H), 8.09 (d, J=9.1 Hz, 2H).

Step 3: tert-Butyl (R)-4-(4-(2-hydroxy-3-methoxy-3-oxopropoxy)benzimidamido)piperidine-1-carboxylate (3_1_4)

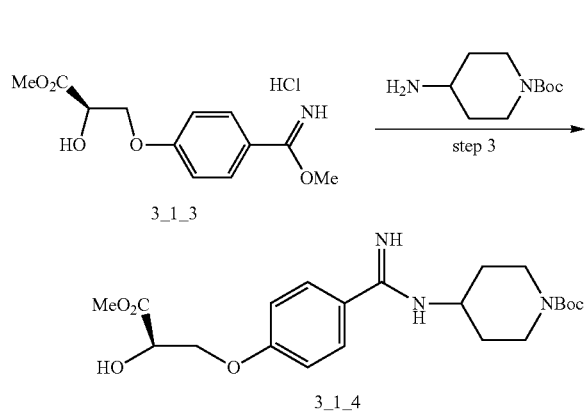

To a mixture of compound 3_1_3 (1.0 g, 3.45 mmol) in anhydrous methanol (3 mL) were added triethylamine (0.38 g, 3.8 mmol) and tert-butyl 4-aminopiperidine-1-carboxylate (0.69 g, 3.45 mmol) at 0° C. and the resulting mixture was stirred at room temperature overnight. The reaction mixture was concentrated to dryness to afford a residue. The residue was purified by column chromatography to afford compound 3_1_4 (1.0 g, 69%) as a white solid.

$^1$HNMR (400 MHz, DMSO-$d_6$): δ 1.38 (s, 9H), 1.54-1.43 (m, 2H), 1.82-1.93 (m, 2H), 2.60-2.90 (m, 2H), 3.64 (s, 3H), 3.90-4.00 (m, 3H), 4.12-4.28 (m, 2H), 4.44-4.50 (m, 1H), 5.98 (s, 1H), 7.22 (d, J=8.8 Hz, 2H), 7.69 (d, J=8.8 Hz, 2H).

Step 4: (R)-3-(4-(N-(1-(tert-Butoxycarbonyl)piperidin-4-yl)carbamimidoyl)phenoxy)-2-hydroxypropanoic acid (3_1_5)

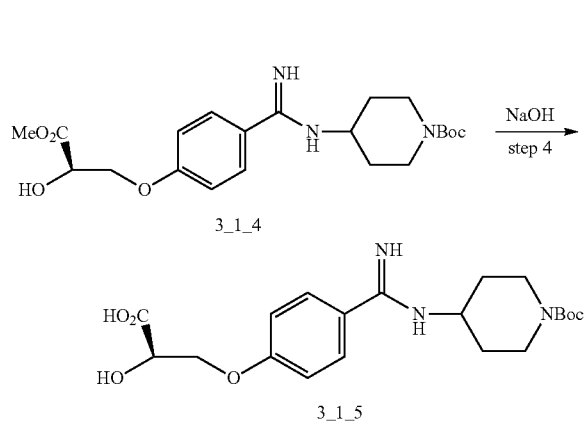

To the solution of compound 3_1_4 (1.0 g, 2.37 mmol) in tetrahydrofuran (2 mL) was added a solution of sodium hydroxide (0.2 g, 4.74 mmol) in water (1 mL) at 0° C., and then stirred at room temperature for 5 hours. Tetrahydrofuran was removed, the reaction mixture was neutralized to pH 5 using 1 N HCl. The mixture was lyophilized to afford crude compound 3_1_5 (0.97 g, containing NaCl salt) as a white solid, which was directly used for next step without further purification.

$^1$H NMR (400 MHz, DMSO-$d_6$): δ1.41 (s, 9H), 1.49 (br s, 2H), 1.92 (br s, 2H), 2.84 (br s, 2H), 3.86 (br s, 1H), 4.00 (br s, 4H), 4.26 (d, J=9.8 Hz, 1H), 7.12 (s, 2H), 7.74 (s, 2H).

Step 5: tert-Butyl (R)-4-(4-(3-(benzhydryloxy)-2-hydroxy-3-oxopropoxy)benzimidamido)piperidine-1-carboxylate (3_1_6)

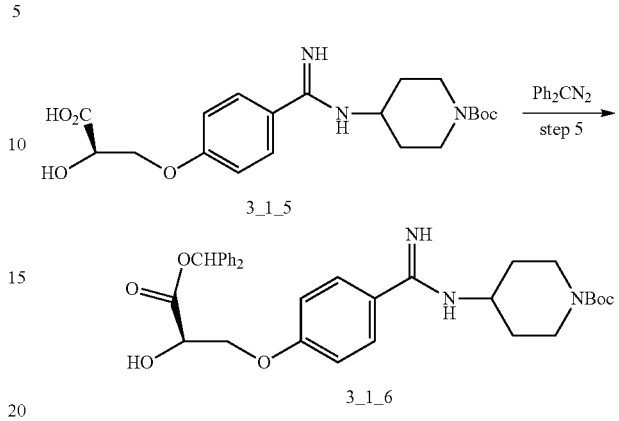

To a solution of compound 3_1_5 (0.97 g, 2.37 mmol) in MeOH (2 mL) was slowly added a solution of diazo(diphenyl)methane ($Ph_2CN_2$, 0.42 g, 3.56 mmol) in DCM (1.5 mL). The resulting mixture was stirred at room temperature overnight and concentrated to dryness. The residue was purified by column chromatography to give product 3_1_6 (1.1 g, 80% in two steps) as a white solid.

$^1$H NMR (400 MHz, DMSO-$d_6$): δ 1.39 (s, 9H), 1.42-1.52 (m, 2H), 1.87-1.92 (m, 2H), 2.82 (br s, 2H), 3.90-4.00 (m, 3H), 4.30-4.42 (m, 2H), 4.62-4.65 (m, 1H), 6.48 (d, J=7.6 Hz, 1H), 6.84 (s, 1H), 7.09 (d, J=8.8 Hz, 2H), 7.22-7.41 (m, 10H), 7.69 (d, J=8.8 Hz, 2H), 9.10 (br s, 1H), 9.38 (br s, 1H). LC-MS analysis: [M+H]$^+$=574.1.

Step 6: tert-Butyl (S)-4-(4-(3-(benzhydryloxy)-2-((1,3-dioxoisoindolin-2-yl)oxy)-3-oxopropoxy)benzimidamido)piperidine-1-carboxylate (3_1_7)

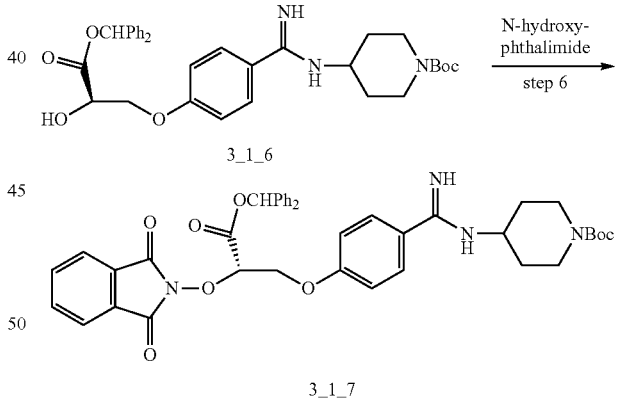

To a solution of compound 3_1_6 (1.2 g, 2.1 mmol), N-hydroxyphthalimide (1.03 g, 6.3 mmol) and triphenylphosphine (1.7 g, 6.3 mmol) in anhydrous tetrahydrofuran (5 mL) was added a solution of diethyl azodicarboxylate (1.09 g, 6.3 mmol) dropwise at 0° C. The resulting mixture was stirred at room temperature overnight. After evaporation of the tetrahydrofuran, the crude product was purified by column chromatography to give the title compound 3_1_7 (1.0 g, 66.7%) as a white solid.

$^1$H NMR (400 MHz, DMSO-$d_6$): δ 1.42 (s, 9H), 1.44-1.53 (m, 2H), 1.92-1.96 (m, 2H), 2.82 (br s, 2H), 3.92-4.16 (m, 3H), 4.68 (br s, 2H), 5.48 (br s, 1H), 6.98 (s, 1H), 7.11 (d, J=8.6 Hz, 2H), 7.26-7.48 (m, 10H), 7.75 (d, J=8.6 Hz, 2H), 7.86 (s, 4H), 9.24 (br s, 1H), 9.40 (br s, 1H). LC-MS analysis: [M+H]$^+$=719.1.

Step 7: tert-Butyl (S)-4-(4-(2-(aminooxy)-3-(benz-hydryloxy)-3-oxopropoxy)benzimidamido)piperi-dine-1-carboxylate (3_1_8)

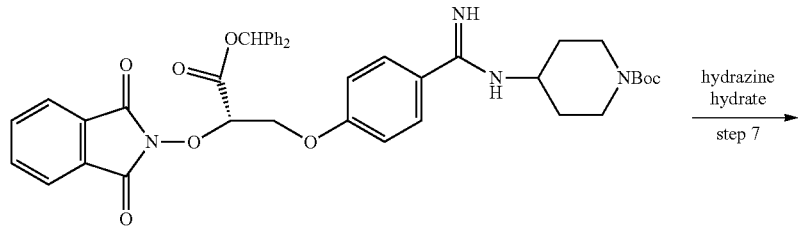

To the solution of compound 3_1_7 (0.33 g, 0.45 mmol) in anhydrous ethanol (5 mL) was added hydrazine monohydrate (23 μL, 0.52 mmol) at 0° C. The resulting mixture was stirred at room temperature for 3.5 hours, filtered off and washed with ethanol (2×5 mL). The filtrate was concentrated to dryness and the residue was suspended with $CH_2Cl_2$ (10 mL), filtered off and rinsed with $CH_2Cl_2$ (2×3 mL). The filtrate was concentrated to give compound 3_1_8 (0.26 g, quant. yield) as a pale yellow foam, which was used for next step without further purification.

$^1$H NMR (400 MHz, DMSO-$d_6$): δ 1.42 (s, 9H), 1.42-1.54 (m, 2H), 1.87-1.97 (m, 2H), 2.72-2.94 (m, 2H), 3.82-4.06 (m, 3H), 4.30-4.49 (m, 2H), 4.60-4.68 (m, 1H), 6.91 (s, 1H), 7.10 (d, J=8.8 Hz, 2H), 7.25-7.47 (m, 10H), 7.71 (d, J=8.8 Hz, 2H), 9.15 (br s, 4H). LC-MS analysis: [M+H]+=589.2.

Following the procedure detailed above under 3.1 but using the different amines shown in the scheme below instead of tert-butyl 4-aminopiperidine-1-carboxylate in step 3 of the synthesis, compounds 3_2_8 to 3_6_8 were prepared.

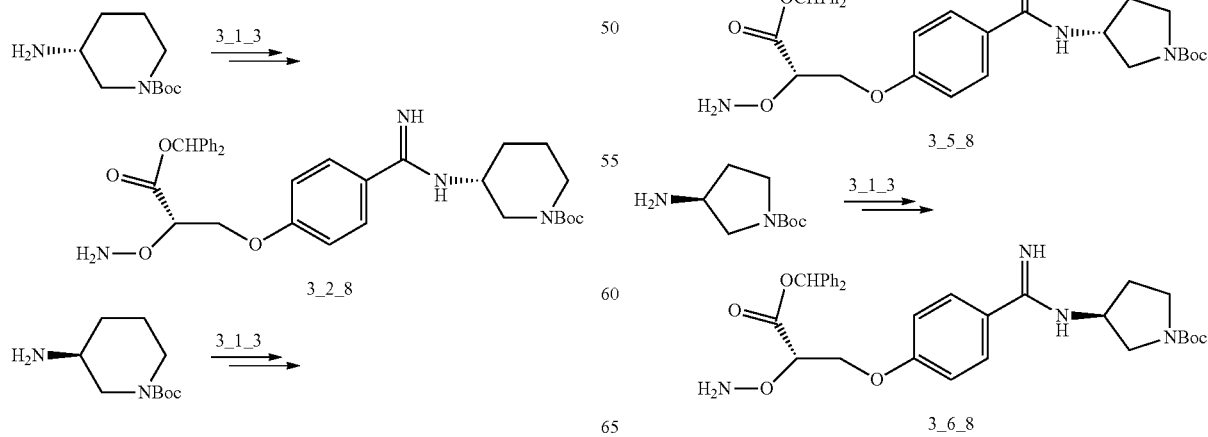

3.2 tert-Butyl (R)-3-(4-((S)-2-(aminooxy)-3-(benzhydryloxy)-3-oxopropoxy)benzimidamido)piperidine-1-carboxylate (3_2_8)

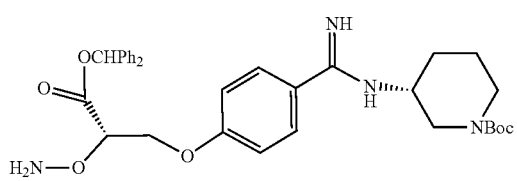

3_2_8

¹H NMR (400 MHz, DMSO-d₆): δ 1.38 (s, 9H), 1.43-1.49 (m, 1H), 1.52-1.60 (m, 1H), 1.72-1.82 (m, 1H), 1.96-2.03 (m, 1H), 2.91-3.04 (m, 1H), 3.33-3.39 (m, 3H), 3.75-3.82 (m, 1H), 4.36-4.47 (m, 2H), 4.62-4.65 (m, 1H), 6.45 (s, 2H), 6.90 (s, 1H), 7.07 (d, J=8.9 Hz, 2H), 7.23-7.32 (m, 4H), 7.33-7.40 (m, 4H), 7.42-7.45 (m, 2H), 7.69 (d, J=8.9 Hz, 2H). LC-MS analysis: [M+H]⁺=589.3.

3.3 tert-Butyl (S)-3-(4-((S)-2-(aminooxy)-3-(benzhydryloxy)-3-oxopropoxy)benzimidamido)piperidine-1-carboxylate (3_3_8)

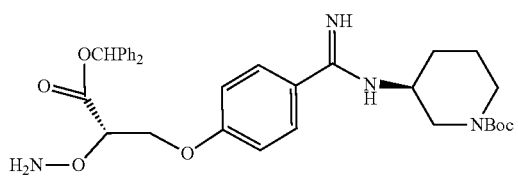

3_3_8

¹H NMR (400 MHz, DMSO-d₆): δ 1.39 (s, 9H), 1.43-1.49 (m, 1H), 1.51-1.61 (m, 1H), 1.74-1.82 (m, 1H), 1.96-2.04 (m, 1H), 2.92-3.04 (m, 1H), 3.40-3.47 (m, 3H), 3.74-3.83 (m, 1H), 4.37-4.44 (m, 2H), 4.64 (t, J=3.9 Hz, 1H), 6.46 (s, 2H), 6.90 (s, 1H), 7.09 (d, J=8.7 Hz, 2H), 7.22-7.32 (m, 4H), 7.33-7.40 (m, 4H), 7.41-7.47 (m, 2H), 7.69 (d, J=8.7 Hz, 2H). LC-MS analysis: [M+H]⁺=589.3.

3.4 tert-Butyl (S)-3-(4-(2-(aminooxy)-3-(benzhydryloxy)-3-oxopropoxy)benzimidamido)azetidine-1-carboxylate (3_4_8)

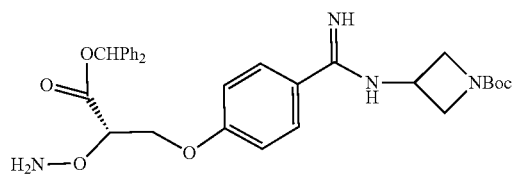

3_4_8

¹H NMR (400 MHz, DMSO-d₆): δ 1.39 (s, 9H), 3.41-3.46 (m, 3H), 3.85-3.92 (m, 2H), 4.18-4.26 (m, 1H), 4.34-4.38 (m, 2H), 4.01-4.45 (m, 1H), 4.61-4.64 (m, 1H), 6.44 (s, 2H), 6.90 (s, 1H), 7.04 (d, J=8.8 Hz, 2H), 7.22-7.31 (m, 4H), 7.33-7.40 (m, 4H), 7.41-7.45 (m, 2H), 7.75 (d, J=8.8 Hz, 2H). LC-MS analysis: [M+H]⁺=561.2.

3.5 tert-Butyl (R)-3-(4-((S)-2-(aminooxy)-3-(benzhydryloxy)-3-oxopropoxy)benzimidamido)pyrrolidine-1-carboxylate (3_5_8)

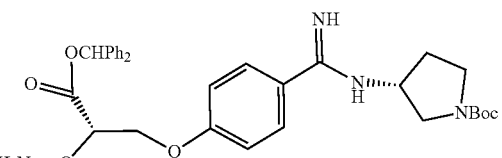

3_5_8

¹H NMR (400 MHz, DMSO-d₆): δ 1.34 (s, 9H), 1.80-1.99 (m, 1H), 2.11-2.18 (m, 1H), 3.33-3.39 (m, 3H), 3.52-3.61 (m, 1H), 4.27-4.39 (m, 3H), 4.54-4.60 (m, 1H), 6.38 (s, 2H), 6.82 (s, 1H), 7.02 (d, J=7.8 Hz, 2H), 7.17-7.24 (m, 4H), 7.26-7.33 (m, 4H), 7.34-7.38 (m, 2H), 7.63 (d, J=7.8 Hz, 2H). LC-MS analysis: [M+H]⁺=575.3.

3.6 tert-Butyl (S)-3-(4-((S)-2-(aminooxy)-3-(benzhydryloxy)-3-oxopropoxy)benzimidamido)pyrrolidine-1-carboxylate (3_6_8)

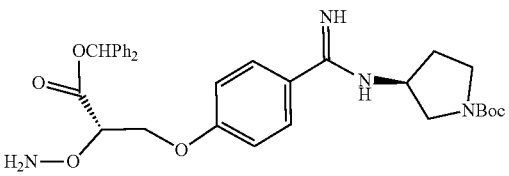

3_6_8

¹H NMR (400 MHz, DMSO-d₆): δ 1.41 (s, 9H), 1.97-2.07 (m, 1H), 2.17-2.27 (m, 1H), 3.40-3.47 (m, 3H), 3.60-3.68 (m, 1H), 4.35-4.47 (m, 3H), 4.62-4.65 (m, 1H), 6.45 (s, 2H), 6.90 (s, 1H), 7.07 (d, J=8.8 Hz, 2H), 7.22-7.32 (m, 4H), 7.33-7.40 (m, 4H), 7.41-7.46 (m, 2H), 7.73 (d, J=8.8 Hz, 2H). LC-MS analysis: [M+H]+=575.3.

4. Synthesis of the Final Compound
Example 1
(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-(piperidin-4-yl)carbamimidoyl)phenoxy)propanoic acid
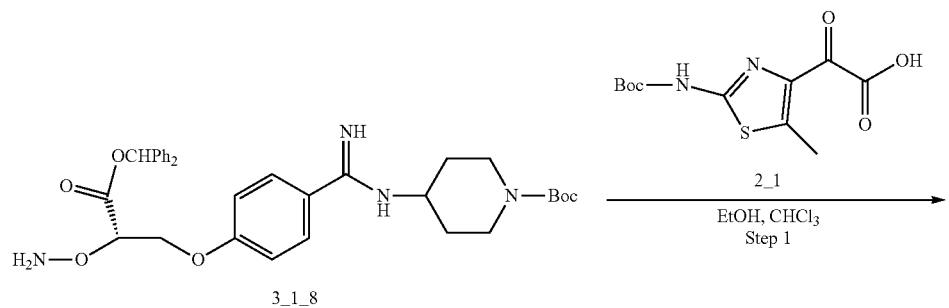
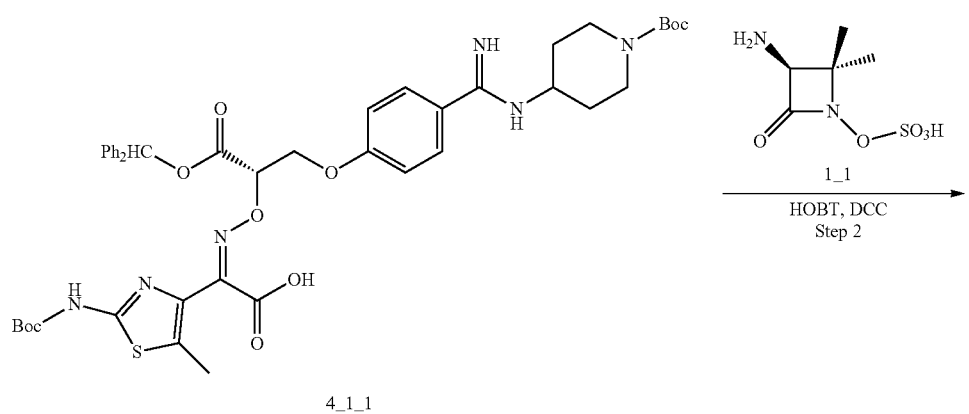
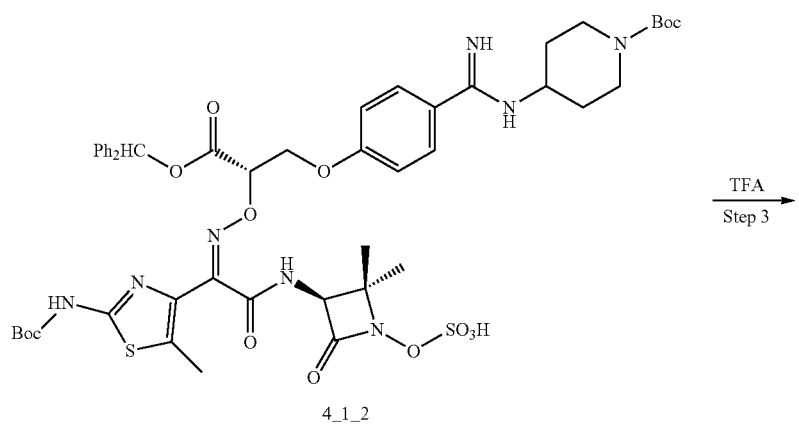

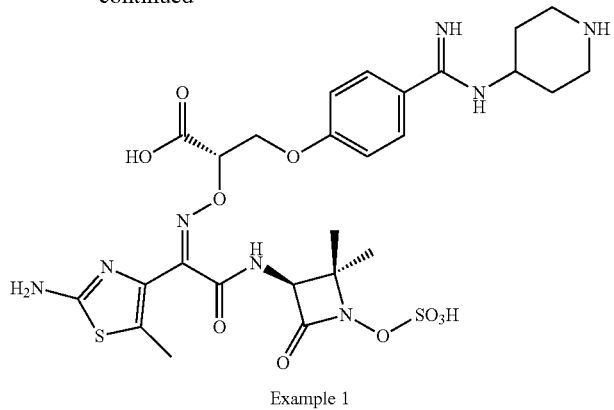

Example 1

Step 1: (S,Z)-2-(((1-(benzhydryloxy)-3-(4-(N-(1-(tert-butoxycarbonyl)piperidin-4-yl)carbamimidoyl)phenoxy)-1-oxopropan-2-yl)oxy)imino)-2-(2-((tert-butoxycarbonyl)amino)-5-methylthiazol-4-yl)acetic acid (4_1_1)

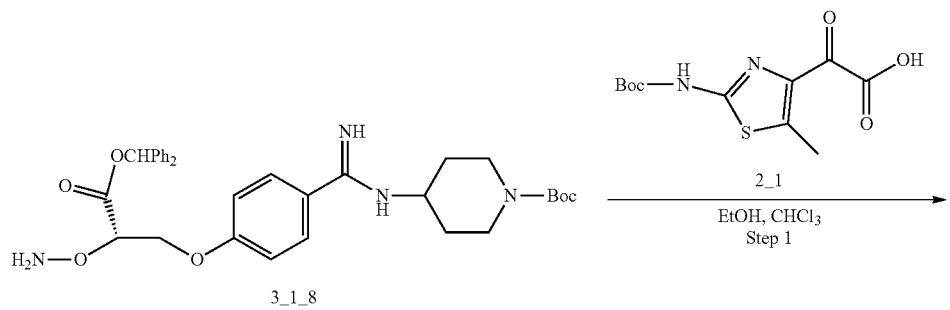

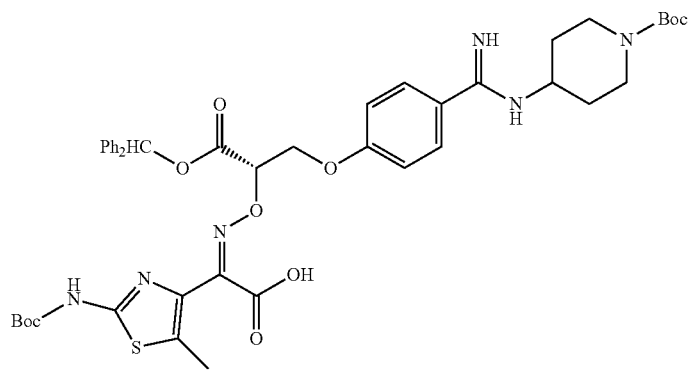

4_1_1

To the solution of compound 3_1_8 (0.24 g, 0.40 mmol) in ethanol (3 mL) and chloroform (3 mL) was added 2-(2-((tert-butoxycarbonyl)amino)-5-methylthiazol-4-yl)-2-oxoacetic acid 2_1 (0.13 g, 0.44 mmol). The resulting mixture was stirred at room temperature for 18 hours, and then concentrated under reduced pressure to give a residue. The residue was purified by flash column chromatography (5-15% MeOH in CH$_2$Cl$_2$) to give the title compound 4_1_1 (0.21 g, 61%) as a pale yellow solid.

$^1$H NMR (400 MHz, DMSO-d$_6$): δ 1.40 (s, 9H), 1.45 (s, 9H), 1.43-1.53 (m, 2H), 1.86-1.96 (m, 2H), 2.20 (s, 3H), 2.70-2.91 (m, 2H), 3.84-4.04 (m, 3H), 4.40-4.58 (m, 2H), 5.03-5.14 (m, 1H), 6.89 (s, 1H), 7.10 (d, J=8.8 Hz, 2H), 7.19-7.32 (m, 6H), 7.40-7.51 (m, 4H), 7.68 (d, J=8.8 Hz, 2H), 9.19 (s, 1H), 9.39 (s, 1H), 9.46 (s, 1H), 11.5 (s, 1H). LC-MS analysis: [M+H]$^+$=857.3.

Step 2: tert-Butyl 4-(4-((S)-3-(benzhydryloxy)-2-((((Z)-1-(2-((tert-butoxycarbonyl)amino)-5-methyl-thiazol-4-yl)-2-(((S)-2,2-dimethyl-4-oxo-1-(sul-fooxy)azetidin-3-yl)amino)-2-oxoethylidene)amino)oxy)-3-oxopropoxy)benzimidamido)piperidine-1-carboxylate (4_1_2)

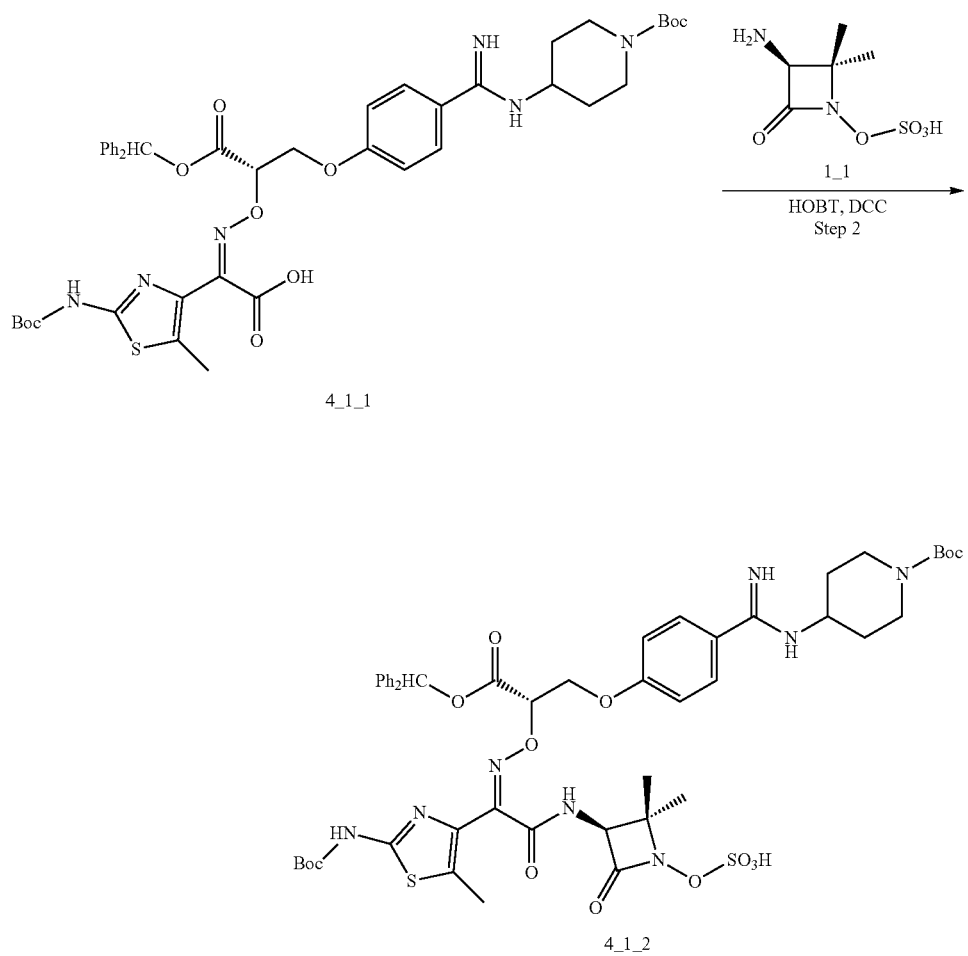

To the solution of compound 4_1_1 (0.21 g, 0.24 mmol) in anhydrous DMF (2.5 mL) was added DCC (76 mg, 0.37 mmol) and HOBT (50 mg, 0.37 mmol). The resulting mixture was stirred at room temperature for 45 minutes, and then (S)-3-amino-2,2-dimethyl-4-oxoazetidin-1-ylhydrogen sulfate 1_1 (78 mg, 0.37 mmol) and NaHCO$_3$ (62 mg, 0.74 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_1_2 (0.23 g, 89%) as a pale yellow solid.

$^1$H NMR (400 MHz, DMSO-d$_6$): δ 1.11 (s, 3H), 1.37 (s, 3H), 1.41 (s, 9H), 1.46 (s, 9H), 1.44-1.51 (m, 2H), 1.89-1.98 (m, 2H), 2.21 (s, 3H), 2.71-2.90 (m, 2H), 3.77-3.89 (m, 1H), 3.94-4.06 (m, 2H), 4.45-4.51 (m, 1H), 4.58 (d, J=8.0 Hz, 1H), 4.58-4.64 (m, 1H), 5.31-5.35 (m, 1H), 6.92 (s, 1H), 7.08 (d, J=8.8 Hz, 2H), 7.16-7.49 (m, 10H), 7.70 (d, J=8.8 Hz, 2H), 8.99 (s, 1H), 9.32 (s, 1H), 9.40 (d, J=8.0 Hz, 1H), 9.55 (d, J=8.0 Hz, 1H), 11.7 (s, 1H). LC-MS analysis: [M−H]$^−$=1047.0.

Step 3: (S)-2-((((Z)-1-(2-amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-(piperidin-4-yl)carbamimidoyl)phenoxy)propanoic acid (Example 1)

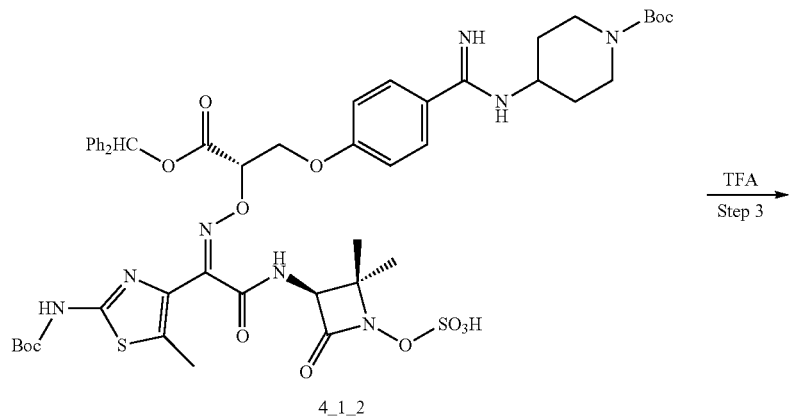

4_1_2

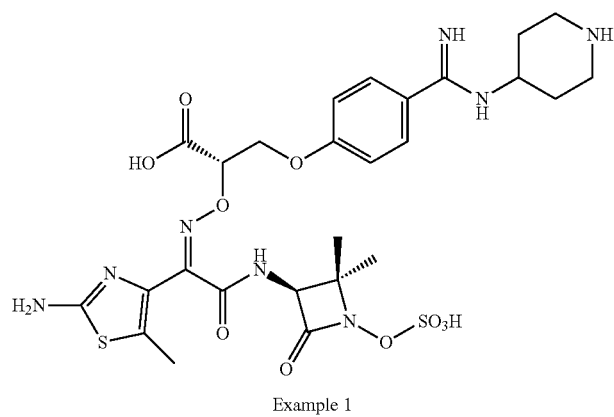

Example 1

To the solution of compound 4_1_2 (0.23 g, 0.22 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on a Agilent 10 prep-C18 250×21.2 mm column and lyophilized to give example 1 (25 mg, 16%) as a white solid.

$^1$H NMR (400 MHz, DMSO-$d_6$): δ 1.28 (s, 3H), 1.42 (s, 3H), 1.73-1.86 (m, 2H), 1.99-2.10 (m, 2H), 2.24 (s, 3H), 2.79-2.92 (m, 3H), 3.81-3.91 (m, 2H), 4.38-4.44 (m, 1H), 4.47-4.54 (m, 1H), 4.66 (d, J=8.6 Hz, 1H), 4.70 (d, J=7.8 Hz, 1H), 6.85 (br s, 2H), 7.19 (d, J=8.2 Hz, 2H), 7.71 (d, J=8.2 Hz, 2H), 11.00 (d, J=7.8 Hz, 1H). LC-MS analysis: [M−H]$^−$=681.0.

Example 2
(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((R)-piperidin-3-yl)carbamimidoyl)phenoxy)propanoic acid
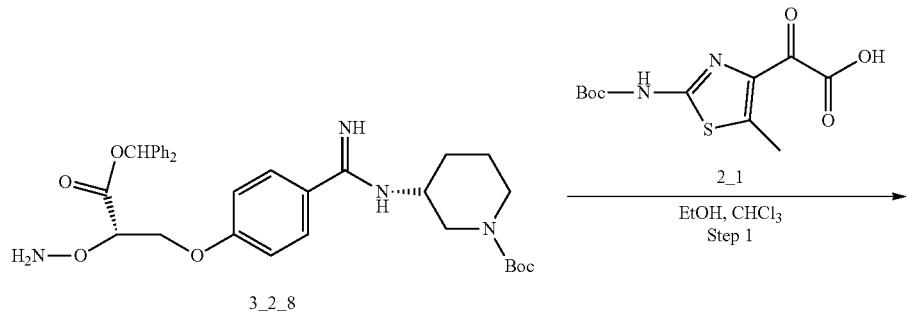
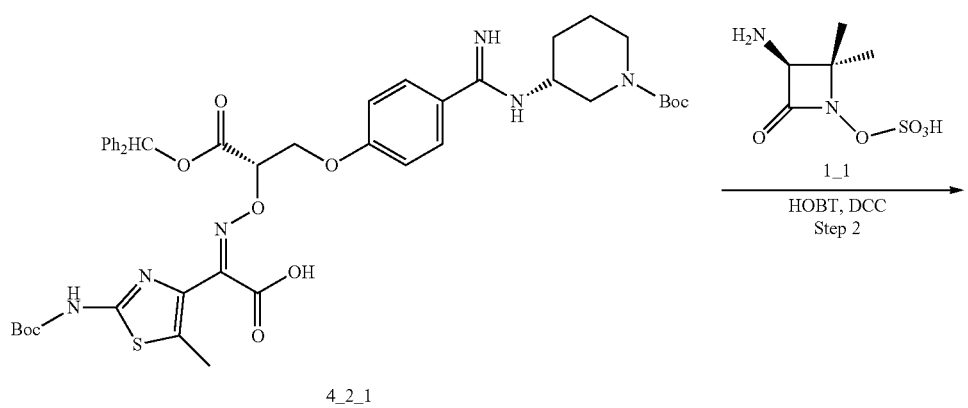
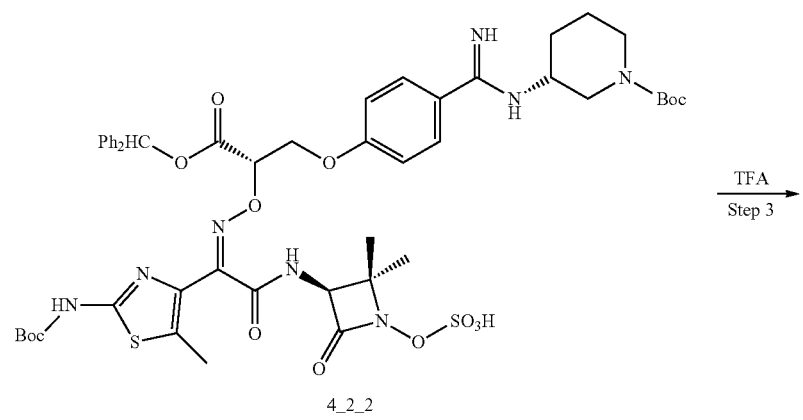

-continued

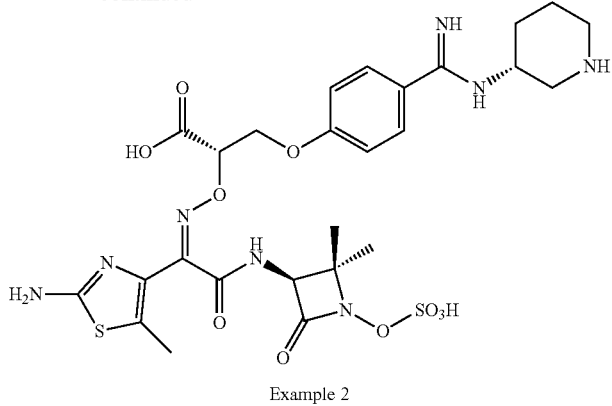

Example 2

Step 1: (Z)-2-(((((S)-1-(Benzhydryloxy)-3-(4-(N-((R)-1-(tert-butoxycarbonyl)piperidin-3-yl)carbamimidoyl)phenoxy)-1-oxopropan-2-yl)oxy)imino)-2-(2-((tert-butoxycarbonyl)amino)-5-methylthiazol-4-yl)acetic acid (4_2_1)

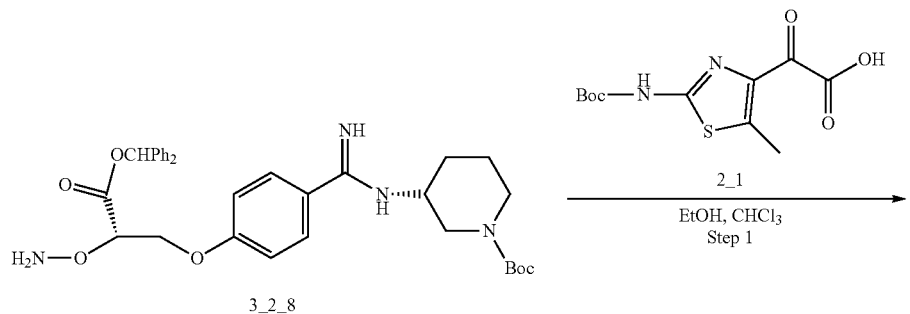

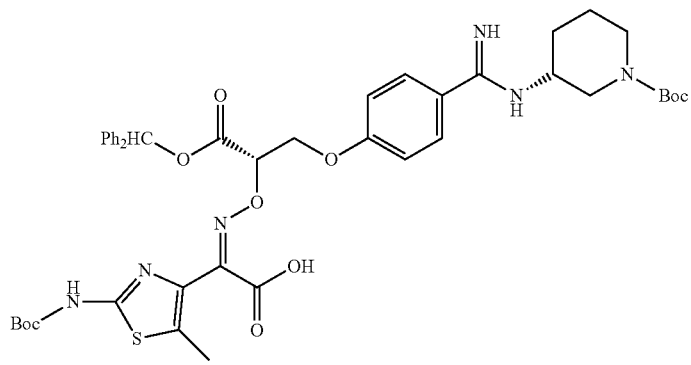

To the solution of compound 3_2_8 (0.24 g, 0.40 mmol) in ethanol (3 mL) and chloroform (3 mL) was added 2-(2-((tert-butoxycarbonyl)amino)-5-methylthiazol-4-yl)-2-oxoacetic acid 2_1 (0.12 g, 0.42 mmol). The resulting mixture was stirred at room temperature for 12 hours, and then concentrated under reduced pressure to give a residue. The residue was purified by flash column chromatography (5-15% MeOH in $CH_2Cl_2$) to give the title compound 4_2_1 (0.27 g, 79%) as a yellow solid.

$^1$H NMR (400 MHz, DMSO-$d_6$): δ 1.38 (s, 9H), 1.45 (s, 9H), 1.51-1.61 (m, 2H), 1.72-1.80 (m, 1H), 1.96-2.04 (s, 1H), 2.20 (s, 3H), 2.89-3.05 (m, 1H), 3.33-3.51 (m, 2H), 3.68-3.72 (m, 1H), 3.75-3.83 (m, 1H), 4.44-4.59 (m, 2H), 5.07-5.13 (m, 1H), 6.88 (s, 1H), 7.12 (d, J=8.5 Hz, 2H), 7.20-7.30 (m, 6H), 7.42-7.49 (m, 4H), 7.69 (d, J=8.5 Hz, 2H), 9.07 (s, 1H), 9.48 (br s, 2H), 11.47 (br s, 1H). LC-MS analysis: [M+H]$^+$=857.3.

Step 2: tert-Butyl (R)-3-(4-((S)-3-(benzhydryloxy)-2-((((Z)-1-(2-((tert-butoxycarbonyl)amino)-5-methylthiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)piperidine-1-carboxylate (4_2_2)

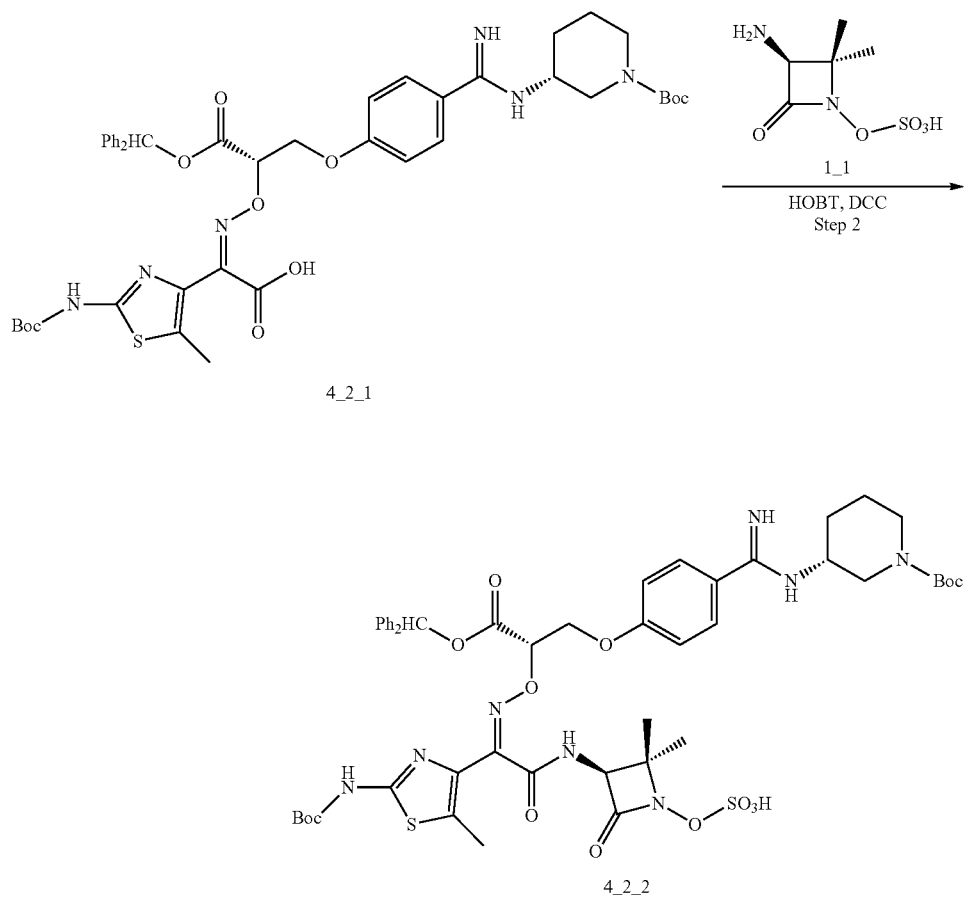

To the solution of compound 4_2_1 (0.27 g, 0.35 mmol) in anhydrous DMF (3.5 mL) was added DCC (97 mg, 0.47 mmol) and HOBT (64 mg, 0.47 mmol). The resulting mixture was stirred at room temperature for 45 minutes, and then (S)-3-amino-2,2-dimethyl-4-oxoazetidin-1-ylhydrogen sulfate 1_1 (99 mg, 0.47 mmol) and NaHCO$_3$ (118 mg, 1.41 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_2_2 (0.30 g, 91% yield) as a yellow solid.

$^1$H NMR (400 MHz, DMSO-d$_6$): δ 1.10 (s, 3H), 1.37 (s, 3H), 1.39 (s, 9H), 1.45 (s, 9H), 1.58-1.64 (m, 1H), 1.69-1.81 (m, 2H), 1.98-2.05 (s, 1H), 2.20 (s, 3H), 2.94-3.06 (m, 1H), 3.31-3.33 (m, 1H), 3.73-3.80 (s, 2H), 3.87-3.95 (m, 1H), 4.44-4.49 (m, 1H), 4.58 (d, J=7.7 Hz, 1H), 4.60-4.64 (m, 1H), 5.33 (t, J=3.3 Hz, 1H), 6.92 (s, 1H), 7.08 (d, J=8.8 Hz, 2H), 7.16-7.21 (m, 3H), 7.27-7.36 (m, 3H), 7.38-7.41 (m, 2H), 7.45-7.49 (m, 2H), 7.68 (d, J=8.8 Hz, 2H), 9.09 (s, 1H), 9.38 (s, 1H), 9.39 (s, 1H), 9.54 (d, J=7.7 Hz, 1H), 11.63 (s, 1H). LC-MS analysis: [M−H]$^-$=1047.0.

Step 3: ((S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((R)-piperidin-3-yl)carbamimidoyl)phenoxy) propanoic acid (Example 2)

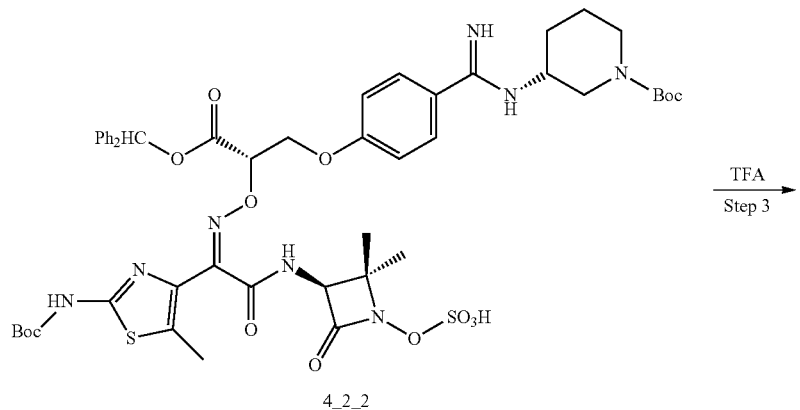

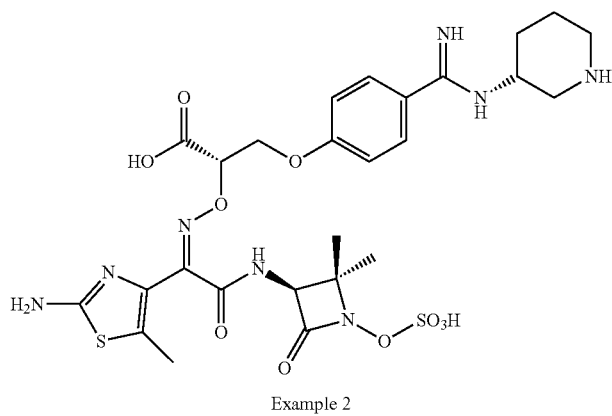

Example 2

To the solution of compound 4_2_2 (0.30 g, 0.29 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on an Agilent 10 prep-C18 250×21.2 mm column and lyophilized to give example 2 (15 mg, 8%) as a white solid.

$^1$H NMR (400 MHz, DMSO-$d_6$): δ 1.25 (s, 3H), 1.41 (s, 3H), 1.65-1.79 (m, 2H), 1.92-2.03 (m, 2H), 2.25 (s, 3H), 2.93-3.05 (m, 3H), 3.06-3.14 (m, 1H), 3.88-3.96 (m, 1H), 4.09-4.17 (m, 1H), 4.36-4.35 (m, 1H), 4.65 (d, J=8.3 Hz, 1H), 4.70-4.75 (m, 1H), 6.86 (br s, 2H), 7.06 (d, J=7.7 Hz, 2H), 7.64 (d, J=7.7 Hz, 2H), 7.29 (br s, 3H), 10.22 (br s, 1H). LC-MS analysis: [M−H]$^−$=681.0.

Example 3
(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((S)-pyrrolidin-3-yl)carbamimidoyl)phenoxy)propanoic acid
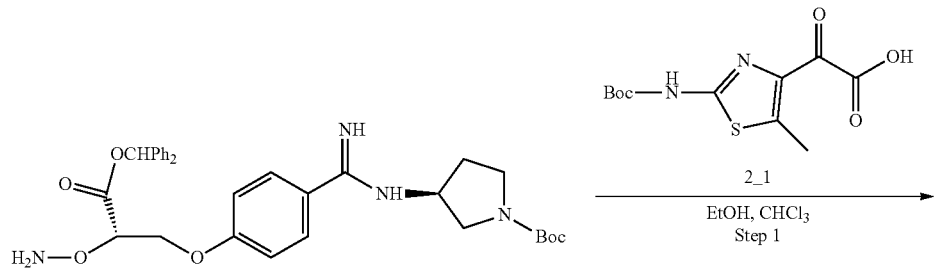
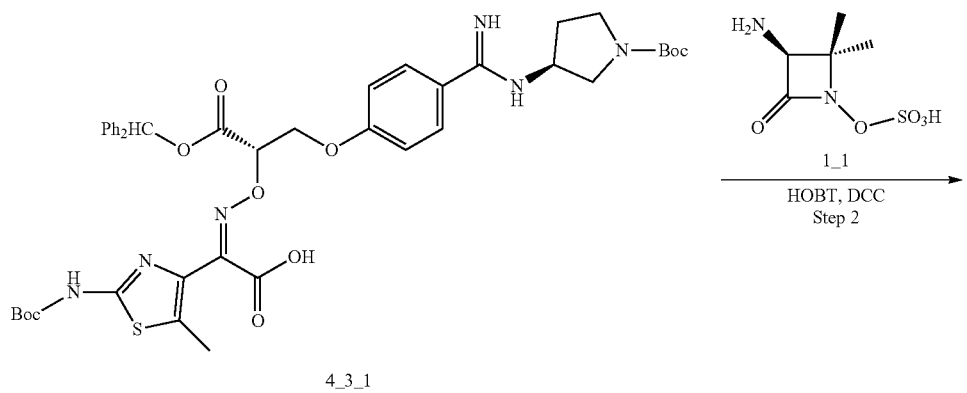
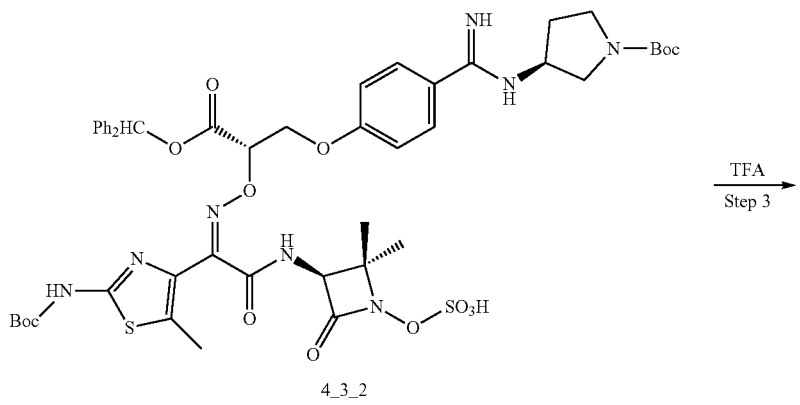

-continued

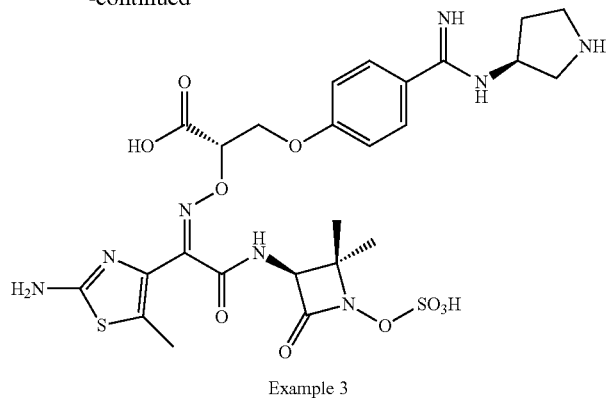

Example 3

Step 1: (Z)-2-((((S)-1-(Benzhydryloxy)-3-(4-(N-((S)-1-(tert-butoxycarbonyl)pyrrolidin-3-yl)carbamimidoyl)phenoxy)-1-oxopropan-2-yl)oxy)imino)-2-(2-((tert-butoxycarbonyl)amino)-5-methylthiazol-4-yl)acetic acid (4_3_1)

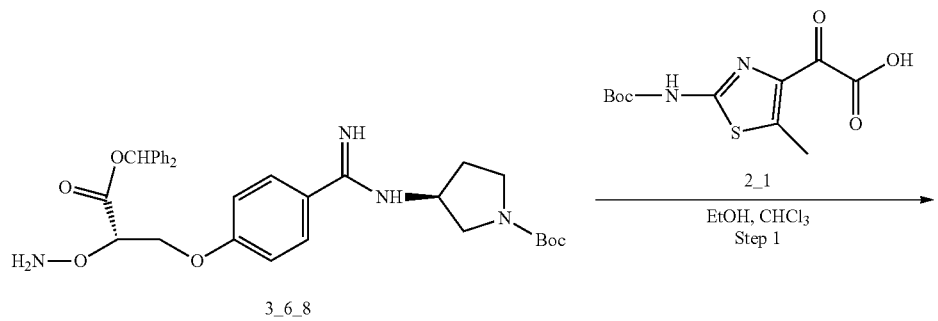

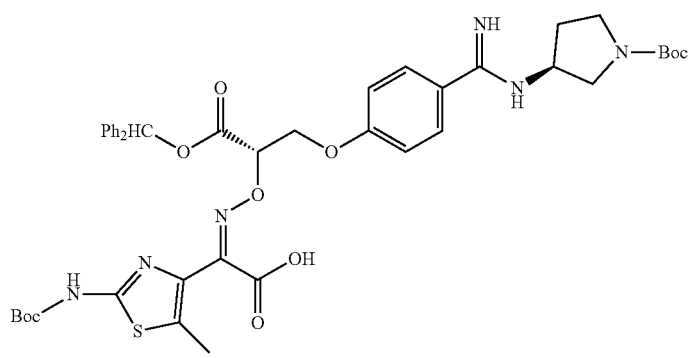

To the solution of compound 3_6_8 (0.20 g, 0.35 mmol) in ethanol (3 mL) and chloroform (3 mL) was added 2-(2-((tert-butoxycarbonyl)amino)-5-methylthiazol-4-yl)-2-oxoacetic acid 2_1 (0.10 g, 0.36 mmol). The resulting mixture was stirred at room temperature for 12 hours, and then concentrated under reduced pressure to give a residue. The residue was purified by flash column chromatography (5-15% MeOH in $CH_2Cl_2$) to give the title compound 4_3_1 (0.21 g, 69%) as a pale yellow solid.

$^1$H NMR (400 MHz, DMSO-$d_6$): δ 1.40 (s, 9H), 1.45 (s, 9H), 1.97-2.05 (m, 1H), 2.17-2.24 (m, 4H), 3.35-3.44 (m, 3H), 3.59-3.67 (m, 1H), 4.31-4.38 (m, 1H), 4.44-4.56 (m, 2H), 5.08-5.02 (m, 1H), 6.89 (s, 1H), 7.11 (d, J=8.8 Hz, 2H), 7.20-7.23 (m, 3H), 7.25-7.30 (m, 3H), 7.41-7.45 (m, 2H), 7.46-7.49 (m, 2H), 7.69 (d, J=8.8 Hz, 2H), 9.13 (s, 1H), 9.48 (s, 1H), 9.77 (s, 1H), 11.47 (s, 1H). LC-MS analysis: [M+H]$^+$=843.3.

Step 2: tert-Butyl (S)-3-(4-((S)-3-(benzhydryloxy)-2-(((((Z)-1-(2-((tert-butoxycarbonyl)amino)-5-methylthiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)pyrrolidine-1-carboxylate (4_3_2)

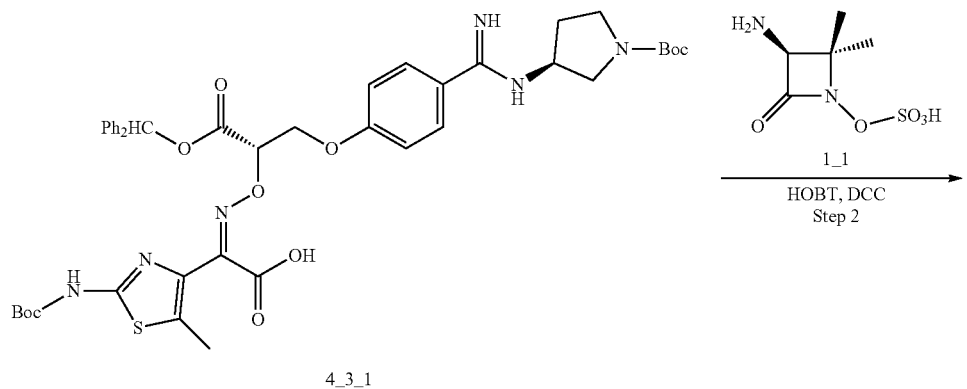

4_3_1

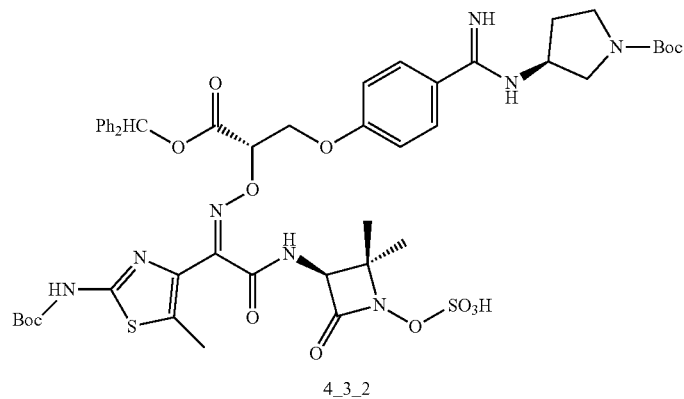

4_3_2

To the solution of compound 4_3_1 (0.20 g, 0.24 mmol) in anhydrous DMF (2.5 mL) was added DCC (76 mg, 0.37 mmol) and HOBT (50 mg, 0.37 mmol). The resulting mixture was stirred at room temperature for 45 minutes, and then (S)-3-amino-2,2-dimethyl-4-oxoazetidin-1-ylhydrogen sulfate 1_1 (78 mg, 0.37 mmol) and NaHCO$_3$ (62 mg, 0.74 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_3_2 (0.20 g, 81%) as a light yellow solid.

$^1$H NMR (400 MHz, DMSO-d$_6$): δ 1.11 (s, 3H), 1.37 (s, 3H), 1.41 (s, 9H), 1.45 (s, 9H), 1.98-2.08 (m, 1H), 2.17-2.25 (m, 4H), 3.35-3.46 (m, 3H), 3.59-3.68 (m, 1H), 4.26-4.34 (m, 1H), 4.44-4.50 (m, 1H), 4.58 (d, J=7.9 Hz, 1H), 4.59-4.61 (m, 1H), 5.33 (t, J=3.6 Hz, 1H), 6.92 (s, 1H), 7.07 (d, J=8.8 Hz, 2H), 7.15-7.21 (m, 3H), 7.26-7.41 (m, 5H), 7.45-7.48 (m, 2H), 7.70 (d, J=8.8 Hz, 2H), 9.00 (s, 1H), 9.41 (s, 1H), 9.55 (d, J=7.9 Hz, 1H), 9.70 (d, J=6.8 Hz, 1H), 11.68 (s, 1H). LC-MS analysis: [M−H]$^-$=1033.1.

Step 3: (S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((S)-pyrrolidin-3-yl)carbamimidoyl)phenoxy) propanoic acid (Example 3)

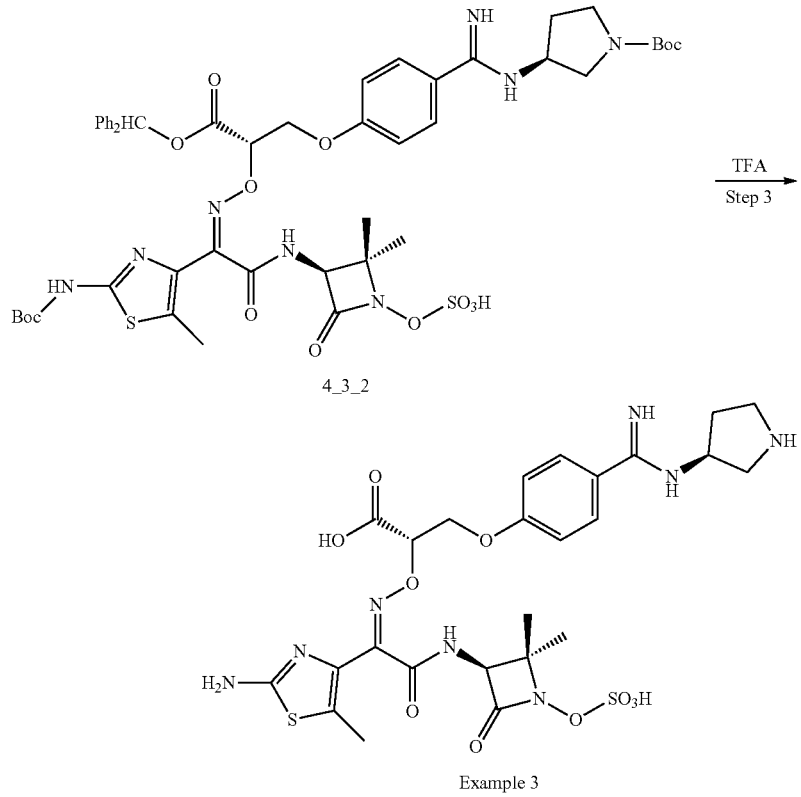

To the solution of compound 4_3_2 (0.20 g, 0.19 mmol) in anhydrous DCM (3.5 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was further purified by prep. HPLC on a Agilent 10 prep-C18 250×21.2 mm column and lyophilized to give example 3 (25 mg, 19%) as a white solid.

$^1$H NMR (400 MHz, DMSO-$d_6$): δ 1.28 (s, 3H), 1.42 (s, 3H), 2.15 (s, 3H), 2.17-2.29 (m, 2H), 3.37-3.44 (m, 3H), 3.63 (d, J=12.2 Hz, 1H), 4.18 (d, J=9.5 Hz, 1H), 4.41-4.54 (m, 2H), 4.62 (d, J=8.4 Hz, 1H), 4.75 (d, J=8.4 Hz, 1H), 6.88 (br s, 2H), 7.10 (d, J=8.5 Hz, 2H), 7.76 (d, J=8.5 Hz, 2H), 9.40 (br s, 2H), 10.20 (d, J=8.4 Hz, 1H), 10.63 (br s, 2H). LC-MS analysis: [M–H]⁻=666.9.

Example 4

(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-(azetidin-3-yl)carbamimidoyl)phenoxy)propanoic acid

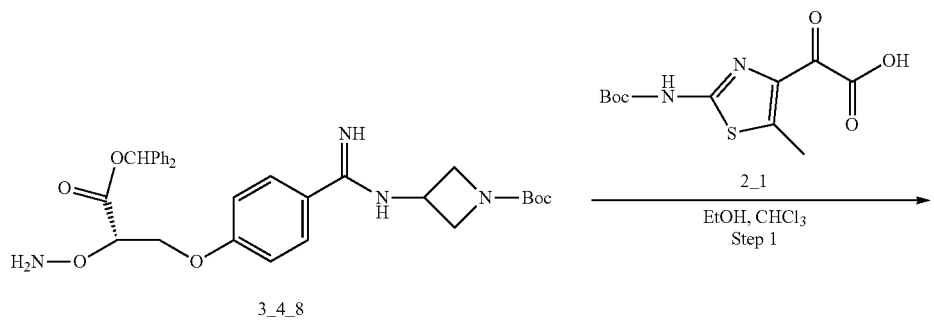

-continued
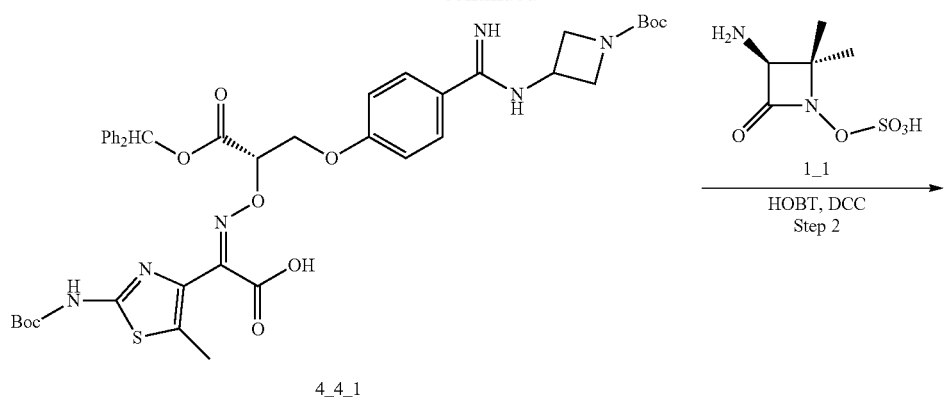
4_4_1
HOBT, DCC
Step 2
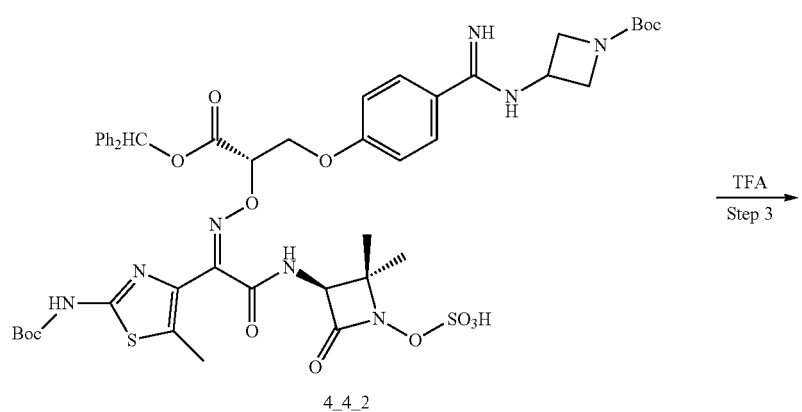
4_4_2
TFA
Step 3
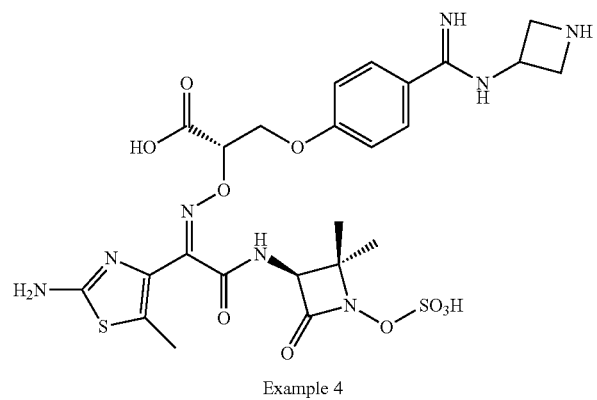
Example 4

Step 1: (S,Z)-2-(((1-(Benzhydryloxy)-3-(4-(N-(1-(tert-butoxycarbonyl)azetidin-3-yl)carbamimidoyl)phenoxy)-1-oxopropan-2-yl)oxy)imino)-2-(2-((tert-butoxycarbonyl)amino)-5-methylthiazol-4-yl)acetic acid (4_4_1)

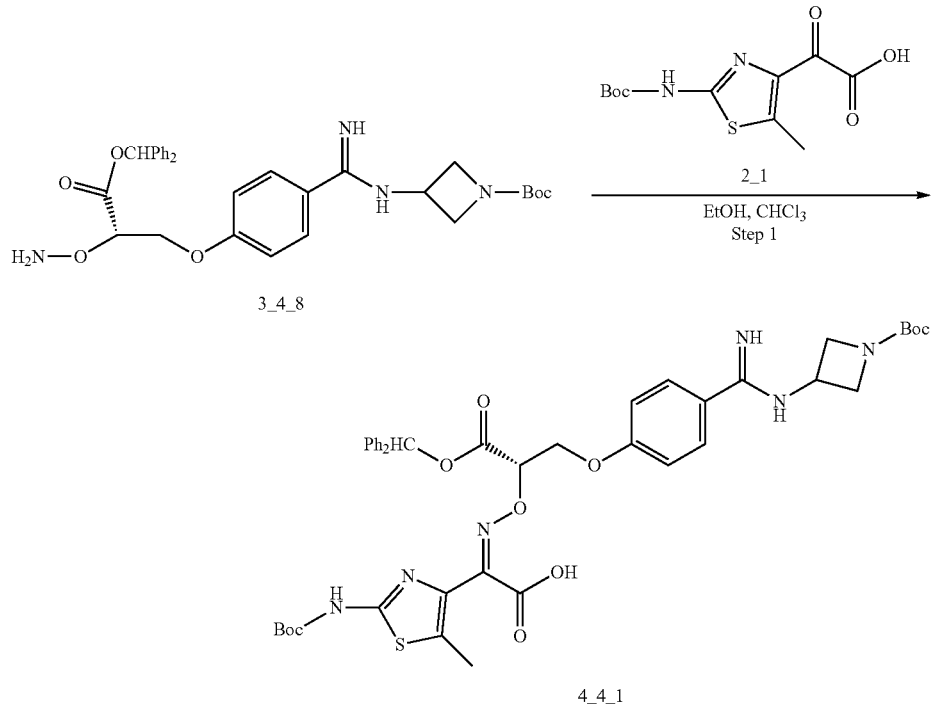

To the solution of compound 3_4_8 (0.23 g, 0.40 mmol) in ethanol (3 mL) and chloroform (3 mL) was added 2-(2-((tert-butoxycarbonyl)amino)-5-methylthiazol-4-yl)-2-oxoacetic acid 2_1 (0.12 g, 0.42 mmol). The resulting mixture was stirred at room temperature for 18 hours, and then concentrated under reduced pressure to give a residue. The residue was purified by flash column chromatography (5-15% MeOH in CH$_2$Cl$_2$) to give the title compound 4_4_1 (0.41 g, quant. yield) as a pale yellow solid.

$^1$H NMR (400 MHz, DMSO-d$_6$): δ 1.38 (s, 9H), 1.45 (s, 9H), 2.20 (s, 3H), 3.97-3.04 (m, 2H), 4.10-4.16 (m, 1H), 4.18-4.26 (m, 2H), 4.46-4.61 (m, 2H), 5.12-5.18 (m, 1H), 6.89 (s, 1H), 7.11 (d, J=8.0 Hz, 2H), 7.20-7.30 (m, 6H), 7.40-7.49 (m, 4H), 7.75 (d, J=8.0 Hz, 2H), 9.13 (s, 1H), 9.51 (s, 1H), 10.13 (br s, 1H), 11.46 (s, 1H). LC-MS analysis: [M+H]$^+$=829.3.

Step 2: tert-Butyl 3-(4-((S)-3-(benzhydryloxy)-2-((((Z)-1-(2-((tert-butoxycarbonyl)amino)-5-methyl-thiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)azetidine-1-carboxylate (4_4_2)

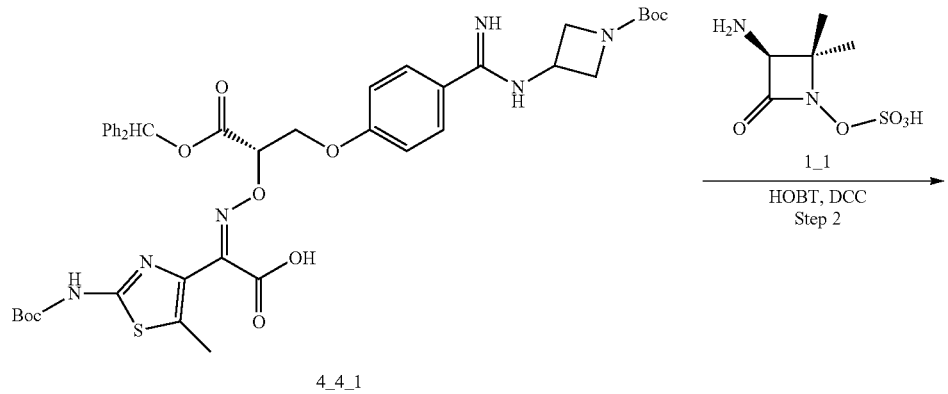

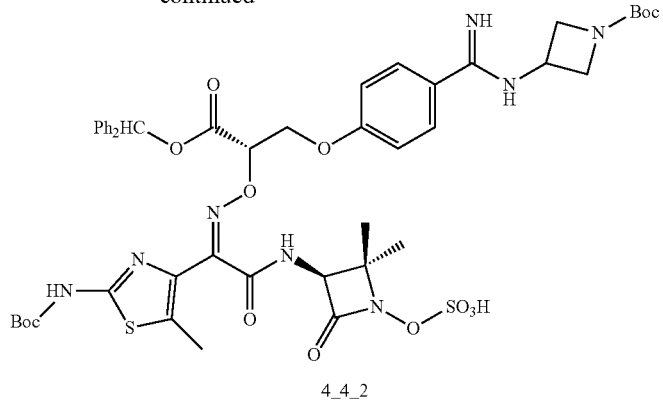

4_4_2

To the solution of compound 4_4_1 (0.41 g, obtained above) in anhydrous DMF (3.5 mL) was added DCC (0.15 g, 0.76 mmol) and HOBT (0.10 g, 0.75 mmol). The resulting mixture was stirred at room temperature for 45 minutes, and then (S)-3-amino-2,2-dimethyl-4-oxoazetidin-1-ylhydrogen sulfate 1_1 (0.16 g, 0.75 mmol) and NaHCO$_3$ (0.13 g, 1.50 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_4_2 (0.23 g, 56% in two steps) as a light yellow solid.

$^1$H NMR (400 MHz, DMSO-d$_6$): δ 1.10 (s, 3H), 1.36 (s, 3H), 1.39 (s, 9H), 1.45 (s, 9H), 2.21 (s, 3H), 3.98-4.04 (m, 2H), 4.17-4.25 (m, 3H), 4.45-4.52 (m, 1H), 4.58 (d, J=7.8 Hz, 1H), 4.60-4.65 (m, 1H), 5.34 (t, J=3.2 Hz, 1H), 6.93 (s, 1H), 7.09 (d, J=8.8 Hz, 2H), 7.15-7.21 (m, 3H), 7.28-7.36 (m, 3H), 7.37-7.41 (m, 2H), 7.45-7.49 (m, 2H), 7.76 (d, J=8.8 Hz, 2H), 8.92 (s, 1H), 9.46 (s, 1H), 9.55 (d, J=7.8 Hz, 1H), 10.05 (d, J=5.0 Hz, 1H), 11.70 (s, 1H). LC-MS analysis: [M−H]$^−$=1047.0.

Step 3: (S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-(azetidin-3-yl)carbamimidoyl)phenoxy)propanoic acid (Example 4)

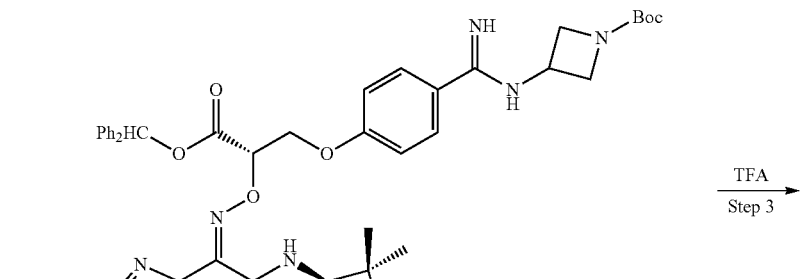

4_4_2

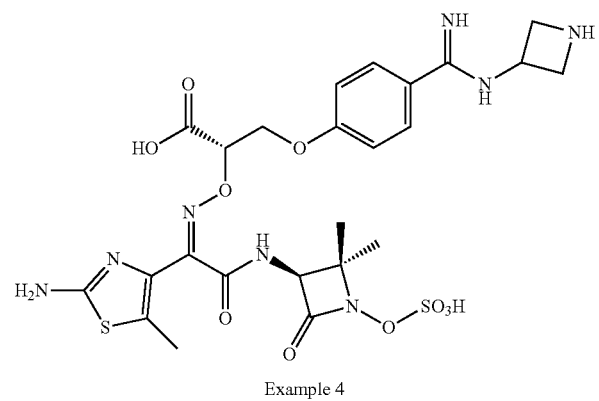

Example 4

To the solution of compound 4_4_2 (0.48 g, 0.45 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on a Agilent 10 prep-C18 250×21.2 mm column and lyophilized to give example 4 (34 mg, 11%) as a white solid.

$^1$H NMR (400 MHz, DMSO-d$_6$): δ 1.25 (s, 3H), 1.40 (s, 3H), 2.19 (s, 3H), 4.12-4.18 (m, 1H), 4.19-4.30 (m, 2H), 4.34-4.42 (m, 2H), 4.43-4.49 (m, 1H), 4.60 (d, J=8.4 Hz, 1H), 4.63-4.67 (m, 1H), 4.79 (d, J=8.0 Hz, 1H), 6.91 (br s, 2H), 7.12 (d, J=8.6 Hz, 2H), 7.80 (d, J=8.6 Hz, 2H), 10.37 (br s, 1H). LC-MS analysis: [M−H]−=653.2.

Example 5

(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((S)-piperidin-3-yl)carbamimidoyl)phenoxy)propanoic acid

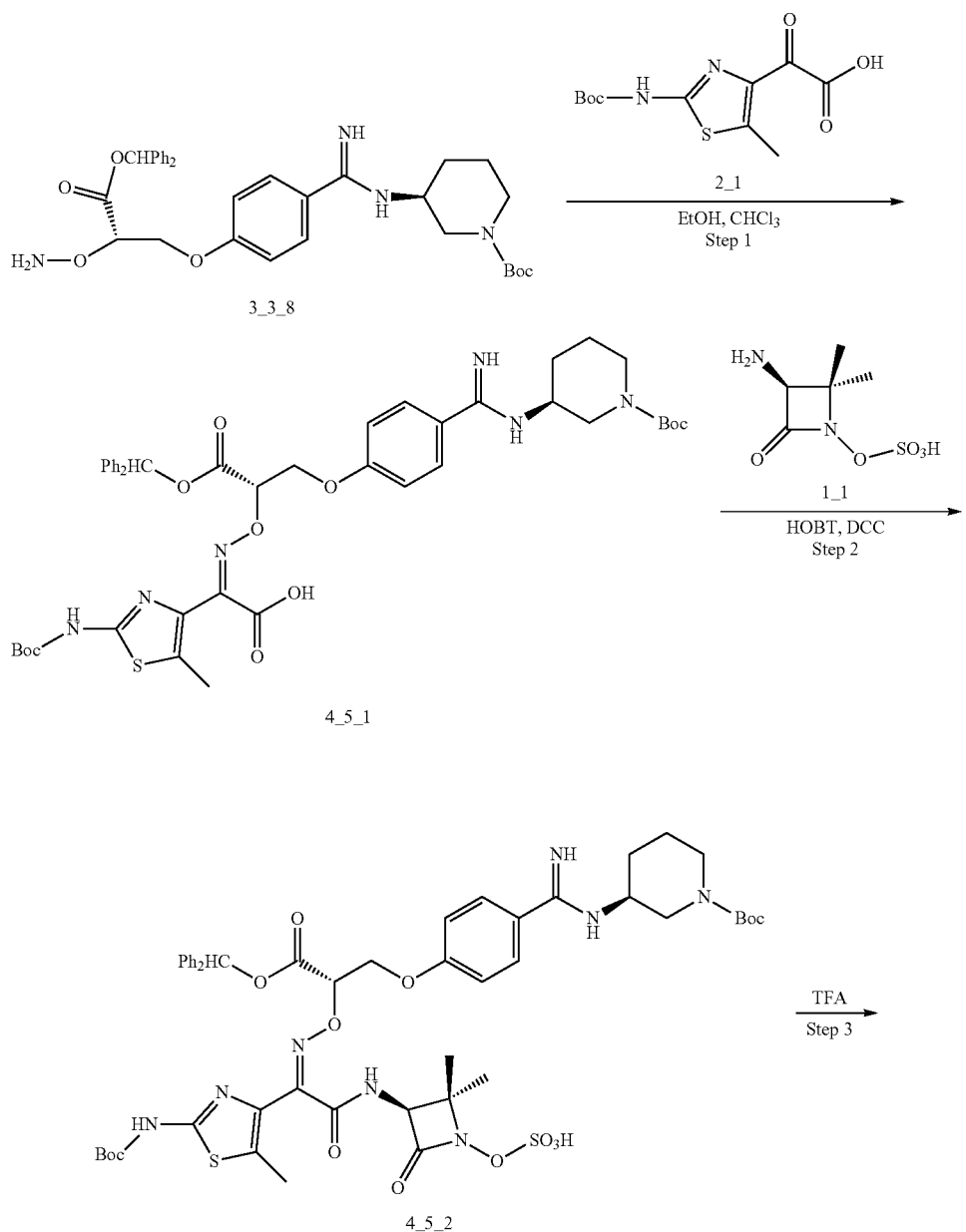

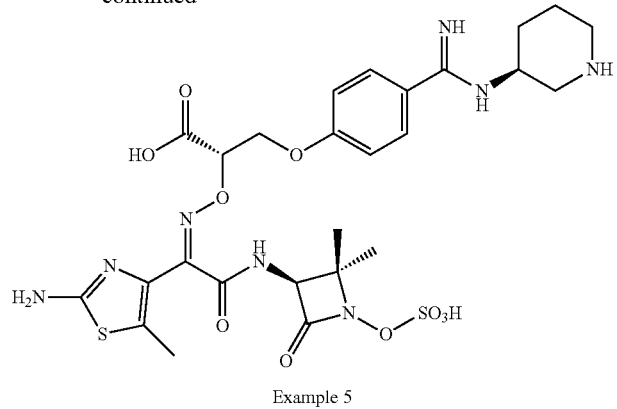

Example 5

Step 1: (Z)-2-(((((S)-1-(Benzhydryloxy)-3-(4-(N-((S)-1-(tert-butoxycarbonyl)piperidin-3-yl)carbamimidoyl)phenoxy)-1-oxopropan-2-yl)oxy)imino)-2-(2-((tert-butoxycarbonyl)amino)-5-methylthiazol-4-yl)acetic acid (4_5_1)

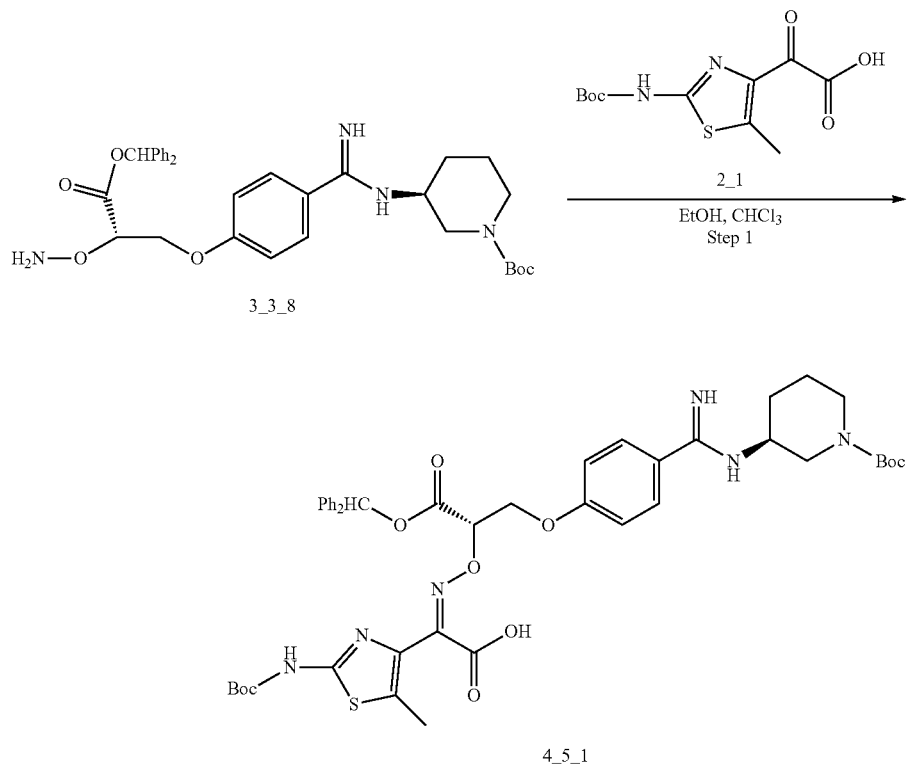

To the solution of compound 3_3_8 (0.24 g, 0.40 mmol) in ethanol (3 mL) and chloroform (3 mL) was added 2-(2-((tert-butoxycarbonyl)amino)-5-methylthiazol-4-yl)-2-oxoacetic acid 2_1 (0.12 g, 0.42 mmol). The resulting mixture was stirred at room temperature for 12 hours, and then concentrated under reduced pressure to give a residue. The residue was purified by flash column chromatography (5-15% MeOH in $CH_2Cl_2$) to give the title compound 4_5_1 (0.32 g, 94%) as a light brown solid.

$^1$H NMR (400 MHz, DMSO-$d_6$): δ 1.39 (s, 9H), 1.45 (s, 9H), 1.52-1.60 (m, 2H), 1.73-1.81 (m, 1H), 1.97-2.04 (m, 1H), 2.21 (s, 3H), 2.91-2.30 (m, 2H), 3.58-3.71 (s, 1H), 3.74-3.82 (m, 2H), 4.47-4.58 (m, 2H), 5.03-5.09 (m, 1H), 6.88 (s, 1H), 7.13 (d, J=8.8 Hz, 2H), 7.20-7.24 (m, 3H), 7.25-7.31 (m, 3H), 7.42-7.50 (m, 4H), 7.68 (d, J=8.8 Hz, 2H), 9.06 (s, 1H), 9.48 (s, 2H), 11.46 (s, 1H). LC-MS analysis: [M+Na]$^+$=879.3.

Step 2: tert-Butyl (S)-3-(4-((S)-3-(benzhydryloxy)-2-((((Z)-1-(2-((tert-butoxycarbonyl)amino)-5-methylthiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)piperidine-1-carboxylate (4_5_2)

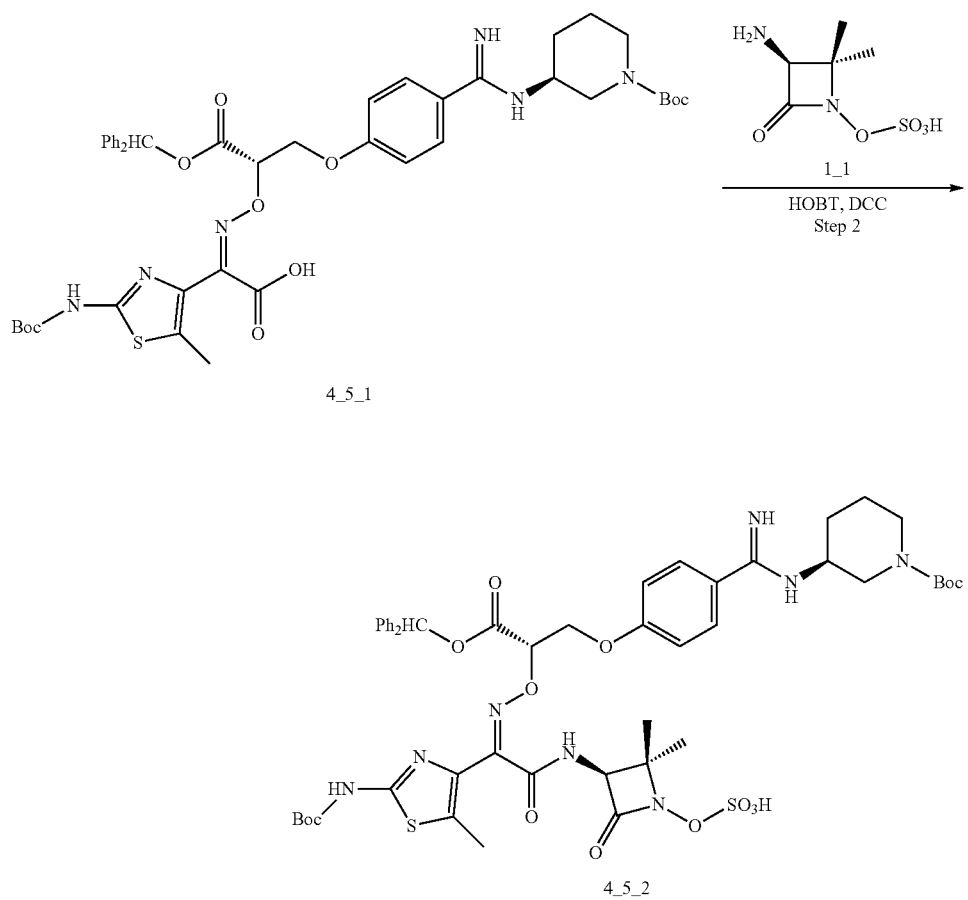

To the solution of compound 4_5_1 (0.32 g, 0.38 mmol) in anhydrous DMF (3.5 mL) was added DCC (11 mg, 0.57 mmol) and HOBT (77 mg, 0.57 mmol). The resulting mixture was stirred at room temperature for 45 minutes, and then (S)-3-amino-2,2-dimethyl-4-oxoazetidin-1-ylhydrogen sulfate 1_1 (120 mg, 0.57 mmol) and NaHCO$_3$ (96 mg, 1.14 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_5_2 (0.20 g, 51%) as a light yellow solid.

$^1$H NMR (400 MHz, DMSO-d$_6$): δ 1.12 (s, 3H), 1.37 (s, 3H), 1.39 (s, 9H), 1.45 (s, 9H), 1.58-1.65 (m, 2H), 1.60-1.79 (m, 1H), 1.94-2.05 (m, 1H), 2.21 (s, 3H), 2.95-2.98 (m, 1H), 3.72-3.81 (m, 3H), 4.45-4.50 (m, 1H), 4.57 (d, J=7.7 Hz, 1H), 4.58-4.63 (m, 1H), 5.32 (t, J=3.3 Hz, 1H), 6.92 (s, 1H), 7.07 (d, J=8.7 Hz, 2H), 7.16-7.21 (m, 3H), 7.27-7.34 (m, 3H), 7.38-7.42 (m, 4H), 7.68 (d, J=8.7 Hz, 2H), 9.02 (s, 1H), 9.37 (s, 1H), 9.39 (s, 1H), 9.53 (d, J=7.7 Hz, 1H). LC-MS analysis: [M−H]$^−$=1047.3.

Step 3: (S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((S)-piperidin-3-yl)carbamimidoyl)phenoxy) propanoic acid (Example 5)

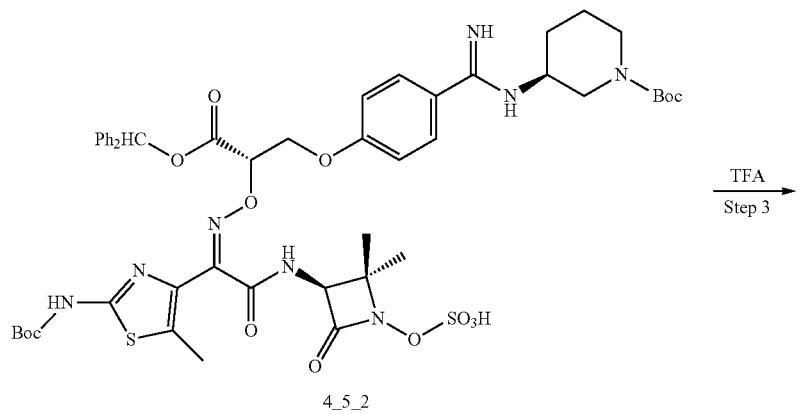

4_5_2

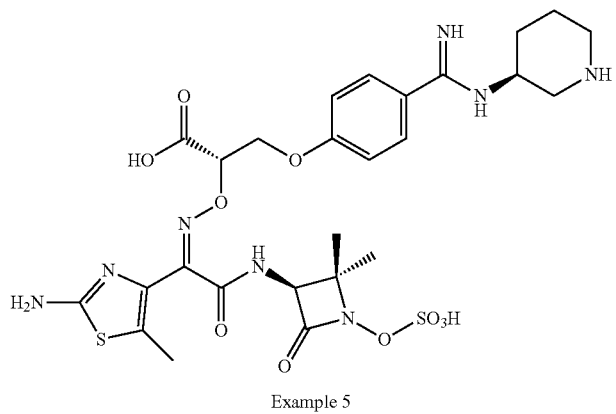

Example 5

To the solution of compound 4_5_2 (0.20 g, 0.19 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on a Agilent 10 prep-C18 250×21.2 mm column and lyophilized to give example 5 (14 mg, 10%) as a white solid.

$^1$H NMR (400 MHz, DMSO-$d_6$): δ 1.23 (s, 3H), 1.39 (s, 3H), 1.59-1.68 (m, 1H), 1.69-1.76 (m, 1H), 1.77-1.86 (m, 1H), 1.92-1.99 (m, 1H), 2.25 (s, 3H), 2.88-2.94 (m, 1H), 2.96-3.04 (m, 3H), 3.91-3.97 (m, 1H), 3.99-4.10 (m, 1H), 4.34 (t, J=8.9 Hz, 1H), 4.62 (d, J=8.7 Hz, 1H), 4.71 (d, J=7.3 Hz, 1H), 6.64 (br s, 1H), 6.87 (br s, 2H), 7.10 (d, J=8.3 Hz, 2H), 7.18 (br s, 1H), 7.73 (d, J=8.3 Hz, 2H). LC-MS analysis: [M−H]$^-$=681.2.

Example 6
(S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid
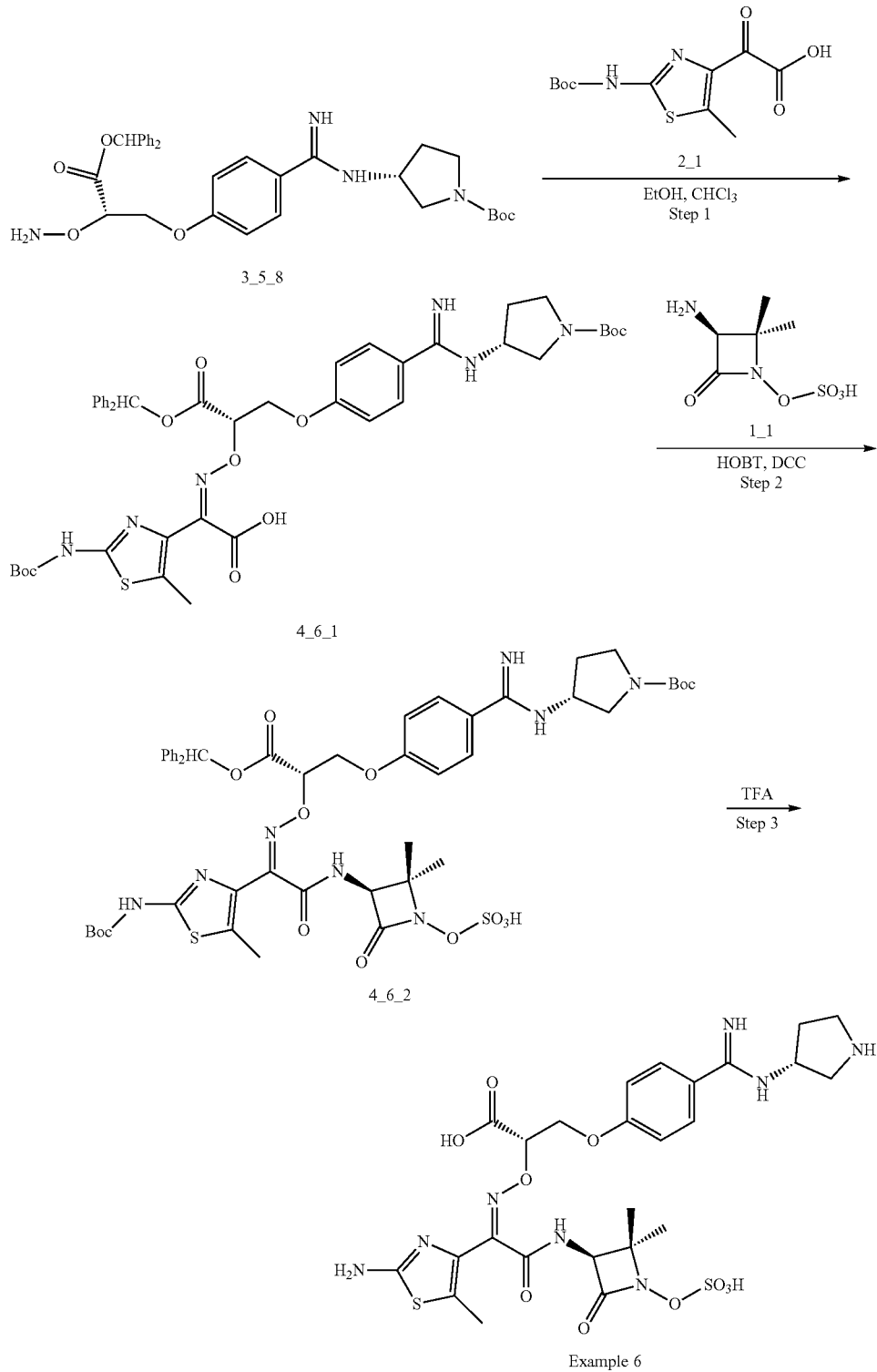

Step 1: (Z)-2-((((S)-1-(Benzhydryloxy)-3-(4-(N-((R)-1-(tert-butoxycarbonyl)pyrrolidin-3-yl)carbamimidoyl)phenoxy)-1-oxopropan-2-yl)oxy)imino)-2-(2-((tert-butoxycarbonyl)amino)-5-methylthiazol-4-yl)acetic acid (4_6_1)

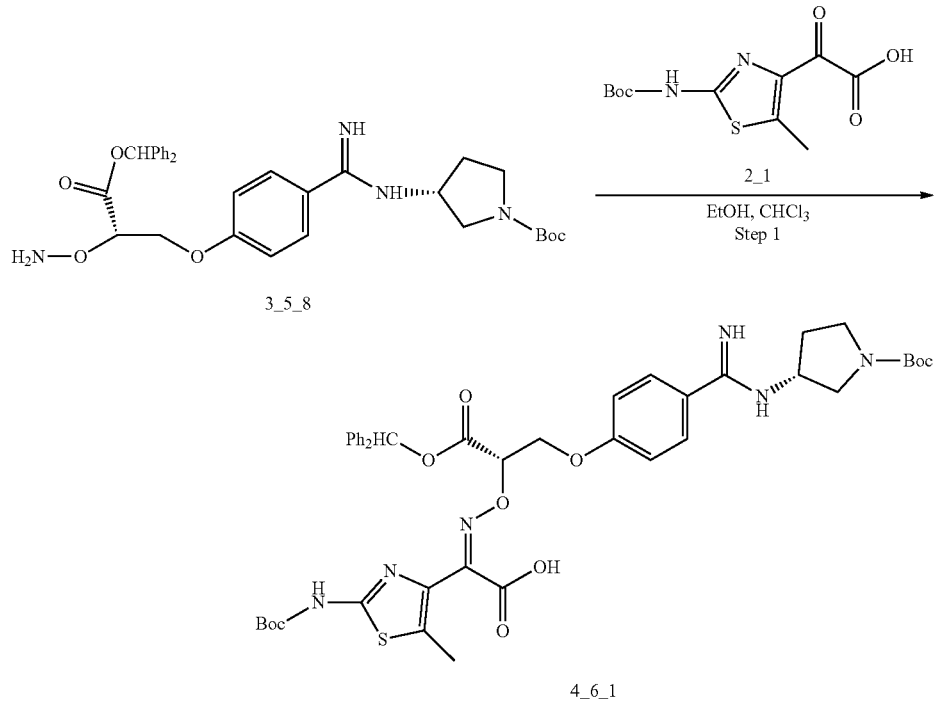

To the solution of compound 3_5_8 (0.23 g, 0.40 mmol) in ethanol (3 mL) and chloroform (3 mL) was added 2-(2-((tert-butoxycarbonyl)amino)-5-methylthiazol-4-yl)-2-oxoacetic acid 2_1 (0.12 g, 0.42 mmol). The resulting mixture was stirred at room temperature for 12 hours, and then concentrated under reduced pressure to give a residue. The residue was purified by flash column chromatography (5-15% MeOH in $CH_2Cl_2$) to give the title compound 4_6_1 (0.33 g, 97%) as a light brown solid.

$^1$H NMR (400 MHz, DMSO-$d_6$): δ 1.41 (s, 9H), 1.45 (s, 9H), 1.97-2.05 (m, 1H), 2.17-2.24 (m, 4H), 3.35-3.44 (m, 3H), 3.60-3.66 (m, 1H), 4.10-4.15 (m, 1H), 4.29-4.37 (m, 1H), 4.52-4.61 (m, 1H), 6.91 (s, 1H), 7.12 (d, J=8.8 Hz, 2H), 7.21-7.31 (m, 6H), 7.40-7.47 (m, 4H), 7.70 (d, J=8.8 Hz, 2H), 9.09 (s, 1H), 9.46 (s, 1H), 9.92 (s, 1H), 11.58 (s, 1H). LC-MS analysis: [M+H]$^+$=843.3.

Step 2: tert-Butyl (R)-3-(4-((S)-3-(benzhydryloxy)-2-((((Z)-1-(2-((tert-butoxycarbonyl)amino)-5-methylthiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)pyrrolidine-1-carboxylate (4_6_2)

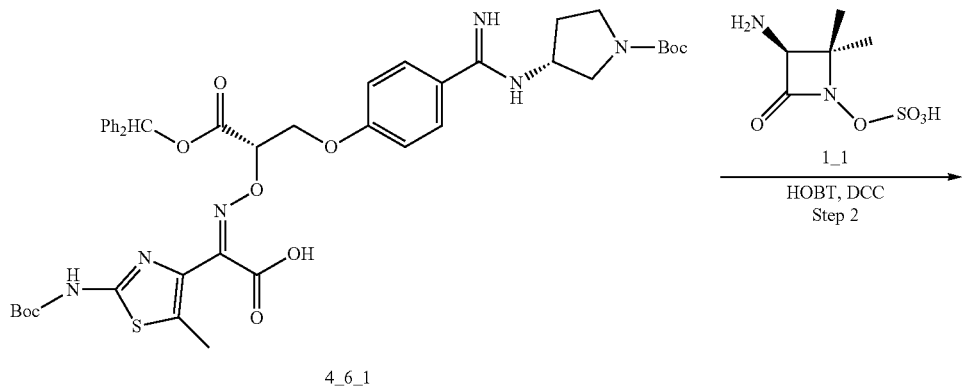

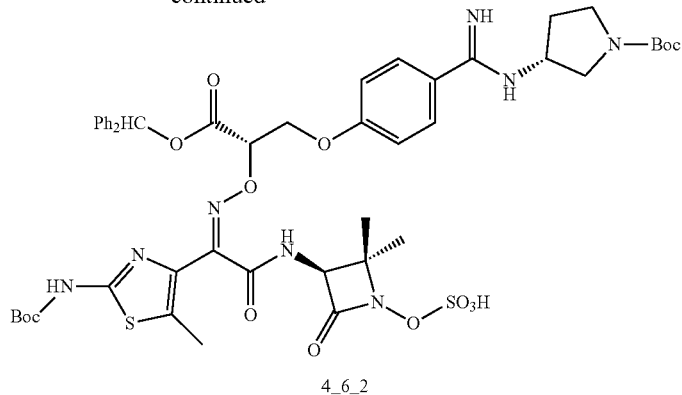

4_6_2

To the solution of compound 4_6_1 (0.42 g, 0.40 mmol) in anhydrous DMF (3.5 mL) was added DCC (0.12 g, 0.60 mmol) and HOBT (0.08 g, 060 mmol). The resulting mixture was stirred at room temperature for 45 minutes, and then (S)-3-amino-2,2-dimethyl-4-oxoazetidin-1-ylhydrogen sulfate 1_1 (0.13 g, 0.60 mmol) and NaHCO$_3$ (0.10 g, 1.20 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_6_2 (0.41 g, 99%) as a light yellow solid.

$^1$H NMR (400 MHz, DMSO-d$_6$): δ 1.10 (s, 3H), 1.36 (s, 3H), 1.41 (s, 9H), 1.45 (s, 9H), 1.98-2.06 (m, 1H), 2.18-2.24 (m, 4H), 3.39-3.47 (m, 3H), 3.59-3.67 (m, 1H), 4.27-4.33 (m, 1H), 4.44-4.49 (m, 1H), 4.58 (d, J=7.9 Hz, 1H), 4.59-4.63 (m, 1H), 5.33 (t, J=3.5 Hz, 1H), 6.92 (s, 1H), 7.07 (d, J=8.8 Hz, 2H), 7.15-7.21 (m, 3H), 7.26-7.41 (m, 5H), 7.45-7.48 (m, 2H), 7.70 (d, J=8.8 Hz, 2H), 9.01 (s, 1H), 9.42 (s, 1H), 9.55 (d, J=7.9 Hz, 1H), 9.70 (d, J=6.8 Hz, 1H), 11.68 (s, 1H). LC-MS analysis: [M−H]$^−$=1033.1.

Step 3: (S)-2-((((Z)-1-(2-Amino-5-methylthiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid (Example 6)

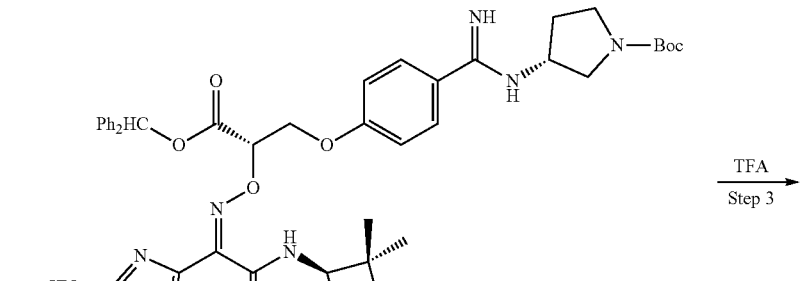

4_6_2

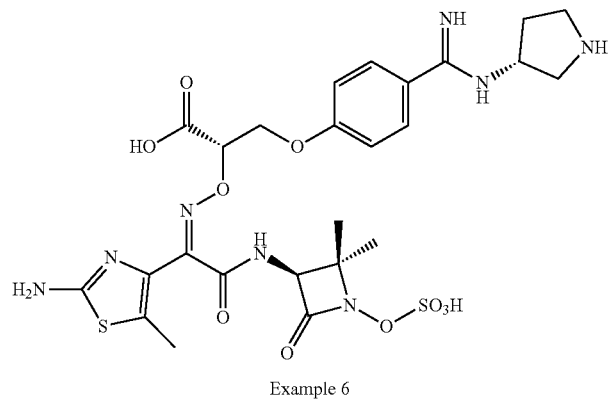

Example 6

To the solution of compound 4_6_2 (0.41 g, 0.40 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on an Agilent 10 prep-C18 250×21.2 mm column and lyophilized to give example 6 (35 mg, 13%) as a white solid.

$^1$H NMR (400 MHz, DMSO-$d_6$): δ 1.25 (s, 3H), 1.41 (s, 3H), 1.96-2.04 (m, 1H), 2.19 (s, 3H), 2.20-2.25 (m, 1H), 3.25-3.43 (m, 3H), 3.45-3.57 (m, 1H), 4.15-4.21 (m, 1H), 4.35-4.42 (m, 1H), 4.63 (d, J=8.6 Hz, 1H), 4.66-4.70 (m, 1H), 5.32 (t, J=4.9 Hz, 1H), 6.66 (br s, 1H), 6.87 (br s, 2H) 7.12 (d, J=8.6 Hz, 2H), 7.21 (br s, 2H), 7.74 (d, J=8.6 Hz, 2H). LC-MS analysis: [M−H]⁻=667.1.

Example 7

(S)-2-((((Z)-1-(2-Amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid

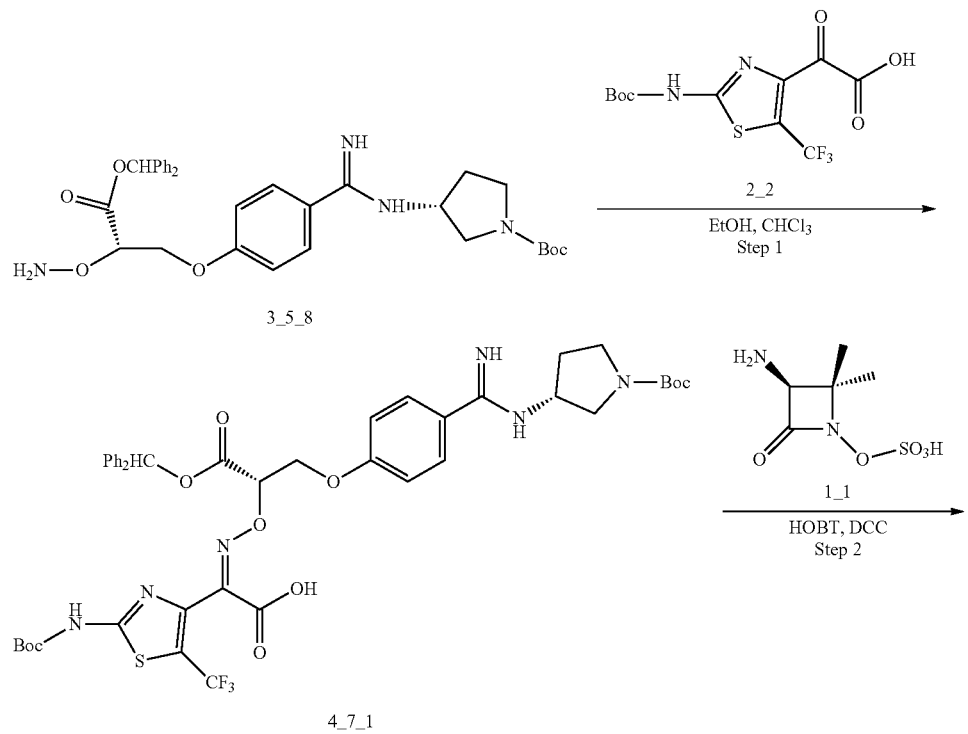

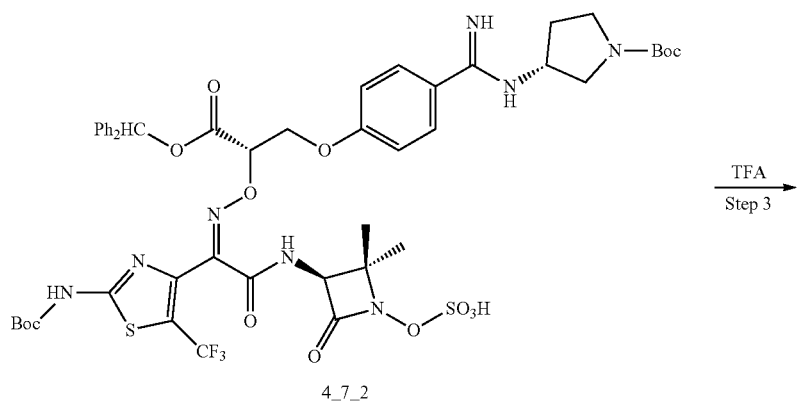

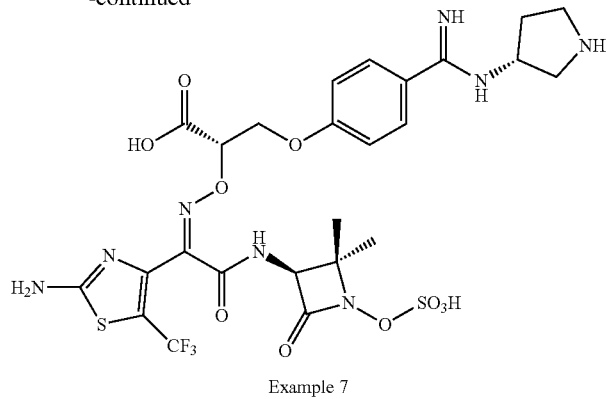

Example 7

Step 1: (Z)-2-((((S)-1-(Benzhydryloxy)-3-(4-(N-((R)-1-(tert-butoxycarbonyl)pyrrolidin-3-yl)carbamimidoyl)phenoxy)-1-oxopropan-2-yl)oxy)imino)-2-(2-((tert-butoxycarbonyl)amino)-5-(trifluoromethyl)thiazol-4-yl)acetic acid (4_7_1)

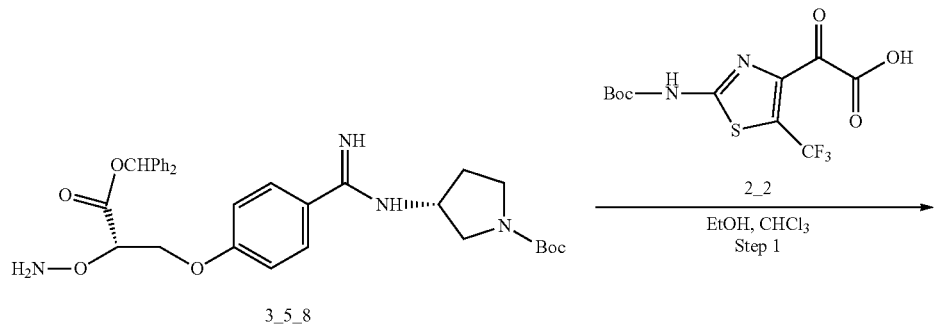

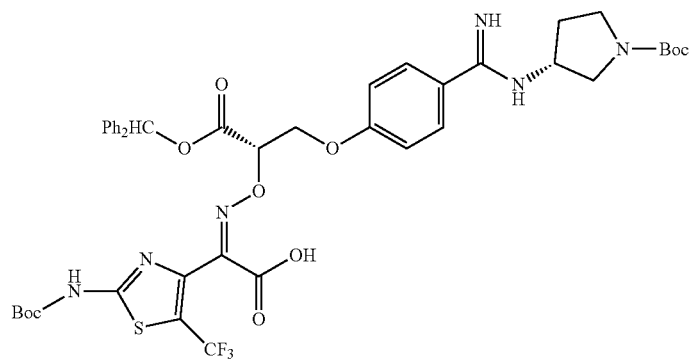

To the solution of compound 3_5_8 (97 mg, 0.17 mmol) in ethanol (3 mL) and chloroform (3 mL) was added 2-(2-((tert-butoxycarbonyl)amino)-5-(trifluoromethyl)thiazol-4-yl)-2-oxoacetic acid 2_2 (60 mg, 0.17 mmol). The resulting mixture was stirred at room temperature for two days, and then concentrated under reduced pressure to give a residue. The residue was purified by flash column chromatography (5-15% MeOH in $CH_2Cl_2$) to give the title compound 4_7_1 (30 mg, 61%) as a pale yellow solid.

$^1$H NMR (400 MHz, DMSO-$d_6$): δ 1.40 (s, 9H), 1.47 (s, 9H), 1.97-2.05 (m, 1H), 2.17-2.24 (m, 4H), 3.35-3.44 (m, 3H), 3.59-3.66 (m, 1H), 4.28-4.35 (m, 1H), 4.44-4.51 (m, 1H), 4.52-4.57 (m, 1H), 5.08 (t, J=4.4 Hz, 1H), 6.84 (s, 1H), 7.11 (d, J=8.1 Hz, 2H), 7.21-7.29 (m, 6H), 7.38-7.47 (m, 4H), 7.69 (d, J=8.1 Hz, 2H), 9.05 (s, 1H), 9.47 (s, 1H), 9.74 (s, 1H). $^{19}$F NMR (376 MHz, DMSO-$d_6$)): δ -50.2 (s, 3F). LC-MS analysis: [M+H]$^+$=897.3.

Step 2: tert-Butyl (R)-3-(4-((S)-3-(benzhydryloxy)-2-((((Z)-1-(2-((tert-butoxycarbonyl)amino)-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-oxopropoxy)benzimidamido)pyrrolidine-1-carboxylate (4_7_2)

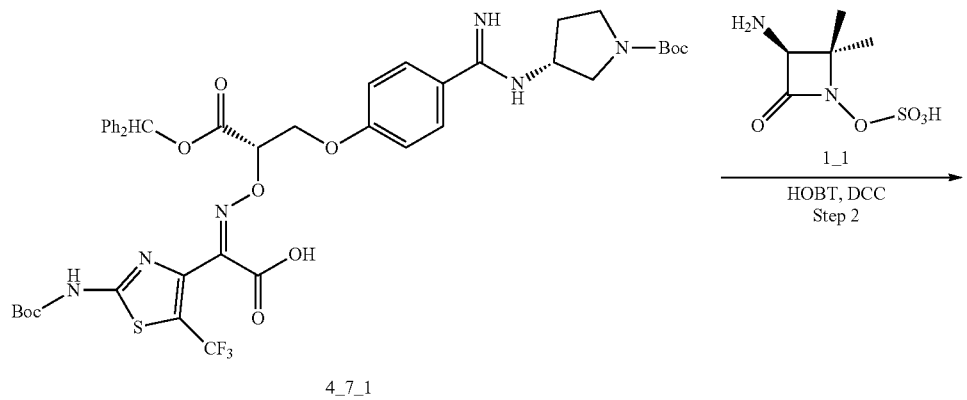

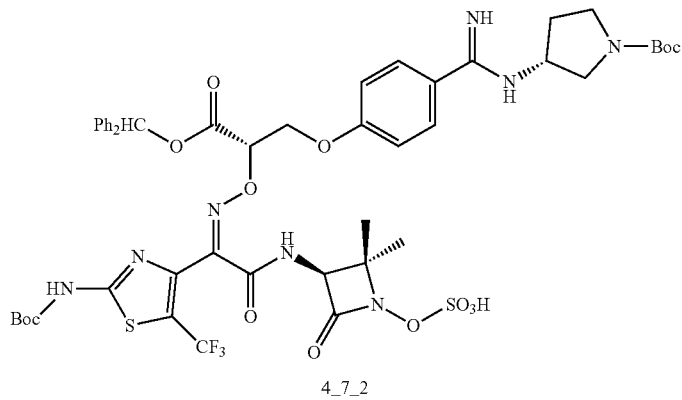

To the solution of compound 4_7_1 (30 mg, 0.03 mmol) in anhydrous DMF (1 mL) was added DCC (18 mg, 0.09 mmol) and HOBT (12 mg, 0.09 mmol). The resulting mixture was stirred at room temperature for 30 minutes, and then (S)-3-amino-2,2-dimethyl-4-oxoazetidin-1-ylhydrogen sulfate 1_1 (18 mg, 0.09 mmol) and NaHCO$_3$ (18.5 mg, 0.22 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_7_2 (0.20 g, 55%) as a pale yellow solid.

$^1$H NMR (400 MHz, DMSO-d$_6$): δ 1.10 (s, 3H), 1.36 (s, 3H), 1.41 (s, 9H), 1.47 (s, 9H), 1.98-2.06 (m, 1H), 2.17-2.24 (m, 1H), 3.39-3.47 (m, 3H), 3.59-3.67 (m, 1H), 4.27-4.33 (m, 1H), 4.48-4.53 (m, 1H), 4.60 (d, J=7.9 Hz, 1H), 4.62-4.67 (m, 1H), 5.35 (t, J=3.5 Hz, 1H), 6.89 (s, 1H), 7.06 (d, J=8.6 Hz, 2H), 7.15-7.21 (m, 3H), 7.26-7.46 (m, 6H), 7.70 (d, J=8.6 Hz, 2H), 9.00 (s, 1H), 9.42 (s, 1H), 9.70 (d, J=7.9 Hz, 1H), 12.48 (s, 1H). $^{19}$F NMR (376 MHz, DMSO-d$_6$)): δ −51.1 (s, 3F). LC-MS analysis: [M−H]$^-$=1087.3.

Step 3: (S)-2-((((Z)-1-(2-Amino-5-(trifluoromethyl)thiazol-4-yl)-2-(((S)-2,2-dimethyl-4-oxo-1-(sulfooxy)azetidin-3-yl)amino)-2-oxoethylidene)amino)oxy)-3-(4-(N-((R)-pyrrolidin-3-yl)carbamimidoyl)phenoxy)propanoic acid (Example 7)

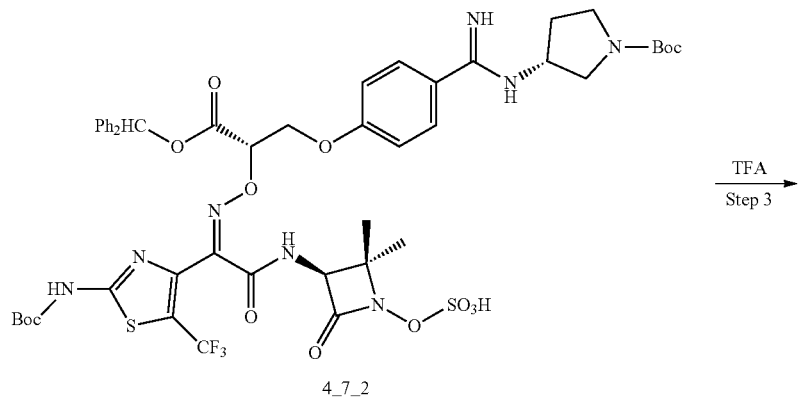

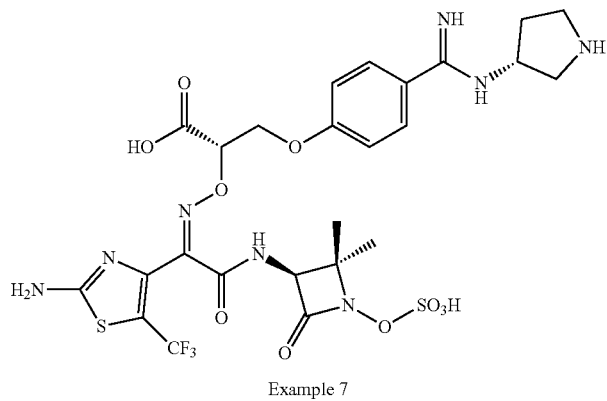

Example 7

To the solution of compound 4_7_2 (20 mg, 0.02 mmol) in anhydrous DCM (4 mL) was added TFA (0.8 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was further purified by prep. HPLC on a Agilent 10 prep-C18 250×21.2 mm column and lyophilized to give example 7 (4 mg, 30%) as a white solid.

$^1$H NMR (400 MHz, DMSO-$d_6$): δ 1.27 (s, 3H), 1.43 (s, 3H), 1.96-2.03 (m, 2H), 3.24-3.35 (m, 3H), 3.49-3.51 (m, 1H), 4.20-4.25 (m, 1H), 4.41-4.47 (m, 1H), 4.65 (d, J=8.6 Hz, 1H), 4.78 (d, J=8.7 Hz, 1H), 5.23 (t, J=5.1 Hz, 1H), 6.71 (br s, 1H), 7.13 (d, J=8.4 Hz, 2H), 7.23 (br s, 1H), 7.75 (d, J=8.4 Hz, 2H), 7.83 (s, 1H), 7.91 (br s, 1H). $^{19}$F NMR (376 MHz, DMSO-$d_6$)): δ −49.8 (s, 3F). LC-MS analysis: [M−H]$^-$=721.1.

Example 8
(S)-2-((((Z)-1-(2-amino-5-methylthiazol-4-yl)-2-(((2S,3S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid
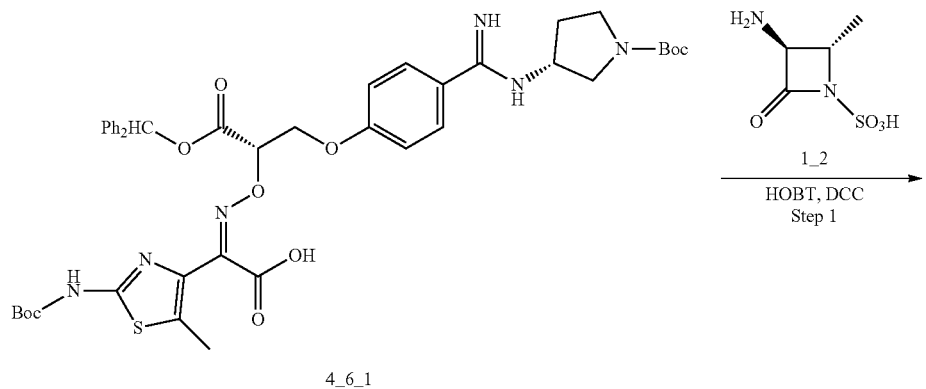
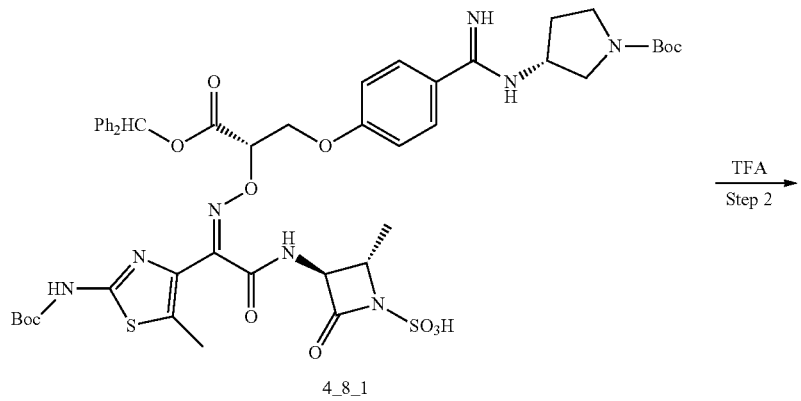
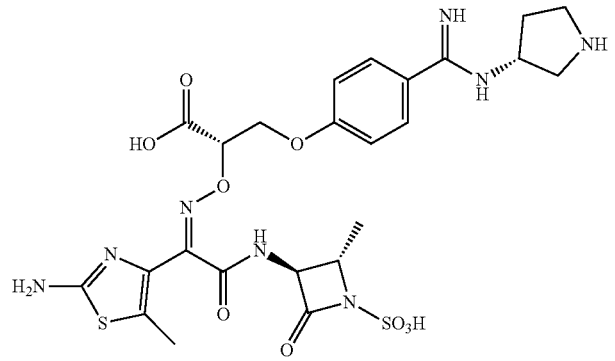
Example 8

Step 1: (2S,3S)-3-((Z)-2-((((S)-1-(Benzhydryloxy)-3-(4-(N-((R)-1-(tert-butoxycarbonyl)pyrrolidin-3-yl)carbamimidoyl)phenoxy)-1-oxopropan-2-yl)oxy)imino)-2-(2-((tert-butoxycarbonyl)amino)-5-methylthiazol-4-yl)acetamido)-2-methyl-4-oxoazetidine-1-sulfonic acid (4_8_1)

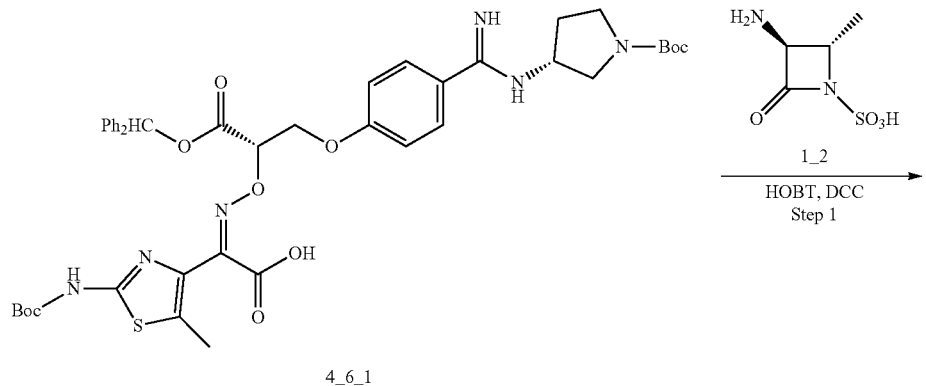

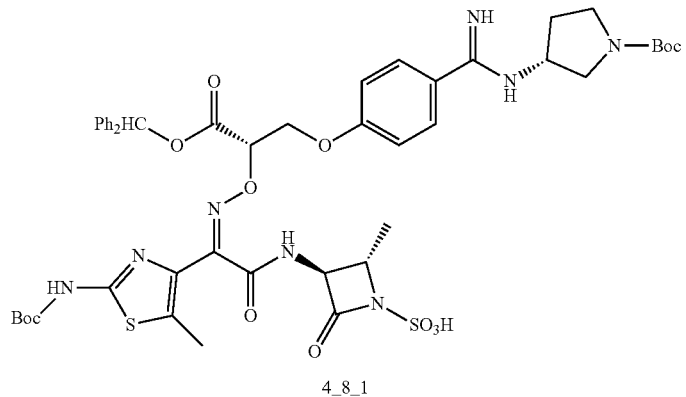

To the solution of compound 4_6_1 (301 mg, 0.35 mmol) in anhydrous DMF (2.5 mL) and DCM (3.5 mL) was added DCC (108 mg, 0.52 mmol) and HOBT (71 mg, 0.52 mmol). The resulting mixture was stirred at room temperature for 45 minutes, and then (2S,3S)-3-amino-2-methyl-4-oxoazetidine-1-sulfonic acid 1_2 (110 mg, 0.52 mmol) and NaHCO$_3$ (89 mg, 1.05 mmol) were added, and continued to stir at room temperature overnight. The reaction mixture was concentrated under reduced pressure to give residue. The residue was purified by flash chromatography on silica gel eluting by 3-5% MeOH in CH$_2$Cl$_2$ to give the title compound 4_8_1 (151 mg, 43%) as a light yellow solid.

$^1$H NMR (400 MHz, DMSO-d$_6$): δ 1.36 (d, J=6.5 Hz, 3H), 1.37 (s, 9H), 1.39 (s, 9H), 1.90-2.00 (m, 1H), 2.07-2.17 (m, 4H), 3.39-3.47 (m, 3H), 3.52-3.62 (m, 1H), 4.01-4.07 (m, 1H), 4.20-4.28 (m, 1H), 4.39-4.44 (m, 1H), 4.50 (d, J=7.9 Hz, 1H), 4.52-4.56 (m, 1H), 5.29 (t, J=3.2 Hz, 1H), 6.85 (s, 1H), 7.00 (d, J=8.6 Hz, 2H), 7.09-7.15 (m, 3H), 7.19-7.33 (m, 5H), 7.37-7.42 (m, 2H), 7.63 (d, J=8.6 Hz, 2H), 8.93 (s, 1H), 9.34 (s, 1H), 9.57 (d, J=7.9 Hz, 1H), 9.62 (d, J=6.5 Hz, 1H), 12.06 (s, 1H). LC-MS analysis: [M–H]$^-$=1003.3.

Step 2: (S)-2-((((Z)-1-(2-Amino-5-methylthiazol-4-yl)-2-(((2S,3S)-2-methyl-4-oxo-1-sulfoazetidin-3-yl)amino)-2-oxoethylidene)amino)oxy)-3-(4-(N-((R)-pyrrolidin-3-yl)carbamimidoyl)phenoxy)propanoic acid (Example 8)

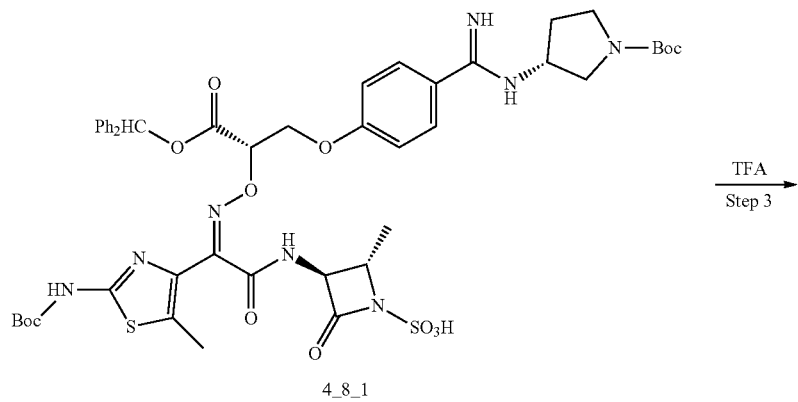

4_8_1

TFA
Step 3

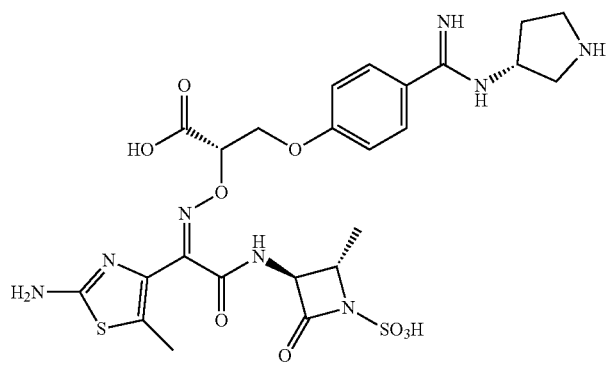

Example 8

To the solution of compound 4_8_1 (151 mg, 0.15 mmol) in anhydrous DCM (4 mL) was added TFA (3 mL) at 0° C. After stirring for 1 hour at 0° C., the resulting mixture was warmed to room temperature and stirred for additional 2 hours. The reaction mixture was concentrated under reduced pressure to give a residue. The residue was dissolved with water (20 mL) and washed with petroleum ether/EtOAc (2:1, 40 mL). The aqueous layer was freeze-dried to give the crude title compound (0.21 g) as a pale yellow power, which was purified by prep. HPLC on a Agilent 10 prep-C18 250×21.2 mm column and lyophilized to give example 8 (35 mg, 36%) as a white solid.

$^1$H NMR (400 MHz, DMSO-$d_6$): δ 1.35 (d, J=6.4 Hz, 3H), 1.90-2.00 (m, 1H), 2.07-2.17 (m, 4H), 3.39-3.47 (m, 3H), 3.52-3.62 (m, 1H), 4.01-4.08 (m, 1H), 4.20-4.28 (m, 1H), 4.39-4.44 (m, 1H), 4.50 (d, J=7.9 Hz, 1H), 4.52-4.56 (m, 1H), 5.29 (t, J=3.2 Hz, 1H), 6.66 (br s, 1H), 6.87 (br s, 2H), 7.12 (d, J=8.6 Hz, 2H), 7.21 (br s, 2H), 7.74 (d, J=8.6 Hz, 2H). LC-MS analysis: [M−H]$^-$=637.1.

For the convenience of the reader the structures of the final compounds as well as used building blocks (BB1: 1_1, BB2: 2_x and BB3:3_x_8) are provided in table 1.

TABLE 1

Structures of final compounds and used building blocks

| Example | Structure | BB 1 (1_x) | BB 2 (2_x) | BB 3 (3_x_8) |
|---------|-----------|------------|------------|--------------|
| 1 | | 1_1 | 2_1 | 3_1_8 |
| 2 | | 1_1 | 2_1 | 3_2_8 |
| 3 | | 1_1 | 2_1 | 3_6_8 |
| 4 | | 1_1 | 2_1 | 3_4_8 |

TABLE 1-continued

Structures of final compounds and used building blocks

| Example | Structure | BB 1 (1_x) | BB 2 (2_x) | BB 3 (3_x_8) |
|---|---|---|---|---|
| 5 | | 1_1 | 2_1 | 3_3_8 |
| 6 | | 1_1 | 2_1 | 3_5_8 |
| 7 | | 1_1 | 2_2 | 3_5_8 |
| 8 | | 1_2 | 2_1 | 3_5_8 |

Pharmacological Methods

Abbreviations

MIC: minimum inhibitory concentration

CFU: colony forming units

ED100: 100% protective dose

The antimicrobial activity of the compounds of this invention against a selection of different bacteria may be evaluated by a number of assays, including the in-vitro determination of the minimum inhibitory concentration (MIC) or the determination of the in-vivo efficacy in mouse infection models.

Minimum Inhibitory Concentration (MIC) Determination

Compounds of this invention were tested for antimicrobial activity by determining minimum inhibitory concentrations (MICs, in µg/mL) using the broth microdilution method according to the guidelines of the Clinical Laboratories and Standards Institute ("Methods for Dilution Antimicrobial Susceptibility Tests for Bacteria that Grow Aerobically", Approved standard, 7th ed., Clinical and Laboratory Standards Institute (CLSI) Document M7-A8, Wayne, Pa., USA, 2009.). AZT: aztreonam (AZT) and ceftazidime (CAZ) were used as control antibiotics. Test compounds were dissolved in DMSO. The compounds were then diluted in microbial growth medium (Mueller Hinton Broth II, cation adjusted) resulting in a final concentration range of 0.063-64 µg/mL in serial two-fold dilution. In all cases the final DMSO concentration was less than 0.5%. Bacteria were added to 96-well microtitre plates containing the two-fold dilutions of the compounds; the final cell density was approximately $5 \times 10^5$ colony forming units/mL (CFU/mL). Plates were incubated at 37° C. for 18-24 hours and read visually. The MIC, i.e. the lowest concentration of the test compound that inhibited visible growth of the bacteria, was recorded. The same assay conditions were used when the compounds of this invention were tested in combination with β-lactamase inhibitors. While the compounds of this invention were serially diluted as described above, a constant concentration of the inhibitor of 4 mg/L was used.

Bacterial strains that were used to evaluate the antimicrobial activity using the MIC determination included but were not limited to E. coli clinical isolate, E. coli 8739, K. pneumoniae clinical isolate, K. pneumoniae 700603, E. cloacae clinical isolate, E. cloacae 700323, A. baumannii clinical isolate, A. baumannii 19606, P. aeruginosa clinical isolate, P. aeruginosa 9027.

TABLE 2

| | Biological data | | | | |
|---|---|---|---|---|---|
| compound example No. | Strain 1 MIC [mg/L] | Strain 2 MIC [mg/L] | Strain 3 MIC [mg/L] | Strain 4 MIC [mg/L] | Strain 5 MIC [mg/L] |
| AZT | >64 | 16 | 64 | 64 | >64 |
| CAZ | >64 | >64 | >64 | >64 | >64 |
| 1 | 4 | 4 | 32 | 32 | 64 |
| 2 | 4 | 2 | 32 | 64 | 64 |
| 3 | 4 | 4 | 32 | 64 | 64 |
| 4 | 4 | 4 | 32 | 64 | 32 |
| 5 | 4 | 4 | 32 | 64 | 64 |
| 6 | 1 | 0.25 | 1 | 1 | 2 |
| 7 | 32 | 8 | 16 | 8 | 32 |
| 8 | 1 | 0.5 | 32 | 64 | 64 |

TABLE 2-continued

| | Biological data | | | | |
|---|---|---|---|---|---|
| compound example No. | Strain 6 MIC [mg/L] | Strain 7 MIC [mg/L] | Strain 8 MIC [mg/L] | Strain 9 MIC [mg/L] | Strain 10 MIC [mg/L] |
| AZT | >64 | >64 | 32 | >64 | 16 |
| CAZ | >64 | >64 | >64 | >64 | >64 |
| 1 | 32 | 32 | 16 | 16 | 8 |
| 2 | 32 | 16 | 16 | 8 | 32 |
| 3 | 32 | 32 | 32 | 8 | 8 |
| 4 | 32 | 32 | 16 | 8 | 4 |
| 5 | 32 | 32 | 16 | 4 | 4 |
| 6 | 4 | 8 | 8 | 2 | 2 |
| 7 | 32 | 16 | 16 | 8 | 16 |
| 8 | 32 | 32 | 16 | 16 | 1 |

AZT: Aztreonam;
CAZ: Ceftazidime

| | |
|---|---|
| strain 1 | E. coli clinical isolate |
| strain 2 | E. coli 8739 |
| strain 3 | K. pneumoniae clinical isolate |
| strain 4 | K. pneumoniae 700603 |
| strain 5 | E. cloacae clinical isolate |
| strain 6 | E. cloacae 700323 |
| strain 7 | A. baumannii clinical isolate |
| strain 8 | A. baumannii 19606 |
| strain 9 | P. aeruginosa clinical isolate |
| strain 10 | P. aeruginosa 9027 |

Determination of the In-Vivo Activity in Mouse Infection Models

Formulations

Commercial 10% aqueous mannitol solution was diluted with aquadest to a 3% aqueous mannitol solution. Compounds of this invention were dissolved at 20-45° C. to form clear application solution of a concentration in the range from 0.02 mg/mL to 3 mg/mL.

Commercial 10% aqueous mannitol solution was diluted with aquadest to a 3% aqueous mannitol solution. Solid sodium acetate was added to obtain 2-20 mM sodium acetate solutions in 3% aqueous mannitol. Compounds of this invention were dissolved at 20-45° C. to form clear application solution of a concentration in the range from 0.02 mg/mL to 3 mg/mL.

Compounds of this invention were dissolved in DMSO at 20-25° C. to form clear stock solutions of a concentration in the range of 60 mg/mL. The stock solutions were diluted with 3% aqueous mannitol solution at 20-25° C. to form clear application solutions of a concentration in the range of 2 mg/mL.

Compounds of this invention were dissolved at 20-45° C. in commercial lactated Ringer's solution to form clear application solutions of a concentration in the range from 0.02/mL to 3 mg/mL.

Compounds of this invention were dissolved at 20-45° C. in commercial Dulbecco's Phosphate Buffered Saline without calcium and magnesium to form clear application solutions of a concentration in the range from 0.02/mL to 3 mg/mL.

D(+)-Glucose monohydrate was dissolved in aquadest to a 5% aqueous glucose solution. Compounds of this invention were dissolved at 20-45° C. to form clear application solutions of a concentration in the range from 0.02/mL to 3 mg/mL.

Compounds of this invention were dissolved at 20-45° C. in commercial 0.9% saline to form clear application solutions of a concentration in the range from 0.02/mL to 3 mg/mL.

Peritonitis Models

Femal CD-1 mice were infected intraperitonealy with a bacterial inoculum in 5% mucin that led to the death of the untreated group (n=10) within the first 24 hours of the experiment (~1×10$^4$ CFU to ~5×10$^7$ CFU per mouse depending on the virulence of strain used). Strains that were used included but were not limited to wild-type *E. coli* Neumann, wild-type *P. aeruginosa* Walther, wild-type *A. baumannii*, wild-type *K. pneumoniae*. Mice were treated via intravenous injection 30, 60 and 120 minutes post infection with compounds of this invention (alone or in combination with a β-lactamase inhibitor) as well as with control antibiotics including but not limited to meropenem. Lethalities were followed over 5 days and the 100% protective does (ED100) was determined.

Lung Infection Model

Female BALB/C mice anesthetized with isoflurane and infected intranasally with 32 μl of the bacterial inoculum (e.g. ~3.5×10$^7$ cfu per mouse for *P. aeruginosa* PAO1). Mice were treated via intravenous injection 30, 60 and 120 minutes post infection with compounds of this invention as well as with control antibiotics including but not limited to meropenem. Animals, including an untreated control group were sacrificed after 24 hours. Lungs were aseptically removed, homogenized, serially diluted and plated onto sheep-blood agar plates to determine CFU counts.

Urinary Tract Infection Model

Female CD-1 mice were given 5% glucose solution as the sole source of drinking water from 16 hours before the experiment to the end. Anesthetized mice were infected via the urethra with a uropathogenic *E. coli* strain in 0.9% NaCl with 0.25% agar-agar in a 25 μl volume (5×10$^6$ cfu per mouse). Mice were treated via intravenous injection 1, 5, 23, and 30 hours post infection with compounds of this invention as well as with control antibiotics including but not limited to meropenem. Mice, including an untreated control group were sacrificed at 48 hours post infection. Bladders were aseptically removed, homogenized, serially diluted and plated onto Mueller Hinton agar plates to determine CFU counts.

What we claim is:

1. A compound of formula (I)

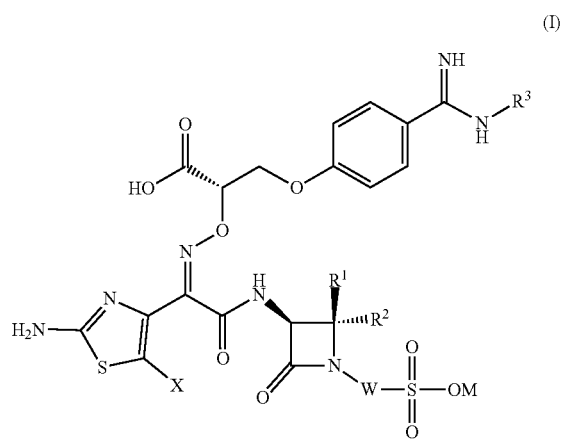

in which

M is hydrogen or a pharmaceutically acceptable salt forming cation,

R$^1$ and R$^2$ represent independently of one another $C_1$-$C_6$ alkyl,

W represents O,

X represents independently $C_1$-$C_6$ alkyl, and

R$^3$ represents a 4-, 5- or 6-membered nitrogen-containing heterocycle, and the salts thereof, the solvates thereof and the solvates of the salts thereof, or a deuterated compound of any such compound.

2. The compound according to claim 1, wherein

M is hydrogen or a pharmaceutically acceptable salt forming cation,

R$^1$ and R$^2$ represent methyl,

W represents O,

X represents independently methyl or ethyl, and

R$^3$ represents azetidine, pyrrolidine or piperidine, and the salts thereof, the solvates thereof and the solvates of the salts thereof, or a deuterated compound of any such compound.

3. The compound according to claim 1, wherein

M is hydrogen or a pharmaceutically acceptable salt forming cation,

R$^1$ and R$^2$ represent methyl,

W represents O,

X represents methyl, and

R$^3$ represents azetidine, pyrrolidine or piperidine, and the salts thereof, the solvates thereof and the solvates of the salts thereof, or a deuterated compound of any such compound.

4. An antibacterially-effective compound of claim 1, wherein the bacterial infection is Gram-negative bacteria.

5. A method of treating or preventing a Gram-negative bacterial infection in a patient by administering an antibacterially effective amount of a compound according to claim 1.

6. A pharmaceutical composition comprising at least one compound according to claim 1 in combination with at least one further active compound, wherein the further active compound comprises a β-lactamase inhibitor.

7. The pharmaceutical composition comprising at least one compound according to claim 1 in combination with at least one inert, non-toxic, pharmaceutically acceptable excipient.

8. The pharmaceutical composition of claim 6 adapted to treat or prevent bacterial infection.

9. A method for controlling bacterial infection in humans and animals by administering an antibacterially effective amount of at least one compound according to claim 1.

10. A process for preparing a compound recited in claim 1, wherein M=H, and wherein the process comprises:

step A, reacting substituted ketoacid (V) with the hydroxylamine (VI) to provide an intermediate of formula (III):

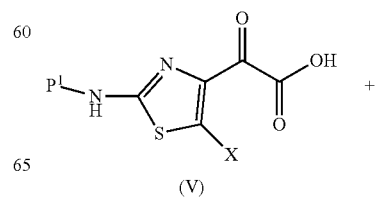

-continued

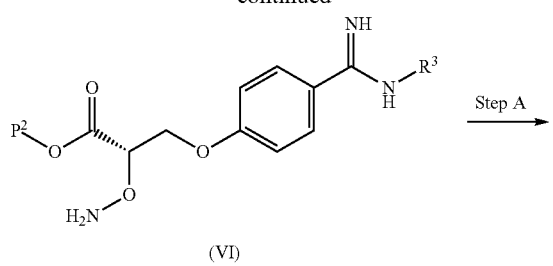

(VI)

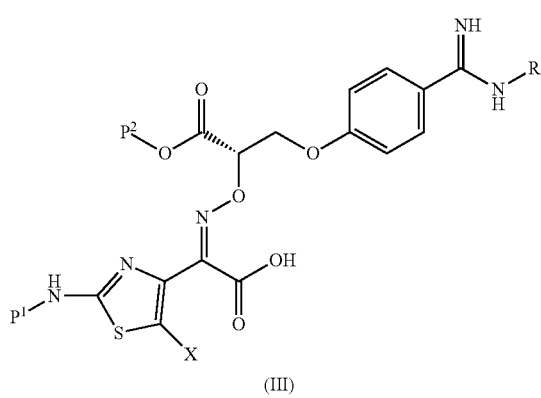

(III)

in which P¹ and P² represent independently a protecting group, R³ and X are defined in claim 1;

step B, reacting the intermediate of formula (III) with amine (IV) in presence of coupling reagent to provide an intermediate of formula (II):

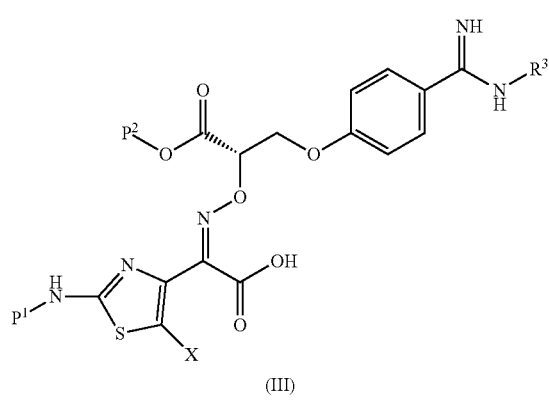

(III)

+

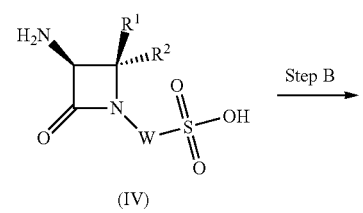

(IV)

Step A

-continued

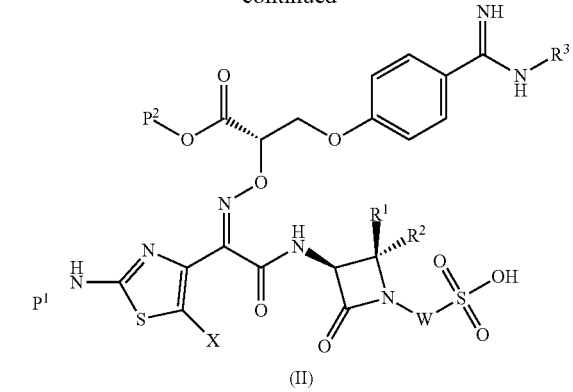

(II)

in which P¹ and P² represent independently a protecting group, R¹, R², R³, W and X are defined in claim 1; and
step C, a compound of formula (I) may be obtained by removing the protecting group from compounds of formula (II) under acidic conditions, (I)

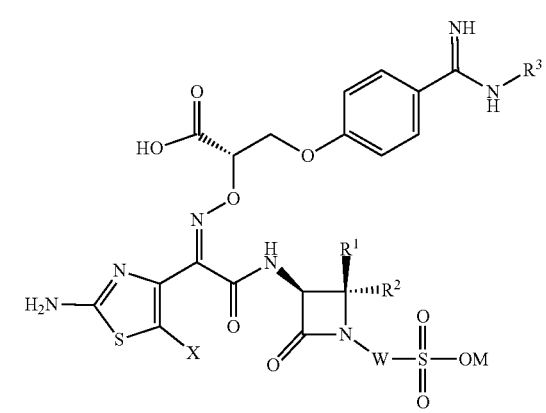

in which R¹, R², R³, W, and X are defined in claim 1.

11. The pharmaceutical composition of claim 6, wherein the β-lactamase inhibitor comprises clavulanic acid, tazobactam, sulbactam, avibactam, relebactam, vaborbactam, or a combination thereof.

12. The compound according to claim 1, which compound is:

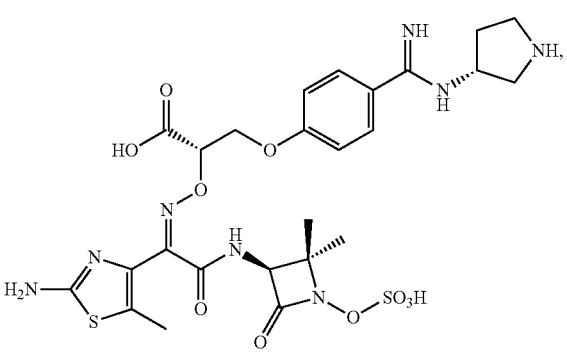

and the salts thereof, the solvates thereof and the solvates of the salts thereof, or the deuterated compound.

13. The compound according to claim 1, which compound is selected from the following group of compounds:
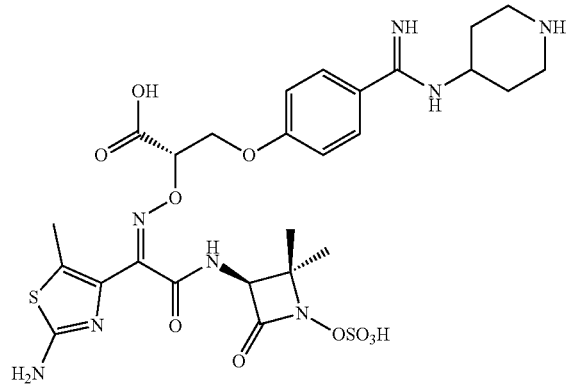
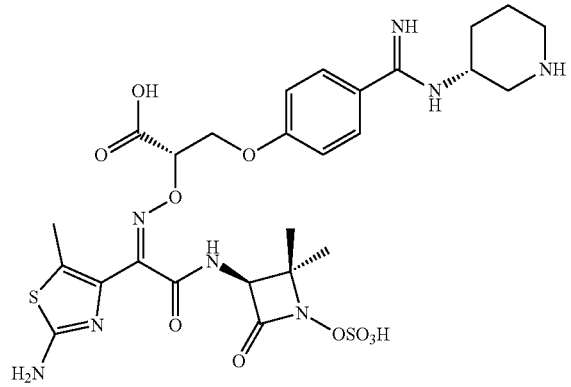
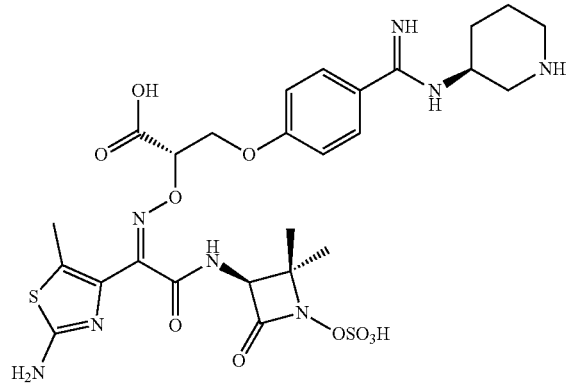
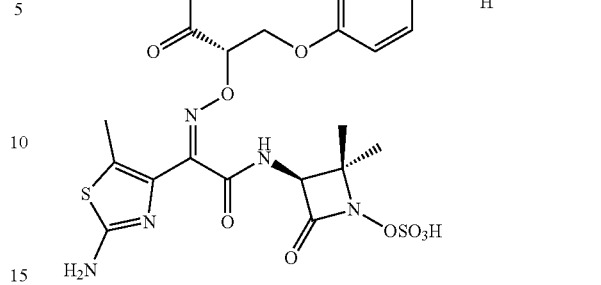
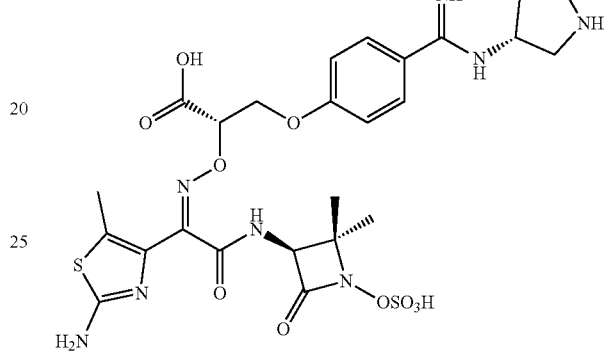
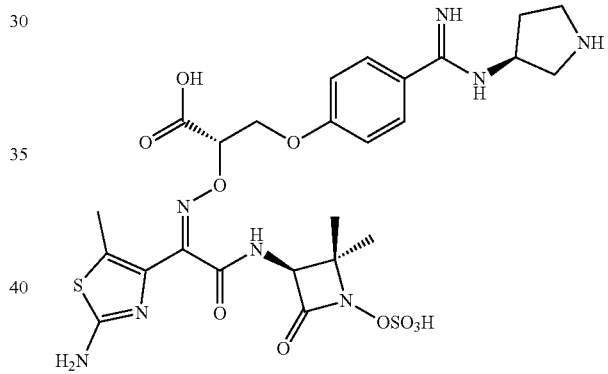
and the salts thereof, the solvates thereof and the solvates of the salts thereof, or a deuterated compound of any such compound, or any combination of the foregoing compounds.
* * * * *